(12) United States Patent
Galbraith

(10) Patent No.: US 7,713,421 B2
(45) Date of Patent: May 11, 2010

(54) SORPTION METHOD, DEVICE, AND SYSTEM

(75) Inventor: Stephen Douglas Galbraith, Holbrook, PA (US)

(73) Assignee: Separation Design Group, LLC, Waynesburg, PA (US)

(*) Notice: Subject to any disclaimer, the term of this patent is extended or adjusted under 35 U.S.C. 154(b) by 866 days.

(21) Appl. No.: 10/582,314

(22) PCT Filed: Dec. 8, 2004

(86) PCT No.: PCT/US2004/041264

§ 371 (c)(1),
(2), (4) Date: Sep. 12, 2006

(87) PCT Pub. No.: WO2005/081722

PCT Pub. Date: Sep. 9, 2005

(65) Prior Publication Data

US 2009/0018668 A1    Jan. 15, 2009

Related U.S. Application Data

(63) Continuation-in-part of application No. 10/730,278, filed on Dec. 9, 2003, now Pat. No. 7,291,271.

(51) Int. Cl.
*C02F 1/42* (2006.01)
(52) U.S. Cl. .............. 210/663; 210/669; 210/748; 210/264
(58) Field of Classification Search .............. 210/663, 210/669, 748, 264
See application file for complete search history.

(56) References Cited

U.S. PATENT DOCUMENTS

| | | | |
|---|---|---|---|
| 3,359,707 A | 12/1967 | Jean | 55/33 |
| 3,463,944 A | 8/1969 | Melcher | 310/10 |
| 3,727,375 A | 4/1973 | Wallace | 55/2 |
| 3,730,885 A | 5/1973 | Makrides et al. | 210/30 |
| 3,771,234 A | 11/1973 | Forster et al. | 34/1 |
| 4,011,306 A | 3/1977 | Fox, Jr. | 423/579 |
| 4,038,050 A | 7/1977 | Lowther | 95/1 |
| 4,094,652 A | 6/1978 | Lowther | 96/143 |
| 4,114,380 A | 9/1978 | Ceperley | 60/721 |
| 4,316,233 A | 2/1982 | Chato et al. | 361/233 |
| 4,322,394 A | 3/1982 | Mezey et al. | 423/244.11 |
| 4,954,320 A | 9/1990 | Birmingham et al. | 422/186.04 |
| 4,964,889 A | 10/1990 | Chao | 95/96 |
| 5,085,780 A | 2/1992 | Ostreicher | 210/683 |
| 5,335,510 A | 8/1994 | Rockenfeller et al. | 62/106 |
| 5,396,775 A | 3/1995 | Rockenfeller et al. | 62/112 |

(Continued)

OTHER PUBLICATIONS

Boscolo, I. et al., "Application of Ferroelectric Cathodes to Enhance the ION Yield in the Caesar Source at LNS", *Proceedings of EPAC*, 2000, 1631-1633.

(Continued)

*Primary Examiner*—Chester T Barry
(74) *Attorney, Agent, or Firm*—Kilpatrick Stockton LLP

(57) ABSTRACT

The invention relates to a method of separating components of a fluid mixture comprising the steps of providing a fluid, providing a sorbent structure (120), sorbing a first component of the fluid, desorbing the first component, and electrokinetically biasing the first component in a direction other than the vector of the fluid mixture.

35 Claims, 24 Drawing Sheets

U.S. PATENT DOCUMENTS

| | | | |
|---|---|---|---|
| 5,441,716 A | 8/1995 | Rockenfeller | 439/299 |
| 5,490,398 A | 2/1996 | Cline | 62/497 |
| 5,505,825 A | 4/1996 | Gold et al. | 95/126 |
| 5,535,817 A | 7/1996 | Dunne | 165/104.12 |
| 5,590,538 A | 1/1997 | Hsu et al. | 62/51.2 |
| 5,669,583 A | 9/1997 | Roth | 244/130 |
| 5,728,457 A | 3/1998 | Frechet et al. | 428/310.5 |
| 5,842,356 A | 12/1998 | Pfister et al. | 62/480 |
| 5,972,077 A | 10/1999 | Judkins et al. | 95/136 |
| 6,013,164 A | 1/2000 | Paul et al. | 204/450 |
| 6,019,882 A | 2/2000 | Paul et al. | 204/450 |
| 6,200,539 B1 | 3/2001 | Sherman et al. | 422/186.04 |
| 6,271,509 B1 | 8/2001 | Dalton | 219/687 |
| 6,374,909 B1 | 4/2002 | Jeter et al. | 165/96 |
| 6,434,955 B1 | 8/2002 | Ng et al. | 62/106 |
| 6,512,215 B2 | 1/2003 | Dalton | 219/759 |
| 6,692,626 B2 | 2/2004 | Keefer et al. | 204/491 |
| 6,733,645 B1 * | 5/2004 | Chow | 204/453 |
| 7,077,891 B2 | 7/2006 | Jaffe et al. | 96/108 |
| 2001/0000889 A1 | 5/2001 | Yadav et al. | 204/242 |
| 2001/0008212 A1 | 7/2001 | Shepodd et al. | 204/451 |
| 2002/0023453 A1 | 2/2002 | Davidson et al. | 65/259.2 |
| 2002/0122728 A1 | 9/2002 | Darabi et al. | 417/48 |
| 2002/0170436 A1 | 11/2002 | Keefer et al. | 96/121 |
| 2003/0015092 A1 | 1/2003 | Moreau et al. | 95/96 |
| 2003/0019238 A1 | 1/2003 | Pfister et al. | 62/497 |
| 2003/0089228 A1 | 5/2003 | Kulprathipanja et al. | 95/45 |
| 2003/0116016 A1 | 6/2003 | Monzyk et al. | 95/148 |
| 2003/0131729 A1 | 7/2003 | Tonkovich et al. | 95/106 |
| 2003/0167921 A1 | 9/2003 | Golden et al. | 95/96 |
| 2003/0196885 A1 | 10/2003 | Marchitto et al. | 204/157.15 |
| 2004/0069144 A1 | 4/2004 | Wegeng et al. | 95/106 |
| 2004/0097371 A1 | 5/2004 | Jangbarwala | 502/439 |
| 2004/0107831 A1 | 6/2004 | Graham et al. | 95/96 |
| 2004/0118287 A1 | 6/2004 | Jaffe et al. | 96/121 |

OTHER PUBLICATIONS

Collins, P. et al., "Creating High Performance Conductive Composites with Carbon Nanotubes", www.Hyperioncatalysis.com, *Materials Managers Symposium*, Jun. 2004, 8 Pages.

Fuhr, G. et al., "Travelling Wave-Driven Microfabricated Electrohydrodynamic Pumps for Liquids", *J. Micromech. Microeng*, 1994, 217-226.

Gitlin, I. et al., "Pumping Based on Transverse Electrokinetic Effects", *Department of Chemistry and Chemical Biology, Harvard University*, Cambridge, MA, U.S.A. 15 pages.

Judkins, R.R. et al., "CO2 Removal from Gas Streams using a Carbon Fiber Composite Molecular Sieve", $8^{th}$ *Conference on Fundamentals of Absorption*, May 2004, 14 pages.

Kong, M.G. et al., "Wave Form to Produce most Efficiency Discharges", *Dept. of Electronic and Electrical Engineering*, http://www.ee.ualberta.ca/icops2002/programest/1A.htm, Apr. 20, 2004, 1 page.

Ter Brake, H.J.M. et al., "Vibration Free 5K Sorption Cooler" for ESA's Darwin Mission, *University of Twente, Faculty of Applied Physics, MESA Research Institute, Cryogenics*, Feb. 2002, 42(2), 14 pages.

Wang, R.Z. et al., "Adsorption Mechanism and Improvements of the Adsorption Equation for Adsorption Refrigeration Pairs", *International Journal of energy Research*, 1999, 23, 887-898.

Roth, J.R., "Subsonic Plasma Aerodynamics Using Paraelectric and Peristaltic Electrohydrodynamic (EHD) Effects", *Department of Electrical and Computer Engineering, University of Tennessee*, Knoxville, Presented at the $29^{th}$ *IEEE International Conference on Plasma Science*, May 26-30, 2002.

Curtis, F.W., High-Frequency Induction Heating, *Lindsay Publications*, 1987, 12-15 and 218-220 (Chapter IX).

Dean, K.A., et al., "Current saturation mechanisms in carbon nanotube field emitters," *J. Appl. Physics Lett.*, 2000, 76(3), 375-377.

Hubble, J., "Biochemical Separations—Adsorption and chromatographic separations," www.bath.ac.uk/~cesjh/adsorb.htm, downloaded from the Internet on Oct. 6, 2006, 1-32.

Feng, C., et al., "Breakthrough and desorption characteristics of a microtrap," *J. of Microcolumn Separation*, 2000, 12(4), 267-275.

Modi, A., et al., "Miniaturized gas ionization sensors using carbon manotubes," *Nature*, 2003, 424, 171-174 (1 page Abstract).

* cited by examiner

LIQUID ABSORBENT CONTRACTOR

FIGURE 9
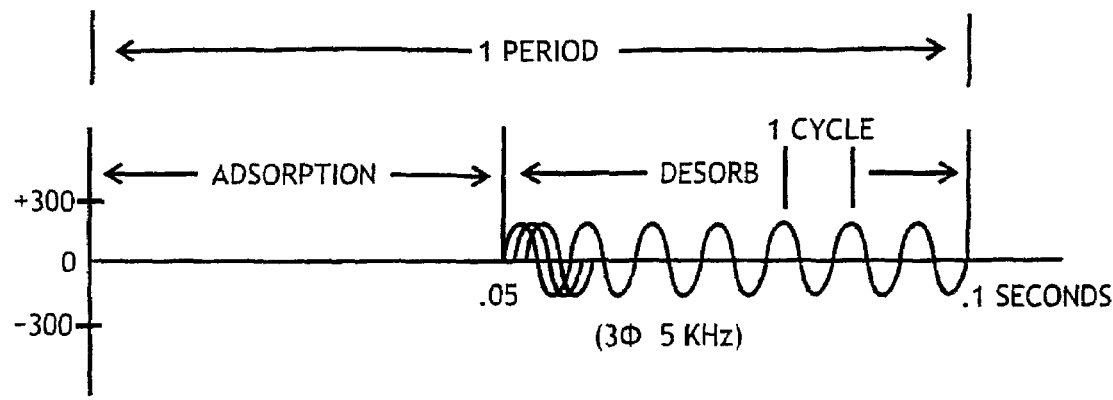
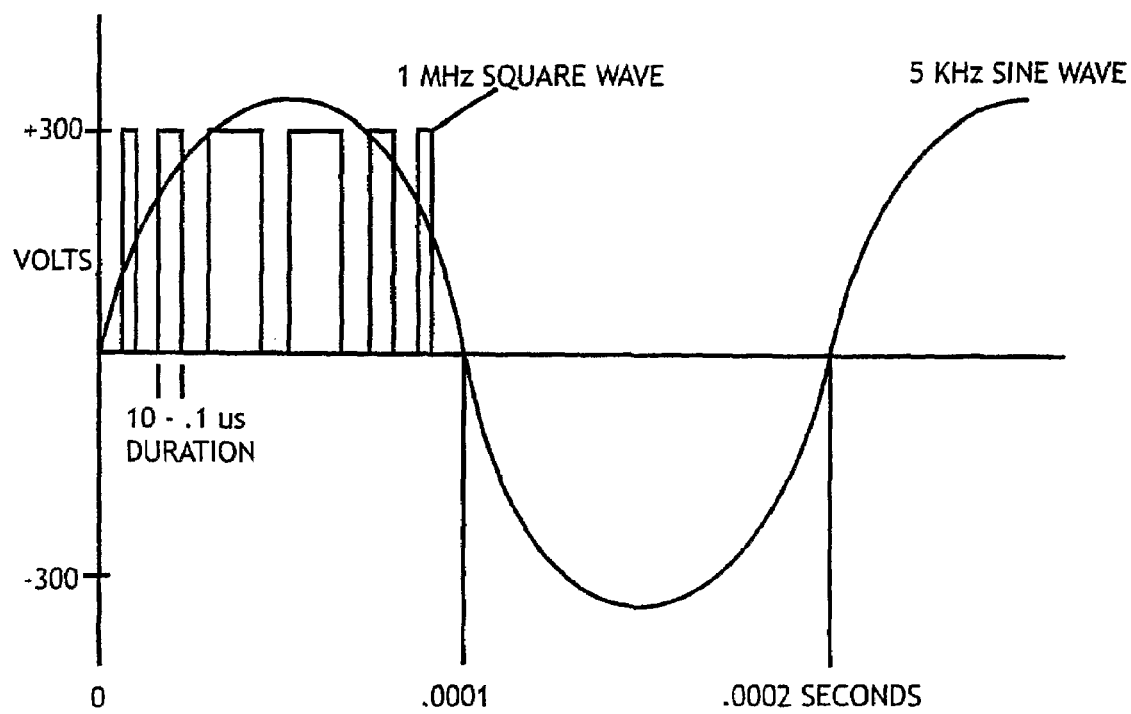

CASCADED VACUUM PUMP

DESORPTION - ADSORPTION SITE HOPPING PHENOMENON

THERMOELECTRIC ASSISTED HEAT PUMP

ELECTRO KINETICALLY ASSISTED SORPTION MEMBRANE

ELECTRO KINETICALLY ASSISTED SORBATE DIFFUSION

PIEZO VALVE
FIGURE 15A
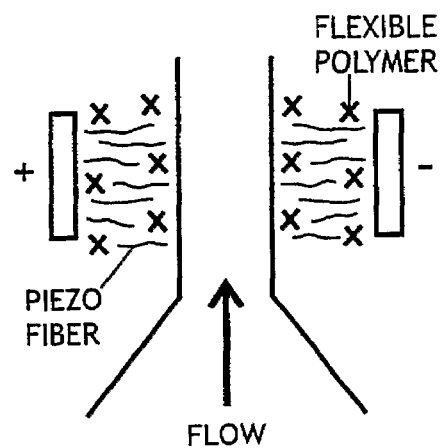
FIGURE 15B  3 PHASE PIEZO PUMP
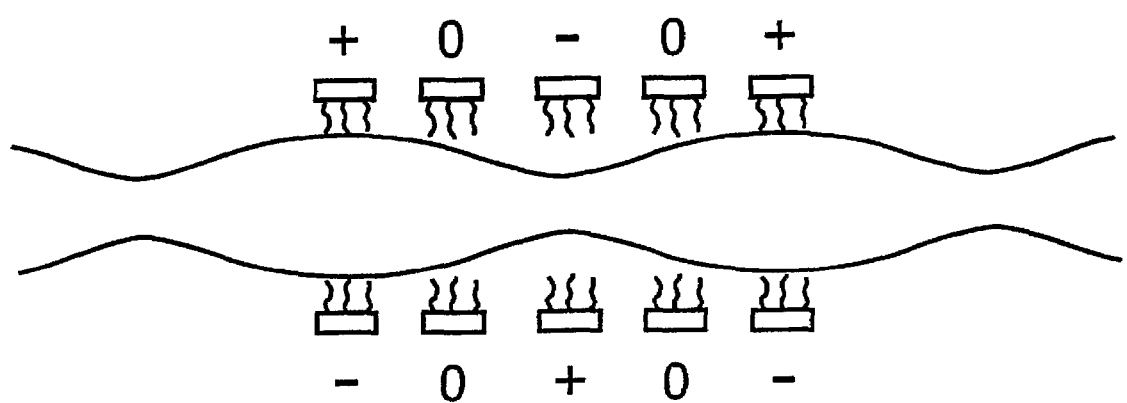

FIGURE 18
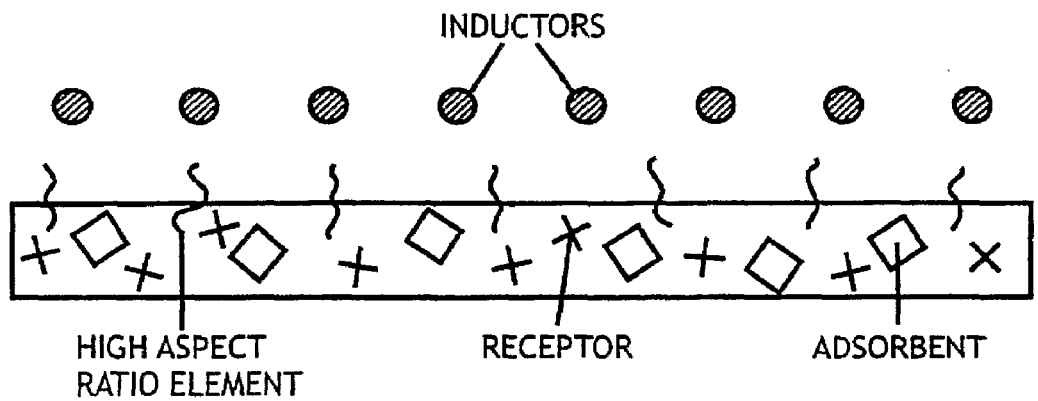
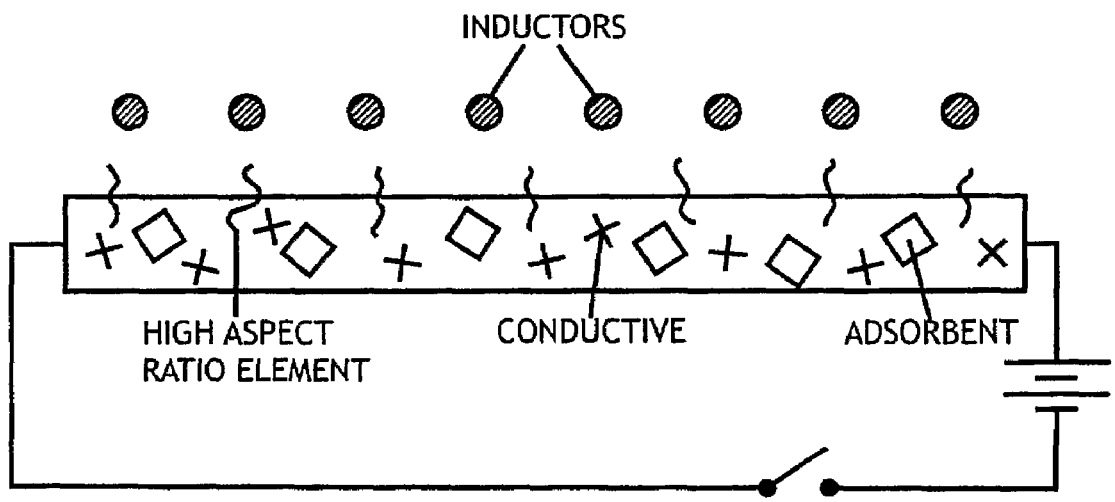
HIGH ASPECT RATIO ELEMENTS AS FIELD CONCENTRATORS FOR IONIZATION

USING PULSE WIDTH MODULATION TO APPROXIMATE A SINE WAVE

ADDRESSABLE CONCENTRATOR AND DETECTOR

FIGURE 21
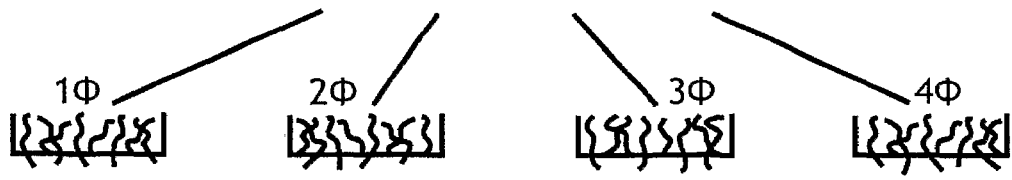
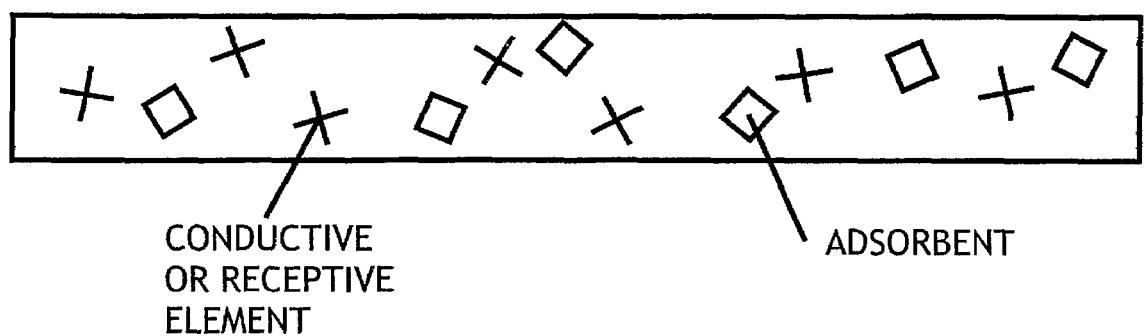
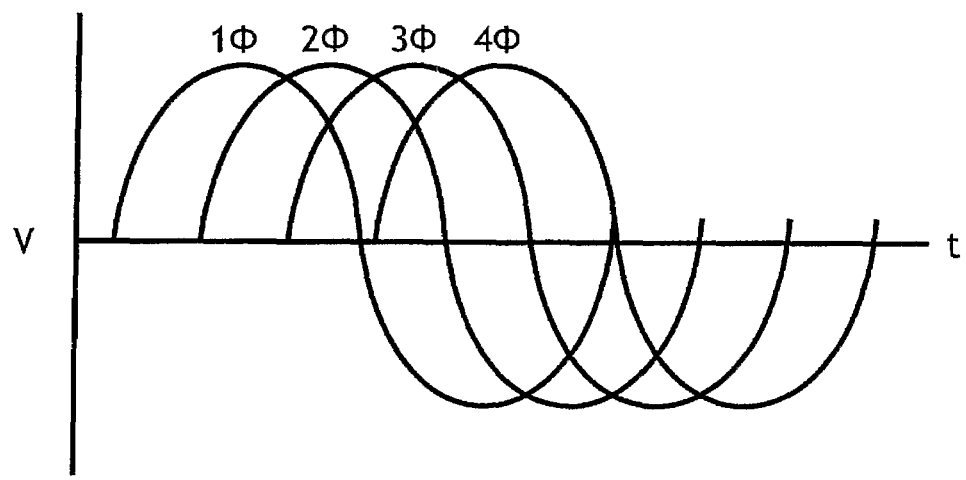

SORPTION METHOD, DEVICE, AND SYSTEM

CROSS REFERENCE TO RELATED APPLICATIONS

This application is the National Stage of International Application No. PCT/US2004/0041264, filed Dec. 8, 2004, which is a continuation-in-part of application Ser. No. 10/730,278 filed Dec. 9, 2003, now U.S. Pat. No. 7,291,271, the disclosure of which is incorporated by reference in its entirety.

REFERENCE TO GOVERNMENT GRANTS

Portions of the disclosure herein may have been supported in part by a grant from the National Science Foundation/Small Business Innovative Research Grant No. 0419821. The United States Government may have certain rights in this application.

FIELD OF THE INVENTION

The invention relates generally to methods, devices, and systems for carrying out sorption (both adsorption and absorption) processes and, more particularly, to methods and devices using electric fields and electric currents to effect desorption and electrokinetically biasing desorbed materials, inter alia, for separation, purification, reaction, heating, cooling, refrigeration, heat pump, and/or vacuum pump processes. More specifically, the invention is related to mesofrequency continuous adsorption/absorption technology (MCAT).

BACKGROUND OF THE INVENTION

Adsorption is a process by which a gas, liquid, or dissolved material is assimilated onto the surface of a solid or liquid material and defined in terms of adsorptive surface area per unit mass. In contrast, an absorption process entails incorporation of materials into the pores or interstitial spaces, as opposed to only the surface, of an absorbent material. An adsorbing material/sorbent or an absorbing material/absorbent is called sorbent. A material being sorbed (either adsorbed or absorbed) is called the sorbate (either adsorbate or absorbate).

A number of different factors and mechanisms influence the adsorption process. For example, polar molecules are often more easily adsorbed. Similarly, molecules with small kinetic diameters can be preferentially adsorbed relative to molecules with larger kinetic diameters. Additionally, the condensation characteristics of the sorbate can also affect the adsorption process. Furthermore, the quadrupole moment of a molecule may make it more easily adsorbed than another molecule. Accordingly, adsorption systems can manipulate these factors and mechanisms to separate components of complex mixtures and/or to effect selective vapor condensation.

A simple, traditional adsorption system has two separate vessels filled with sorbent material. Sorbents are often complex chemical structures having powerful attractive forces and are capable of higher degrees of selectivity and molecular discrimination than membrane filters. A mixture is passed over the sorbent material of one of the vessels causing a component of the complex compound to be removed from the feed stream. Once the sorbent in the first vessel is no longer able to adsorb any more material, the feed stream is switched to the second sorbent containing vessel. While the second vessel is adsorbing, the first vessel is being purged (i.e. desorbed) of the adsorbed material. Thereafter, the first vessel is substituted for the second vessel while the second vessel is purged. This process, known as swing adsorption, is repeated as needed.

The material handling capacity of such adsorption systems depends on a number of variables, including vessel size (i.e. sorbent mass), cycle time and operating pressure, as well as sorbent/adsorbate affinity. For example, increasing vessel size, and hence the volume and mass of sorbent, increases adsorption capacity. Similarly, decreasing the cycle time provides a concomitant increase of available adsorption sites per unit time. Increasing the operating pressure of the system also increases adsorption capacity per unit volume.

Liberation of the sorbed material from the sorbent (i.e. desorption) can occur via a number of different mechanisms. Conventional adsorption systems employ either pressure reduction or temperature increase for removal of the adsorbate. Systems swinging between adsorption and pressure differential desorption are known as pressure swing adsorption (PSA) systems. Alternatively, adsorption systems switching between adsorption and temperature differential desorption are known as temperature swing adsorption (TSA) systems. Other desorption mechanisms exist, including electrical energy desorption (for dielectric and/or conductive sorbents) and microwave irradiation of sorbent/adsorbate complexes.

Regardless of the adsorption/desorption process employed, these systems require that an energy balance be maintained in the system. That is, energy that is dissipated during adsorption (as heat) must be reintroduced into the system during desorption. The most efficient adsorption systems, in terms of energy, are those containing the least amount of superfluous mass because heating and cooling a large vessel, a large volume of sorbent and associated binder materials during the repeating cycles is a very wasteful process. As a result, the current trend is toward lower mass, rapid cycle systems despite the fact that such measures have traditionally been associated with reducing volumetric efficiency.

Recent advances in the field of micro electromechanical systems (MEMS) research have led to proposals for incorporating micro-channel adsorption and reaction devices that provide for very short cycles with increased heat transfer capacities into traditional PSA and TSA systems. Such devices alternate the flow and pressure of complex compounds into and from sorbent filled micro-channels (thus increasing surface area with minimal effect on system size). For example, corrugated sheets have been impregnated or covered with thin layers of such sorbent materials. Additionally, such systems offer the possibility of exceedingly short cycle times on the order of tenths of seconds. Accordingly, it is envisioned that such devices would be particularly well suited for use in small devices, such as oxygen enrichment systems for hospital patients. However, these devices still require mechanical valving and compressors that may lead to mechanical failure and unwanted bulk.

Another method of separating and/or purifying includes membrane technology. Membranes function like filters in that they allow certain substances to pass through them while preventing others from passing through their pores and remain in the feed stream. Membranes are very basic in their operation and require no special valving, switching or purging cycles. Membranes may function in a continuous manner. However, membranes provide no effective means for removing the substances trapped in their pores, they have a high power requirement, and they are limited in their selectivity.

Also, membranes require high pressure differentials to effect diffusion and large surfaces because of low permeance per unit area.

The need to decrease the size and mechanical complexity of adsorptive fluid separation and thermal lift devices is driven by economic concerns and by the need to integrate these devices into increasingly efficient and durable micro systems. For example,

- Manned space platforms require environmental remediation apparatus of extremely low mass and high reliability. Current carbon dioxide removal systems require large quantities of sorbent material.
- Hybrid-, electric-, and fuel cell-powered land vehicles will require non-mechanical solutions to meet cabin heating and cooling needs and will likely be powered by a 42-volt electrical system. Current thermal comfort systems rely on waste heat and mechanical energy that will not be available in future vehicle designs.
- The use of fuel cells as power sources for automotive, generation of electricity, and portable electronics necessitates the development of small, lightweight fuel reformers, oxygen concentrators, and fuel purification devices. This need is currently supplied by membrane and pressure swing adsorption machinery that is both bulky and energy consumptive.
- The use of oxygen enriched air for combustion processes in transportation, metal refining and chemical processes, and in pollution abatement, agriculture, and aquaculture is being developed. The economic viability of these proposed systems enhancements requires that oxygen-nitrogen separation equipment be affordable, energy efficient, and, in the case of propulsion applications, able to meet mass-volume criteria.
- The need to create temperature conditioned spaces for human habitation, food storage, and for sensitive equipment is increasing along with the expectations and living standards of the human population. This is applying tremendous strains on energy production capacity and material availability. Present mechanical thermal lift devices are material intensive, complicated, and use working fluids that contribute to the "greenhouse effect." Mechanical systems also have high starting currents requiring oversized electrical supply systems.
- Industrial operations requiring separation technology to provide feed stocks utilize large scale pressure and temperature swing adsorption, distillation, and compressor driven membrane equipment that, because of "economy of scale" considerations, obviates the adoption of more efficient point-of-use manufacturing practices.
- Man-portable cooling and CPU cooling are topics that have generated interest in micro heat pump technology. Most of the systems available and proposed are simply miniaturizations of existing designs. The use of micro turbines and micro pumps retains disadvantages (moving parts, complexity) inherent in full-scale devices. Systems without moving parts have an advantage both in production and maintenance costs.
- The co-location of electronic and mechanical components, as in aerospace systems, requires not only pumping quantities of heat, but also the ability to control the thermal conductivity of barrier materials.

Some improvements have been made toward decreasing the cycle times of TSA and PSA systems. In one instance, a plurality of sorbent containing pressure vessels is held central to a continuously rotating valve assembly. This results in lower fluid residence time in the reactor vessel and higher throughput per unit volume of sorbent. In another instance micro reaction chambers are created by etching or otherwise forming linear channels on a substrate. The substrate is formed of or contains sorbent material. This allows for heat exchange between reaction channels and for short reaction times. Both of these configurations are vast improvements over existing pressure and temperature swing adsorption systems that rely on vessel size and operating pressure to increase capacity.

There is, however, a continuing and pressing need for methods and devices that are capable of selectively separating and/or purifying mixtures, carrying out reaction processes, or that may be used in heating, cooling, heat pumps and/or refrigeration processes, particularly those that reduce cycle times even further, minimize or eliminate moving parts, valving, switching, and purging, and that may function continuously, and are lightweight and portable. There is also a need for devices and systems that are less expensive to build, less complicated to maintain, and scalable, especially for mobile and small-sized applications. The invention is directed to these, as well as other, important ends.

SUMMARY OF THE INVENTION

The methods, devices, and systems of the invention are major innovations and depart radically from conventional separation and temperature control technology. The invention utilizes sustainable technology and the devices and systems of the invention are compact, energy efficient themselves, and help other machines and devices use less energy and create less pollution.

In one embodiment, the invention is directed to methods of separating components of a fluid mixture, comprising the steps of:

providing a fluid mixture comprising a first component and a second component;

providing a sorbent structure comprising at least one sorbent (either an adsorbent or an absorbent);

sorbing said first component onto said sorbent;

desorbing said first component; and electrokinetically biasing said first component in a direction other than the vector of said fluid mixture.

In another embodiment, the invention is directed to methods of producing at least one reaction product, comprising the steps of:

providing a fluid mixture comprising a first component;

providing a sorbent structure comprising at least one sorbent (either an adsorbent or an absorbent) and at least one catalyst;

sorbing said first component onto said sorbent;

catalyzing a reaction of said sorbed first component to form at least one sorbed reaction product;

desorbing said sorbed reaction product; and electrokinetically biasing said desorbed reaction product in a direction other than the vector of said fluid mixture.

In further embodiments, the invention is directed to methods of analyzing the components of a fluid mixture, comprising the steps of:

providing a fluid mixture comprising a first component and a second component;

providing a sorbent structure comprising at least one sorbent (an adsorbent or an absorbent);

sorbing said first component onto said sorbent;

desorbing said first component;

electrokinetically biasing said first component in a direction other than the vector of said fluid mixture; and analyzing said desorbed first component.

In further embodiments, the invention is directed to methods of analyzing the components of a fluid mixture, comprising the steps of:

providing a fluid mixture comprising a first component and a second component;

providing a sorbent structure comprising at least one sorbent (an adsorbent or an absorbent);

sorbing said first component onto said sorbent;

desorbing said first component;

electrokinetically biasing said first component in a direction other than the vector of said fluid mixture;

collecting an exhaust fluid stream enriched in said second component and depleted in said first component; and analyzing said exhaust fluid stream.

In other embodiments, the invention is directed to methods of controlling temperature, comprising the steps of:

providing a fluid comprising a first component;

providing an sorbent structure comprising at least one sorbent (an adsorbent or an absorbent) in a container;

sorbing said first component onto said sorbent;

desorbing said first component;

electrokinetically biasing said first component and moving said first component in a direction other than the vector of said fluid;

condensing said first component;

evaporating said condensed first component; and re-adsorbing said evaporated first component onto said sorbent.

In another embodiment, the invention is directed to sorption (adsorption or absorption) devices, comprising:

a sorbent structure comprising at least one sorbent;

an electrokinetic biaser; and a desorber.

Preferably, the electrokinetic biaser and the desorber comprise the same component(s).

In yet other embodiments, the invention is directed to systems, comprising at least one sorption (adsorption or absorption) device described above.

In other embodiments, the invention is to sorption (adsorption or absorption) units, comprising:

a first substrate layer;

a sorbent layer disposed below the first substrate layer;

at least two electrodes in contact with or in close proximity to at least one of said first substrate layer and said sorbent layer;

a second substrate layer disposed below said sorbent layer;

at least one via disposed through at least one of said first substrate layer, said sorbent layer and said second substrate layer;

said at least one via being disposed between said at least two electrodes; and at least one collection port disposed through at least one of said first substrate layer, said sorbent layer and said second substrate layer;

wherein said first substrate layer, said sorbent layer and said second substrate layer are co-planar.

In yet further embodiments, the invention is directed to sorption (adsorption or absorption) devices, comprising:

a first substrate layer;

a sorbent (sorbent or absorbent) layer disposed below the first substrate layer; at least two electrodes in contact with or in close proximity to at least one of said first substrate layer and said sorbent layer;

a second substrate layer disposed below said sorbent layer;

at least one via disposed through at least one of said first substrate layer, said sorbent layer and said second substrate layer, said at least one via being disposed between said at least two electrodes;

at least one collection port disposed through at least one of said first substrate layer, said sorbent layer and said second substrate layer;

a third substrate layer disposed over at least one of said first substrate layer and said sorbent layer; and a working fluid;

wherein said first substrate layer, said sorbent layer and said second substrate layer are co-planar; and wherein placement of said third substrate layer above said first substrate layer defines a chamber; and wherein said working fluid is recycled within said sorption cell.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings:

FIG. 9 is a schematic diagram of a cycle, the duration of the sorption-electro-kinetically biased desorption period.

FIG. 15A shows a piezo valve.

FIG. 15B shows a three-phase piezo pump capable of peristaltic action.

FIG. 18 shows a schematic diagram of high aspect ratio elements as field concentrators for ionization.

FIG. 21 shows a schematic diagram of inductors of conductive high aspect ratio elements ("whiskers").

DETAILED DESCRIPTION OF THE INVENTION

Figure 1A:
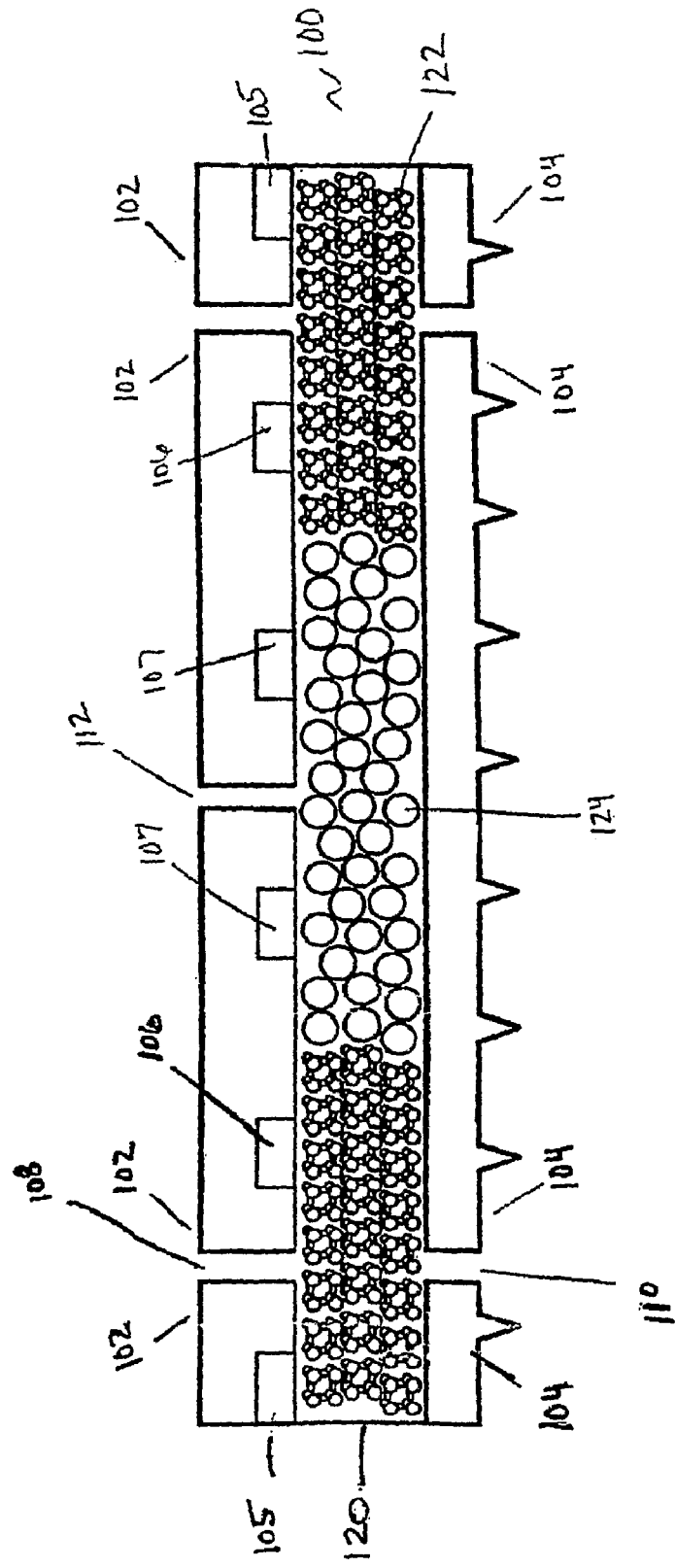
FIG. 1A illustrates a generalized representation of a meso-frequency traveling wave electro-kinetic adsorption unit in accordance with an embodiment of the invention.

The invention relates to a non-mechanically cycled, non-binary, electrokinetic device and system capable of use in purification/separation, reaction, heating, cooling, and/or refrigeration/heat pump and/or vacuum pump processes. In particular, the below-described sorption (adsorption or absorption) system can be used for fine or bulk chemical separations and/or reactions of liquid and gaseous materials. Similarly, the sorption (adsorption or absorption) system can be readily adapted to function as a refrigeration/heat pump unit for use in heating and cooling systems. This reusable sorption (adsorption or absorption) system provides high efficiency purification and/or cooling/heating with low energy demands and preferably with no moving parts. The invention can function alone as single unit or multiplexed, used in parallel, or used in series with other similar such sorption units. Accordingly, the invention departs radically from other traditional sorption (adsorption or absorption) systems.

The invention provides sorbent methods, devices, and systems capable of continuous non-cyclic operation without large quantities of sorbent and/or the valving requirements typically associated with such systems. In fact, the invention reduces the quantity of sorbent required to an absolute minimum relative to traditional swing sorption (adsorption or absorption) systems discussed above. Furthermore, the invention does not rely on large pressure and/or temperature differentials to operate and it has no moving parts. Also, the invention uses minimal externally supplied desorption energy. The invention is also easily scalable; thus, it can be manufactured and used by simple duplication and selective arrangement of individually functioning and self-contained sorption (adsorption or absorption) cells.

The invention is capable of separating multiple or individual components from complex mixtures. Additionally, the invention can readily be configured to function as a vapor-condensing refrigeration/heat pump as well as a dehumidifying unit.

Pressure, temperature, and electrical swing sorption (adsorption or absorption) systems generally rely on a heat rejection period so that the heat of sorption can be dissipated before the next sorption cycle. A variety of methods are used to cool the sorbent (sorbent or absorbent)sorbent.

While not wishing to be bound by theory, the invention is believed to operate in the following manner:

If an individual sorption site is considered it will be understood that there is a threshold condition at a given pressure above which sorption cannot occur. On a microscopic scale, when a fluid, such as a gas, is sorbed, its kinetic energy is reduced by transferring the energy to the sorbent structure. This energy transfer produces vibration energy in the relatively large sorbent structure. Desorption may be effected by supplying additional energy to the sorbent structure or reducing the pressure in the surrounding environment in which the sorption occurred. If the vibrational energy of the sorbent structure is not permitted to completely dissipate (for example, by translation to adjoining structures or components), it may be beneficially employed as desorption energy. Accordingly, the energy needed to be added to the sorption structure for desorption will be reduced. Furthermore, the shorter the time interval between the steps of sorbing and desorbing, the faster the cycle occurs, and the less amount of energy is lost to adjoining structures or components. Thus, the invention takes advantage of the short cycle time to avoid or reduce heat conduction and use it for the desorption. The invention also utilizes small structures, such as microchannels, that advantageously favor fast cycles due to short paths for sorption, desorption, and purging.

The invention further utilizes desorption energy provided by, inter alia, conducting electrical energy through the sorbent structure, radiating electromagnetic energy toward the sorbent structure, transferring vibrational energy from a piezo-electric material within and/or adjacent to the sorbent structure to the sorbent structure or by utilizing the energy received by electromagnetic receptors in contact with or adjacent to the sorbent in the sorbent structure. These systems will have the shortest cycle times and will introduce the minimum amount of superfluous energy.

The rapid cycle methods, devices, and systems are more efficient both in terms of material usage and energy input because they approach the ideal of a non-cyclic, or continuous, sorption system. The throughput of the devices and systems of the invention is limited not by vessel size, sorbent quantity, or cycle time, but by the ability of the device to balance the tortuous or mixing flow through the unit volume of sorbent, with the concurrent electro-kinetically induced removal of sorbate in a direction different than the direction of the flow of the fluid mixture. As the dynamic electric field, such as electro-kinetic traveling wave, sweeps the sorbent volume, sorbate-sorbent bonds are broken and the desorbed components are electro-kinetically removed, creating new sorption sites. If the feed flow rate is too high, then there is insufficient time for a component to actually sorb. If the turbulent flow rate is too low, then the electro-kinetic forces cannot effectively segregate the sorbate, and the convective force of re-entrainment is more dominant. Determining the optimum flow rate depends on the size of the device or system and the type of fluid mixtures to be separated and/or reacted or the fluid to be used as refrigerant, inter alia. One skilled in the art would know how to determine useful and optimum flow rates depending upon the type and size of device or system utilized. The trajectories of sorbate ions liberated by electron or phonon stimulated desorption can be determined and modified by the orientation of a crystalline sorbent, and by the application of an external electric field.

Figure 7:
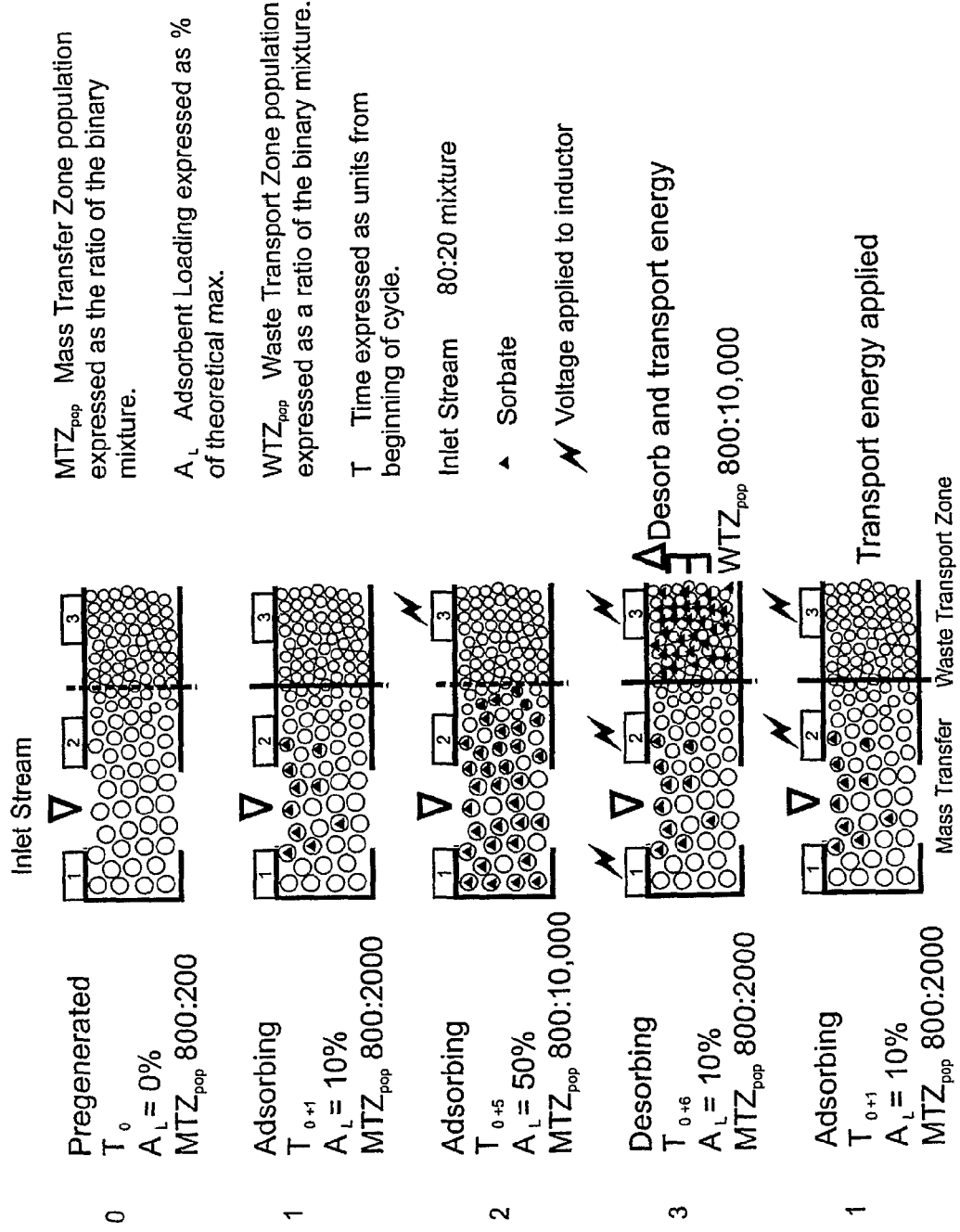
FIG. 7 is a schematic diagram showing one embodiment of the method of the invention for separating a 80:20 mixture provided by an inlet stream, where the device contains a sorbent for the material present at 80% by weight, based on the total weight of the mixture, and electrodes to provide the electrokinetic biasing of the desorbed material. The device may be function to continuously adsorb the sorbate.

For example, a mixture containing 200 molecules of oxygen ($O_2$) and 800 molecules of nitrogen ($N_2$). The mixture is passed over an oxygen-selective sorbent. The volume containing the sorbent and interstitial spaces become increasingly populated with oxygen molecules because they are moving from a gas phase to a solid phase, where the same volume may contain hundreds of times the number of molecules. When desorption is induced and the waste stream is biased toward a different exit via, the volume now contains 800 molecules of oxygen and perhaps ten molecules of nitrogen, so the waste stream is 92.5% oxygen and a purification has been effected as shown in FIG. 7 (where the ratio at desorption is the sorbate mix).

Definitions

The following definitions are provided for the full understanding of terms used in this specification.

As used herein, the term "MCAT" refers to meso-frequency continuous adsorption technology.

As used herein, the terms "separation" and "separating" mean the act or process of isolating or extracting from or of becoming isolated from a mixture (a composition of two or more substances that are not chemically combined).

As used herein, the terms "purification" and "purifying" means the act or process of separating and removing from anything that which is impure or noxious, or heterogeneous or foreign to it.

As used herein, the term "refrigeration" means the act or process of cooling a substance.

As used herein, the term "heat pump" means a device that transfers heat from a region/environment/medium at a lower temperature (heat source) and moves it to a region/environment/medium at a higher temperature (heat sink). A heat pump may be used to heat and/or cool.

As used herein, the term "continuous" when used in reference to the method or device of the invention refers to or utilizes a process that does not cycle between vessels, but includes methods or devices that have periodicity.

As used herein with respect heat, the term "collecting" refers to re-utilizing heat, rejecting heat, or both.

As used herein, the term "vector" means a quantity having both magnitude and direction.

As used herein, the term "electric field" refers to a force field which defines what acceleration an electric charge placed at rest at any point in space will feel. Electric charges cause electric fields around them, which then apply a force to any other electric charge placed in the field. The electric field E has both a magnitude and a direction at each point in space, and the magnitude and direction of the resulting force on a charge q at that point is given by $F=qE$.

As used herein, the term "dynamic electric field" refers to an electric field that changes over time at any given point in the region where the electric field is applied.

As used herein, the term "fluid" refers to a continuous amorphous substance that tends to flow and to conform to the outline of its container, including a liquid or a gas, and specifically includes solutions (where solids, dissolved in the liquid or gas) and suspensions (where solids are suspended in liquid or gas).

As used herein, the term "electrokinetically biasing" refers to movement caused by the application of electric energy.

As used herein, the term "cycle" refers, in one sense, to the unit of frequency or regular interval in which the direction of the electric field is reversed, or when the electric field goes from apogee to perigee to apogee. The terms "cycles" and "cycles per second" are used interchangeably throughout the application. As shown in FIG. 9, a cycle is the duration of the adsorption-electro-kinetically biased desorption period. Let us assume a period of 0.1 second duration as an example. That 0.1 second period could be divided into 0.05 second adsorption, and 0.05 second desorption sections. During the 0.05 second desorption section, a 3-phase alternating potential could be applied to the inductors. The frequency of the applied potential could be 5,000 Hz, or 5000 cycles per second and each phase would be 120 degrees out of phase with the others. The 5,000 Hz alternating potential could be constructed by controlling the gates of a pair of insulated gate bi-polar transistors. This gate control could consist of a series of high frequency (about 1-5 MHz) pulses. By varying the duration of these on-off pulses, various waveforms of longer duration can be approximated. This can provide the simultaneous application of an optimal induction frequency, i.e., about 1-5 MHz, suitable for inducing eddy currents of hysterisis effects, of dielectric electrostatic heating effects, while simultaneously producing a traveling carrier wave of 5 KHz that is more suitable for electrokinetically accelerating the sorbate.

It should also be noted that the term "cycle," in another sense, also refers to devices that utilizes more than one chamber and sorption is effected in one chamber while desorption is effected in at least a second chamber, such as those described in the Background of the Invention.

As used herein, the term "high aspect ratio" means the ratio of length to width of an article is at least about 10:1, preferably about 100:1, and more preferably 1000:1.

As used herein, the term "open system" refers to a system that is open and accessible to the outside environment.

As used herein, the term "closed system" refers to a system that is not open and accessible to the outside environment.

As used herein, the term "portable" refers to a device that may be capable of being carried or moved. Preferably, the term refers to a device that may be carried by an adult or child with little or no effort. However, the term also refers to a device that is not permanently affixed to a permanent structure and is of sufficiently low mass and bulk that it may be easily transported as part of a vehicle or transportation device.

As used herein, the term "plasma" refers to a gas containing positively charged, negatively charged particles, and neutral particles, with approximately equal concentrations of both positive and negative charges such that the overall gas is approximately charge neutral. A plasma may be produced from a gas if enough energy is added to cause the electrically neutral atoms of the gas to split into positively and negatively charged atoms and electrons.

As used herein, the term "thermal plasma" refers to a plasma where the temperature of electrons and heavy particles approach each other, and a state of local thermodynamic equilibrium exists. As used herein, the term "non-thermal plasma" refers to a plasma where there are large departures from equilibrium conditions, and electron temperatures are much higher than the neutral or ion species temperatures. This is considered a non-thermal or not in thermal equilibrium plasma. Non-thermal plasmas can exist at room temperature and normal atmospheric pressure.

As used herein, "piezoelectric material" refers to a material that exhibits Perovskite crystal structure that experiences elastic strain when an electrical current is applied to it. It produces electric current when pressure is applied it; these materials exhibit the Perovskite crystal structure.

As used herein, the term "inductor" refers to a suitably shaped, electrically conductive or semi-conductive material whose primary purpose is to create a static or dynamic electric field by virtue of its shape, topography, materials of construction, or proximity to other inductors, electrodes, or materials, and by virtue of the electrical potential, current, waveforms, and frequency that is carried through, by, or on it. In these instances, an inductor may interact with its environment in a non-contact manner. When an inductor acts to produce a non-thermal plasma, it may be in contact with the plasma and neutral species, or a dielectric material may intervene. Inductors may contain topographic features such as high aspect ratio components that produce regions of intensified electric field, thereby producing ionization at reduced voltages. Inductors may contain electron emission enhancing materials such as thoriated tungsten. Inductors may also be manufactured in conjunction with other materials to improve their performance, i.e., electron emissions can be triggered from a ferroelectric ceramic by the application of a high voltage to an inductor deposited directly on its surface.

As used herein, the term "bus" refers to an electrical conductor that makes a common connection between components or circuits.

As used herein in connection with the desorption step, the term "substantially non-thermal" means that the desorption mechanism does not rely on thermal energy to stochastically heat the sorbent structure to the degree sufficient to break the bonds between the sorbate and sorbent molecules. Thus, while some isolated, localized heating of the sorbent structure may occur during the desorption reaction, the temperature of the sorbent structure should remain statistically below the threshold temperature for thermal desorption to take place. One method for determining whether a particular desorption reaction is either thermal or substantially non-thermal is to measure the bulk temperature of the sorbent structure during the desorption cycle. If the bulk temperature of the sorbent structure during desorption is greater than the known temperature which is required to effect a thermal or heat-activated desorption, then the reaction (the desorption) is thermal. However, if the bulk temperature of the sorbent structure during the desorption reaction is less than the temperature required to effect the thermal desorption, the reaction may or may not be thermal. In this event, the velocity distribution of the desorbed sorbate molecules may be analyzed to determine whether the desorption reaction is substantially non-thermal. The molecular velocity distribution can be determined by, for example, using time-of-flight spectroscopy to produce a time-resolved distribution of the fluorescence intensities of a characteristic molecular beam. Then, using a Fourier transform, the molecular velocity distribution can be extracted from the fluorescence data. Since it is known that in a non-thermal process the velocity distribution of the desorbed sorbate molecules should be primarily non-Maxwellian, by analyzing the time-of-flight spectroscopy data, the thermal/non-thermal nature of the desorption process may be determined.

As used herein, the term "heavy metal" refers to any metal having a density of at least about 5.0 $g/cm^3$.

As used herein, the term "substantially perpendicular" refers to two lines or a line or plane that are between about 80° and about 110° to each other.

As used herein, the term "substantially square wave" refers to a wave form having a combined rise and decay time duration that is less than about 20% of the total wave form duration.

As used herein, the term "substantially triangular wave" refers to a wave form having a substantially linear rise and decay.

As used herein, the term "substantially sinusoidal wave" refers to a smooth wave form having a periodic oscillation of about the same frequency, where the wave form rises and falls smoothly and symmetrically, following the trigonometric formula for the sine function.

As used herein, the term "matrix structure" refers to a geometrically ordered structure.

As used herein, the term "induction heating" refers to heating that occurs as a result of hysterisis losses and/or eddy current losses, as described in Curtis, Frank W. *High Frequency Induction Heating*, Lindsay Publications, Bradley, Ill. 1987. Induction heating is generally accepted to occur between about 60 cycles/second and about 1,000,000 cycles/second.

As used herein, the term "dielectric electrostatic heating" refers to a process whereby high frequency, i.e., greater than about 1,000,000 cycles/second, alternating currents are applied to a dielectric material to create a rapidly changing electric field. The molecules of the dielectric material continuously try to align themselves with the reversal or change in the impressed electric field. The resultant vibrational energy can develop sensible heat.

As used herein, the term "hysterisis losses" refers to losses caused by the friction of adjacent molecules in a given material, when these molecules are caused to vibrate in an attempt to align themselves to the frequency of a magnetic field.

As used herein, the term "eddy current losses" refers to resistance losses resulting from small circulating currents within the material.

Reference will now be made in detail to the preferred embodiments of the invention, examples of which are illustrated in the drawings and the examples. This invention may, however, be embodied in many different forms and should not be construed as limited to the embodiments set forth herein. In addition and as will be appreciated by one of skill in the art, the invention may be embodied as a product, method, system or process.

In one embodiment, the invention is directed to methods of separating components of a fluid mixture, comprising the steps of:

providing a fluid mixture comprising a first component and a second component;

providing a sorbent structure comprising at least one sorbent (either an adsorbent or an absorbent);

sorbing said first component onto said sorbent;

desorbing said first component; and electrokinetically biasing said first component in a direction other than the vector of said fluid mixture.

In another embodiment, the invention is directed to methods of producing at least one reaction product, comprising the steps of:

providing a fluid mixture comprising a first component;

providing sorbent structure comprising at least one sorbent (either an adsorbent or absorbent and at least one catalyst;

sorbing said first component onto said sorbent;

catalyzing a reaction of said sorbed first component to form at least one sorbed reaction product;

desorbing said sorbed reaction product; and electrokinetically biasing said desorbed reaction product in a direction other than the vector of said fluid mixture.

In further embodiments, the invention is directed to methods of analyzing the components of a fluid mixture, comprising the steps of:

providing a fluid mixture comprising a first component and a second component;

providing a sorbent structure comprising at least one sorbent;

sorbing said first component onto said sorbent;
desorbing said first component;
electrokinetically biasing said first component in a direction other than the vector of said fluid mixture; and
analyzing said desorbed first component.

In further embodiments, the invention is directed to methods of analyzing the components of a fluid mixture, comprising the steps of:
providing a fluid mixture comprising a first component and a second component;
providing a sorbent structure comprising at least one sorbent;
sorbing said first component onto said sorbent;
desorbing said first component;
electrokinetically biasing said first component in a direction other than the vector of said fluid mixture;
collecting an exhaust fluid stream enriched in said second component and depleted in said first component; and
analyzing said exhaust fluid stream.

In other embodiments, the invention is directed to methods of controlling temperature, comprising the steps of:
providing a fluid comprising a first component;
providing a sorbent structure comprising at least one sorbent (either an adsorbent or an absorbent) in a container;
adsorbing said first component onto said absorbent;
desorbing said first component;
electrokinetically biasing said first component and moving said first component in a direction other than the vector of said fluid;
condensing said first component;
evaporating said condensed first component; and
re-adsorbing said evaporated first component onto said sorbent.

In another embodiment, the invention is direction to sorption devices (adsorption devices and absorption devices), comprising:
an electrokinetic biaser; and
a sorbent structure comprising at least one sorbent (sorbent or absorbent).

In yet other embodiments, the invention is directed to systems, comprising at least one sorption (either adsorption or absorption) device described above.

In other embodiments, the invention is directed to sorption units (either adsorption units or absorption units), comprising:
a first substrate layer;
a sorbent layer (either an adsorbent layer or an absorbent layer) disposed below the first substrate layer;
at least two electrodes in contact with or in close proximity to at least one of said first substrate layer and said sorbent layer;
a second substrate layer disposed below said sorbent layer;
at least one via disposed through at least one of said first substrate layer, said sorbent layer and said second substrate layer, said at least one via being disposed between said at least two electrodes; and
at least one collection port disposed through at least one of said first substrate layer, said sorbent layer and said second substrate layer;
wherein said first substrate layer, said sorbent layer and said second substrate layer are co-planar.

In yet further embodiments, the invention is directed to sorption devices, comprising:
a first substrate layer;
an sorbent layer (either an adsorbent layer or an absorbent layer) disposed below the first substrate layer; at least two electrodes in contact with or in close proximity to at least one of said first substrate layer and said sorbent layer;
a second substrate layer disposed below said sorbent layer;
at least one via disposed through at least one of said first substrate layer, said sorbent layer and said second substrate layer, said at least one via being disposed between said at least two electrodes;
at least one collection port disposed through at least one of said first substrate layer, said sorbent layer and said second substrate layer;
a third substrate layer disposed over at least one of said first substrate layer and said sorbent layer; and
a working fluid;
wherein said first substrate layer, said sorbent layer and said second substrate layer are co-planar; and
wherein placement of said third substrate layer above said first substrate layer defines a chamber; and wherein said working fluid is recycled within said sorption cell.

In yet further embodiments, the invention is directed to sorption devices, comprising:
a first substrate layer, and sorbent layer disposed below the first substrate layer;
at least two inductors not in contact with said sorbent layer;
a combination of inductors not in contact with an sorbent layer; and electrodes in contact with a conductive or semi-conductive sorbent layer.

The methods, devices, and systems of the invention are substantially more efficient than conventional TSA-type and PSA-type systems, especially for small scale devices. Preferably, the ratio of $$\frac{\text{sorption sites per cubic centimeter}}{\substack{\text{moles of said first component separated} \\ \text{from said mixture per second}}}$$

is less than about $6.1 \times 10^{22}$, and more preferably, less than about $6.1 \times 10^{20}$.

In preferred embodiments of the methods of the invention, the desorbing step and the electrokinetically biasing step occur substantially simultaneously. Preferably, the first component is electrokinetically biased in a direction substantially perpendicular to the vector of said fluid mixture.

The desorbing step or electrokinetically biasing step may be effected by applying to the sorbent structure at least one of a dynamic electric field, static non-homogeneous electric field, quasi-static electric field, electromagnetic energy, vibrational energy from a piezoelectric material, electrical conduction, ion bombardment, electron bombardment, or a combination thereof. In preferred embodiments, the desorbing step and electrokinetically biasing step occur substantially simultaneously or, alternatively, occur by the application of the same means. For example, in certain preferred embodiments, both the desorbing step and the electrokinetically biasing step are effected by a dynamic electric field.

A desorbing and/or electro-kinetic biasing step may be effected by the application of a static non-homogeneous electric field. Such electric fields may be created, for example, by altering the size and orientation of the inductors, by altering the electrical permittivity of an intervening dielectric material, or by altering the inductor material resistance.

A quasi-static (non-traveling wave) electric field may be effected by the application of a single phase alternating current electric potential to asymmetrical multiple inductors, or to multiple inductors having individually disparate, inductive, capacitive, or resistive properties. The properties, and the properties of intervening materials, can cause phase shifts in the electric fields generated by single phase currents applied to multiple inductors.

The dynamic electric field may be continuous or intermittent, and may be produced by a traveling electric field, a traveling electric wave, an electric field flux, a voltage spike, a multiphase electromotive potential, traveling electrostatic wave, or a combination thereof.

In certain embodiments, the traveling electric field is produced by mechanical movement of an electric field generator, especially where the sorbent device is in close physical proximity to said electric field generator.

In preferred embodiments, the methods of the invention may further comprise the step of: collecting said desorbed first component.

In certain preferred embodiments, the methods of the invention may further comprise the step of: collecting an exhaust fluid stream enriched in the second component and depleted in the first component.

In other preferred embodiments, the method of the invention may further comprise the step of: collecting a heat of sorption generated by said sorbing step.

In preferred embodiments, the dynamic electric field ionizes or polarizes at least a portion of said first component to form an ionized first component. In other preferred embodiments, the dynamic electric field produces a non-thermal plasma. In yet other preferred embodiments, the desorbing step comprises an induced electron transition.

In preferred embodiments, the method further comprises the step of generating a plasma. Preferably, the plasma is a substantially non-thermal plasma.

In preferred embodiments, the desorbing step is substantially non-thermal.

In certain embodiments, eddy or hysterisis currents heat a material adjacent to the sorbent.

In certain embodiments, the desorbing step is effected at the apex of said dynamic electric field. In other preferred embodiments, the desorbing step is effected continuously during the application of said dynamic electric field.

For traveling electric waves, preferably the wave is a substantially square wave, a substantially triangular wave, or a substantially sinusoidal wave.

The dynamic electric field or static electric field may produced by at least two inductors, preferably electrodes, preferably arranged in a parallel or concentric geometry.

The dynamic electric field may produced by polyphase current.

The electrodes suitable for use in the methods, devices, and systems of the invention comprise at least one conductive material, such as at least one metal, metal oxide, conductive ceramic material, conductive polymeric material, or an alloy or combination thereof. In general, the electrodes may be any type of metallic conductor provided that the material is suitable for the operating environment (e.g., adequate resistance of corrosion). The metal or metal oxide may be rhodium, palladium, chromium, thoriated tungsten, barium oxide, strontium oxide, copper, silver, gold, or alloy or combination thereof. The conductive ceramic material may be a ceramic composite comprising $TiB_2$, TiC, BN, Nb, zirconia, or a combination thereof. The conductive polymeric material may be polymeric material characterized by an interchain electron transfer, valence, conduction band populations, P-type doping, N-type doping, or a combination thereof.

In preferred embodiments, the electrodes are coated to impede the generation of spark over arcing, such as by contacting or at least partially coating the electrodes with a high dielectric barrier, such as bismuth titanate.

Preferably, the conductive material is a high aspect ratio conductor or the conductive material comprises at least one high aspect ratio conductor. The high aspect ratio conductor may be a conductive polymeric fiber, conductive ceramic fiber, carbon nanotube, non-carbon nanotube, nanowhiskers, or a combination thereof. The conductive polymeric fiber is preferably crystalline. The conductive polymeric fiber may be a conductive acrylic fiber. The high aspect ratio conductor is a single-wall carbon nanotube, a multi-wall carbon nanotube, or a exohydrogenated zig-zag nanotube. Preferred nanowhiskers include $SnO_2$ nanowhiskers.

Preferably, the high aspect ratio conductor is constructed or formed by chemical vapor deposition, plasma etching, or other method that creates a topography that concentrates an electric field.

The dynamic electric field may be produced by an alternating current, by an oscillating direct current, or a combination thereof. Preferably, the dynamic electric field is produced by an alternating current to avoid breakdown of the adsorbate via electrolysis.

The dynamic electric field cycles, preferably at a frequency of about 60 cycles/second to about 5,000,000 cycles/second, more preferably, at a frequency of about 1,000 cycles/second to about 1,000,000 cycles/second, even more preferably, at a frequency of about 2,000 cycles/second to about 50,000 cycles/second, yet even more preferably, at a frequency of about 5,000 cycles/second to about 10,000 cycles/second.

In preferred embodiments, the dynamic electric field cycling at about 60 cycles/second to about 5,000,000 cycles/second is turned on and off about one time/second to about 10,000 times/second, preferably, about 10 times/second to about 10,000 times/second, and, more preferably, about 100 times/second to about 1,000 times/second.

In preferred embodiments where there are opposing sorptive devices or opposing sorptive structures within a single device, the dynamic electric field is alternately applied to the opposing sorptive devices or opposing sorptive structures to create an acoustically attenuated pneumatic resonance. Preferably, the acoustically attenuated pneumatic resonance causes a pressure change that aids in said sorbing step, said desorbing step, or both.

In preferred embodiments where there are opposing sorptive devices or opposing sorptive structures within a single device, the dynamic electric field is alternately applied to the opposing sorptive devices or opposing sorptive structures to create an electrically balanced reactive load.

The heat of sorption may be preferably collected on a heat exchange component. In preferred embodiments, the heat of sorption is dissipated by convection. The heat exchange components may comprise metal, alloy, metal composite, alloy composite, matrix structure, thermally conductive plastic, thermally conductive polymer, ESA (electrostatic self assembly)-formed material, or a combination thereof.

The sorbent structure comprises at least one sorbent (either sorbent or absorbent). Almost all of the sorbents currently in use, and being developed, are suitable for inclusion into the architecture of the invention. One limitation is that the sorbent may not interfere with the induction of the dynamic electric field. Sorbents may be mixed or layered to enhance selectivity or afford a multiplicity of sorption mechanisms. Preferably, the sorbent has a thermal conductivity of greater than about 0.276 W/cm-K, or is in intimate contact with a thermally conductive material.

Suitable sorbents for use in the methods, devices, and systems of the invention include, but are not limited to, is activated carbon, graphite, activated alumina, a molecular sieve, aluminophosphate material, silicoaluminophosphate material, zeolite, faujasite, clinoptilolite, mordenite, metal-exchanged silico-aluminophosphate, uni-polar resin, bi-polar resin, aromatic cross-linked polystyrenic matrix, brominated aromatic matrix, acrylic polymer, acrylic copolymer, methacrylic polymer, methacrylic copolymer, hydroxyalkyl acrylate, hydroxyalkyl methacrylate, adsorbent carbonaceous material, adsorbent graphitic material, carbon fiber material, nanotube, nano-material, adsorbent metal salt (such as perchlorate and oxalate), alkaline earth metal metallic particles, ion exchange resin, linear polymers of glucose, polyacrylamide, or a combination thereof. The zeolite may be an ion exchanged metal zeolite, hydrophilic zeolite, hydrophobic zeolite, modified zeolites metal-ion exchanged zeolite, natural X-type zeolite, modified X-type zeolite, A-type zeolite, mordenite-type zeolite, chabazite-type zeolite, ion exchange resin, bioselective sorbent, or a combination thereof.

Sorbent-sorbate reaction compounds should be selected from a three-dimensional matrix defined by the sorbent intoxicated electrical conductivity or permittivity or reactance, the thermal diffusion rate, and the mass diffusion rate. Preferred sorbents are molecular sieves of the aluminophosphate and silicoaluminophosphate types, and metal substituted aluminophosphate and silicoaluminophosphate molecular sieves, as well as carbon and graphitic-based sorbents, especially as part of a polymer matrix.

The sorbent structure may further comprise at least one support. Preferably, at least a portion of the sorbent is adhered to or embedded in the support. Preferably, the support is a series of micro-channels, laminar, a porous electrode; a series of concentric layers, or a combination thereof. Preferably, the sorbent structure is a microporous structure in one direction and, more preferably, the sorbent structure is macroporous structure in a direction different than the direction of the microporous structure. In preferred embodiments, the desorbed first component moves in the microporous structure and the mixture moves in the macroporous structure.

In certain embodiments, the individual particles of the sorbent structure comprising the sorbent and support or sorbent alone (collectively referred to herein with respect to particles size as "sorbent") have a particle size such that the pressure differential between the microporous direction and macroporous direction is less than about 10 Pascals at a sorption cycle time of greater than about one millisecond at standard temperature and pressure.

In certain embodiments, the individual particles of the sorbent structure comprising the sorbent and support or sorbent alone (collectively referred to herein with respect to particles size as "sorbent") have a particle size of less than about 3,400 nm, preferably, less than about 340 nm, and more preferably, less than about 34 nm.

In certain embodiments, the sorbent structure is a form of a super crystalline lattice and the intracrystalline pore length of the super crystalline lattice is less than about 3,400 nm, preferably, less than about 340 nm, and more preferably, less than about 34 nm.

Suitable supports for use in the methods, devices, and systems of the invention include, but are not limited to, natural clay, calcined clay, modified clay, chemically treated clay, chemically modified clay, smectite clay, kaolin clay, sub-bentonite clay, kaolin-halloysite clay, kaolin-kaolonite clay, kaolin-nacrite clay, kaolin-anauxite clay, binary matrix material, tertiary matrix material, silica-thoria, silica-alumina, silica-alumina-thoria, silica-alumina-zirconia, fibrous material, colloidal silica material, colloidal alumina material, colloidal zirconia material, colloidal mixture, surface modified amorphous silicon dioxide nanoparticles, hydrated magnesium aluminum silicate, thermoplastic polymer, thermosetting polymer, ferrous support, non-ferrous support, electrically-conductive support, dielectric support, electromagnetic receptor, or a combination thereof. The support may be applied by sintering, pyrolysis, slurrying, vapor deposition, casting, electro-spraying, electrophoretic deposition, extrusion, laser deposition, electron beam deposition, silk screening, photo-lithography deposition, electrostatic self-assembly, high aspect ratio micromachining, LIGA-formation, atomic layer deposition, casting, stamping, or a combination thereof.

In preferred embodiments, the sorbent structure further comprises at least one high aspect ratio conductor. The high aspect ratio conductor may be conductive polymeric fiber, conductive ceramic fiber, carbon nanotube, non-carbon nanotube, nanowhiskers, or a combination thereof. Preferably, conductive polymeric fiber is crystalline or conductive acrylic fiber. Preferably, the high aspect ratio conductor is a single-wall carbon nanotube, multi-wall carbon nanotube, or a exohydrogenated zig-zag nanotube. Preferred nanowhiskers include $SnO_2$ nanowhiskers.

In certain embodiments, the sorbent structure comprising a conductive material utilizes surface effects to stimulate said sorbing step, said desorbing step, or a combination thereof.

In certain embodiments, the sorbent structure comprising a non-conductive material utilizes acoustic phonon interaction with a crystal lattice to stimulate said desorbing step.

In preferred embodiments, the sorbent structure further comprises at least one piezoelectric material, or ferroelectric material, including relaxor ferroelectric materials, to inducing desorption by receiving electromagnetic radiation. The piezoelectric material or ferroelectric material is a fiber, a particle, a nanoparticles, or a combination thereof. Suitable piezoelectric material or ferroelectric material include, but are not limited to, lead-zirconate-titanate, barium titanate, lead zirconate, lead titanate, Rochelle salt, quartz, polyvinylidene fluoride homopolymer, polyvinylidene fluoride copolymer, polyparaxylene, poly-bischloromethyloxetane, aromatic polyamide, polysulfone, polyvinyl fluoride, synthetic polypeptide, cyanoethyl cellulose, or a combination thereof.

In preferred embodiments, the sorbent structure further comprises a receiver or reflector of electromagnetic energy. In certain embodiments, the receiver or reflector of electromagnetic energy converts the electromagnetic energy to heat or vibrational energy and transfers the heat or vibrational energy to the sorbent. In other embodiments, the receiver or reflector of electromagnetic energy converts the electromagnetic energy to fluorescent or luminescent radiation and transfers the fluorescent or luminescent radiation to the sorbent.

In certain preferred embodiments, sorbent structure comprises at least two different sorbents, wherein each of the sorbents is selective for a different component of the mixture. Preferably, the electrokinetically biasing moves each of the desorbed components in a direction different than the direction of the vector of said fluid mixture and each of said other components. The adsorbed components may be simultaneously or sequentially desorbed.

There are a number of mixtures that may be separated into their component parts or purifying to removed unwanted components. Among the mixtures that may be separated by the methods, devices, and systems of the invention include:

air
to separate oxygen, nitrogen, argon, and/or carbon dioxide; and/or to remove water, volatile organic compounds (including aromatic hydrocarbon compounds, such as benzene, cumene, xylene, toluene, and styrene; alkanes such as butane; cycloalkanes; halogenated hydrocarbons such as trichloroethylene, methylene chloride, and Freon; alcohols; esters; aldehydes such as formaldehyde; ketones; ethers; glycol ethers; amides; phenols; or a mixture thereof, and the like); indoor air pollution (including formaldehyde, ammonia, and carbon dioxide); airborne biological toxins (such as a virus, a bacterium, a fungus, a mycotoxin (T2), a satratoxin (H), a trichothecene mycotoxin, an aflatoxin, ricin, and the like and combinations thereof), radioactive material (such as radon, thoron, actinon, krypton, deuterium, tritium, carbon-11, nitrogen-13, fluorine-18, iodine-123, iodine-125, technetium-99m, technetium-95, indium-111, copper-62, copper-64, gallium-67, gallium-68, xenon, mercury, strontium-90, cesium-137 and the like and combinations thereof), and the like.

semiconductor fabrication process exhaust;

combustion exhaust (such as vehicle exhaust or boiler exhaust to remove carbon monoxide, an oxide of nitrogen, sulfur dioxide, and/or ozone);

an aqueous mixture
  to remove volatile organic compounds (including aromatic hydrocarbon compounds, such as benzene, cumene, xylene, toluene, and styrene; alkanes such as butane; cycloalkanes; halogenated hydrocarbons such as trichloroethylene, methylene chloride, and Freon; alcohols; esters; aldehydes such as formaldehyde; ketones; ethers; glycol ethers; amides; phenols; or a mixture thereof); indoor air pollution (including formaldehyde, ammonia, and carbon dioxide); waterborne biological toxins (such as a virus, a bacterium, a fungus, a mycotoxin (T2), a satratoxin (H), a trichothecene mycotoxin, an aflatoxin, ricin, and the like, and combinations thereof), radioactive material (such as radon, thoron, actinon, krypton, deuterium, tritium, carbon-11, nitrogen-13, fluorine-18, iodine-123, iodine-125, technetium-99m, technetium-95, indium-111, copper-62, copper-64, gallium-67, gallium-68, xenon, mercury, strontium-90, cesium-137, and the like, and combinations thereof), heavy metals (such as mercury, chromium, cadmium, arsenic, lead, copper, uranium, plutonium, thorium, aluminum, zinc, silver, cobalt, and the like or a combination thereof), water-soluble salts (such as sodium salt, potassium salt, calcium salt, magnesium salt, barium salt, strontium salt, arsenic salt, nitrates, nitrides, iron hydroxide, and the like).

vaporized catalyst from, for example, a foundry cold box (such as sulphonic acid of an aromatic hydrocarbon selected from the group consisting of benzene, toluene, xylene, styrene, and cumene).

glycol from, for example, process vents at glycol dehydration stems in oil and natural gas production facilities mixtures of air, natural gas, liquid propane, inert gas, organic solvent, unsaturated hydrocarbon gas, and the like with water;

natural gas to remove any natural gas liquid or condensate, including, but not limited to, methane, water, carbon dioxide, nitrogen, hydrogen sulfide, or a mercaptan;

mixture of a linear alkane, a branched alkane, or a cyclic alkane to separate each type of alkane;

landfill emissions to remove methane and/or carbon dioxide.

Bodily fluids may be sorbed and manipulated with electrokinetic forces. For instance, a protein, such as bovine serum albumin (BSA), may be adsorbed onto the surface of 1 µm polystyrene microspheres. Sorption may be enhanced by manipulating the pH of the fluid. Precursor materials can be adsorbed to provide sites for other poorly adsorbed materials, i.e., goat antimouse polyclonal antibodies (PoAb) can be attached to microspheres to assist the capture of monoclonal antibodies (MoAb).

Using the methods, systems, and devices of the invention, artificial organs may be built whose function is to remove certain moieties from bodily fluids, liquids, or gases. Alternatively, toxins generated by disease, allergic reaction, or poisoning, or as byproducts of therapy could be removed on an "as-needed" or continuous basis by a surgically implanted or external device. Furthermore, the methods, systems, and devices of the invention may be used to remove respiration products from blood.

Support resins for biological separations may be prepared from, for example, linear polymers of glucose, such as dextran and cellulose, and from synthetic gels such as polyacrylamide and hydroxyalkyl methacrylate. Separations are usually based on ion exchange sorption, hydrophobic interactions, affinity interactions, immobilised metal ion sorption, and size exclusion filtration. Affinity interactions can be made bio-specific by attaching appropriate ligands to the support media. (Reference: Biochemical Separations CE4 *Adsorption and Chromatographic Separations* by John Hubble. www.bath.ac.uk/~cesjh/adsorb.htm).

In preferred embodiments, the methods of the invention may be used to concentrate undesirable waste products, such as radioactive waste products, thereby creating smaller quantities of waste products that must be disposed (both disposable materials and materials by which the waste is concentrated).

In preferred embodiments of the method where a reaction is carried out on the sorbent, the sorbent and said catalyst form a complex. Preferably, the first component reacts with a second component to form at least one of said sorbed reaction product. For example, hydrogen may be formed from methane and water with a suitable catalyst; ammonia may be formed from hydrogen and nitrogen with a suitable catalyst; hydrocarbons (such as those present in air pollution including an aromatic compound, alkane, cycloalkane, alkene, cycloalkane, or alkyne) may be reacted with oxygen to form carbon dioxide and water; methane and water (in the form of steam) may be reacted to produce hydrogen using platinum supported on alumina as the catalyst with a high temperature (zeolite) carbon dioxide sorbent.

In certain embodiments, the reaction method may be used to form a reaction product by eliminating a second component from adsorbed first component. For example, first component may be ethanol and water, as a second component, may be eliminated to form the reaction product of ethylene.

In certain embodiments, the mixture may comprise at least one pathogen and the ionization effected by the dynamic electric field kills the pathogen.

The cycle time for the methods, devices, and systems of the invention is based on the following factors and may be used in designing suitable configured devices and systems for carrying out the particular separation/purification and/or refrigeration/heat pump processes:

providing short diffusion paths having the minimum amount of head space (within headers, manifolds, microchannels, and the like);

providing short thermal conduction paths for removing excess heats of sorption;

making the cycle time short enough that the sorbent structure does not lose too much of its translational energy;

making the cycle time sufficiently long enough that the sorbent structure may drop to a lower vibrational state, after desorption, so that re-sorption (during the next sorption cycle) may occur; and providing and delivering desorption energy in quantities and at locations where it does not result in unnecessary heating, and only provides the minimum energy to effect desorption.

In certain preferred embodiments of the device (when used as a mixture separation device), the feed gas/fluid enters at a perpendicular to the relatively planar-located sorbent, inductors, and heat transfer interface, if used. The feed gas enters the sorbent at a location between two or several of the inductors, which can form a series of lines, or concentric polygonal or circular shapes. The moiety with the greatest attraction to the sorbent material fills the pores of the sorbent and the feed gas exits with the gas stream depleted in that moiety. The feed gas enters and exits in a path more or less perpendicular to the plane of the sorbent.

In certain preferred embodiments of the device, a multiphase electromotive potential may be impressed on the inductors located co-planar to the sorbent. The electric current traveling through the sorbent-sorbate compound provides the energy to break the sorbent-sorbate bond. The multiphase traveling wave also provides the motive force to move the now unbound sorbate, by electro-kinetic effects, in a direction parallel to the plane of the sorbent. Thus the sorbate-enriched gas is induced to move in one direction, and the sorbate-depleted gas move in a substantially different direction. A sorption system for the separation of gases or liquids is created that does not rely on cycling between separate chambers. The heat of sorption may be continuously rejected by a co-planar heat exchange material that preferably is in contact with or affixed to the sorbent, such as described in U.S. Pat. No. 5,535,817. There are various construction techniques involved in optimizing the performance of a mesofrequency traveling wave sorption system.

In certain preferred embodiments, the sorption and desorption times are controlled to maximize the retention and utilization of the heats of sorption.

Figure 8:
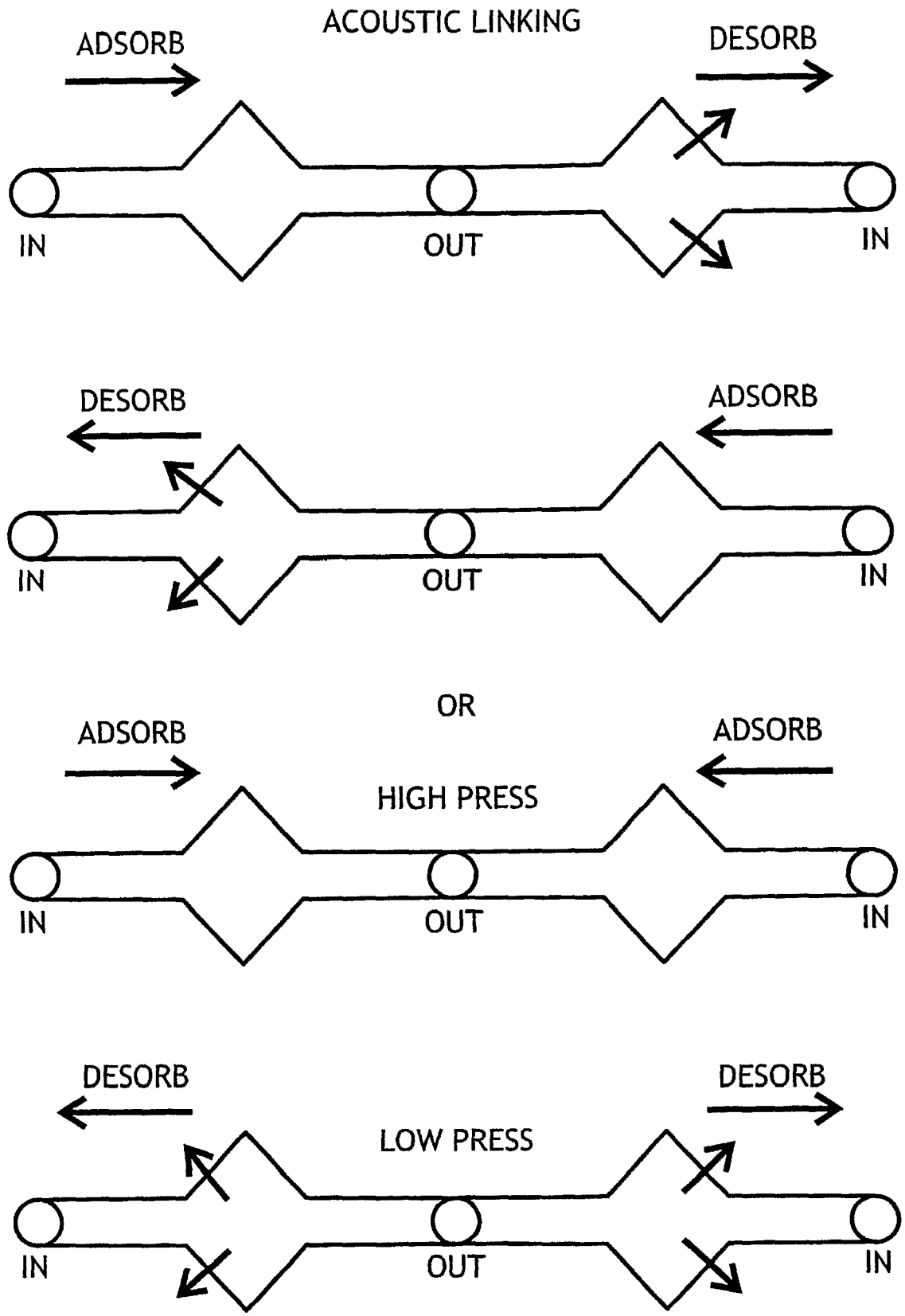
FIG. 8 is a diagram showing acoustically linking of opposing sorbent chambers.

Continuous sorption devices may temporally offset the application of desorption energy to alternating sorption areas (such as chambers). This may even out desorption pulses, may be used as an electrical energy conservation technique (such as a resonant circuit), or may be used to create a pneumatic resonance (acoustically linking opposing sorbent chambers), as shown in FIG. 8.

As described in US Patent Publication No. 2002/0122728, the shape of the traveling wave and the electrical conductivity, unless the fluid is partially ionized, of the fluid being pumped is important to the efficiency of the separation. A substantially square wave is preferred relative to a substantially triangular wave or substantially sinusoidal wave. In the methods, devices, and systems of the invention, the sorbent-sorbate compound should be selected to have its highest electrical conductivity in its intoxicated (filled) condition if desorption is effected by conduction. This causes the system to be self-regulating in that the current flow is proportional to the number of existing sorbent-sorbate bonds within the system.

In preferred embodiments of the invention, an electrohydrodynamic pump is present. When an electrohydrodynamic (EHD) pump is present in the methods, devices, and systems of the invention, the spacing of electrodes in the electrohydrodynamic pump is critical to the required applied voltage. Experimentation has shown that required separation energy is reduced when the sorbent reaction (either sorption of component or reaction of component) of the system is held adjacent to a porous EHD pumping section because a bond-breaking energy is not required to induce transverse electro-osmotic flow. U.S. Pat. No. 3,463,944 discloses inducing relative movement in a material having conductivity or temperature gradient by application of a traveling electro-quasistatic field. The energy transfer is electrohydrodynamic in nature and does not require ionization. Alternatively, ionized species may be accelerated by a polyphase or paraelectric field. U.S. Pat. No. 6,013,164 shows that inductors, such as electrodes, positioned adjacent to a porous media can effectively cause transverse osmotic flow, beneficial for the movement of the desorbed first component or reaction product away from the flowing fluid mixture. U.S. Pat. No. 4,316,233 describes using a single phase time varying voltage applied to a material with dimensions or electrical properties that vary in space. This can produce a pumping effect by production of a traveling electric field that acts on the charged particle through Coulombic effects. U.S. Pat. No. 5,669,583 discloses using linear conductors, energized sequentially, to create a plasma and accelerate the ionic and neutral species. U.S. Pat. No. 6,200,539 describes using asymmetric electrodes to create a plasma and accelerate ionic and neutral species by virtue of the electric field gradient.

In one preferred embodiment of the invention, multiplicity of microsorption chambers co-planar with the inductors, inlet-exit vias, and heat exchange surfaces is provided. Reducing the size of the reaction chambers allows the use of lower voltages at the inductor, and provides shorter mass and thermal diffusion paths. The mass diffusion rate is directly proportional to the co-planar dimensions, i.e., length and width, or diameter of the sorption reaction chamber. The thermal diffusion rate is directly proportional to the thickness of the sorption reaction chamber plane.

Figure 19:
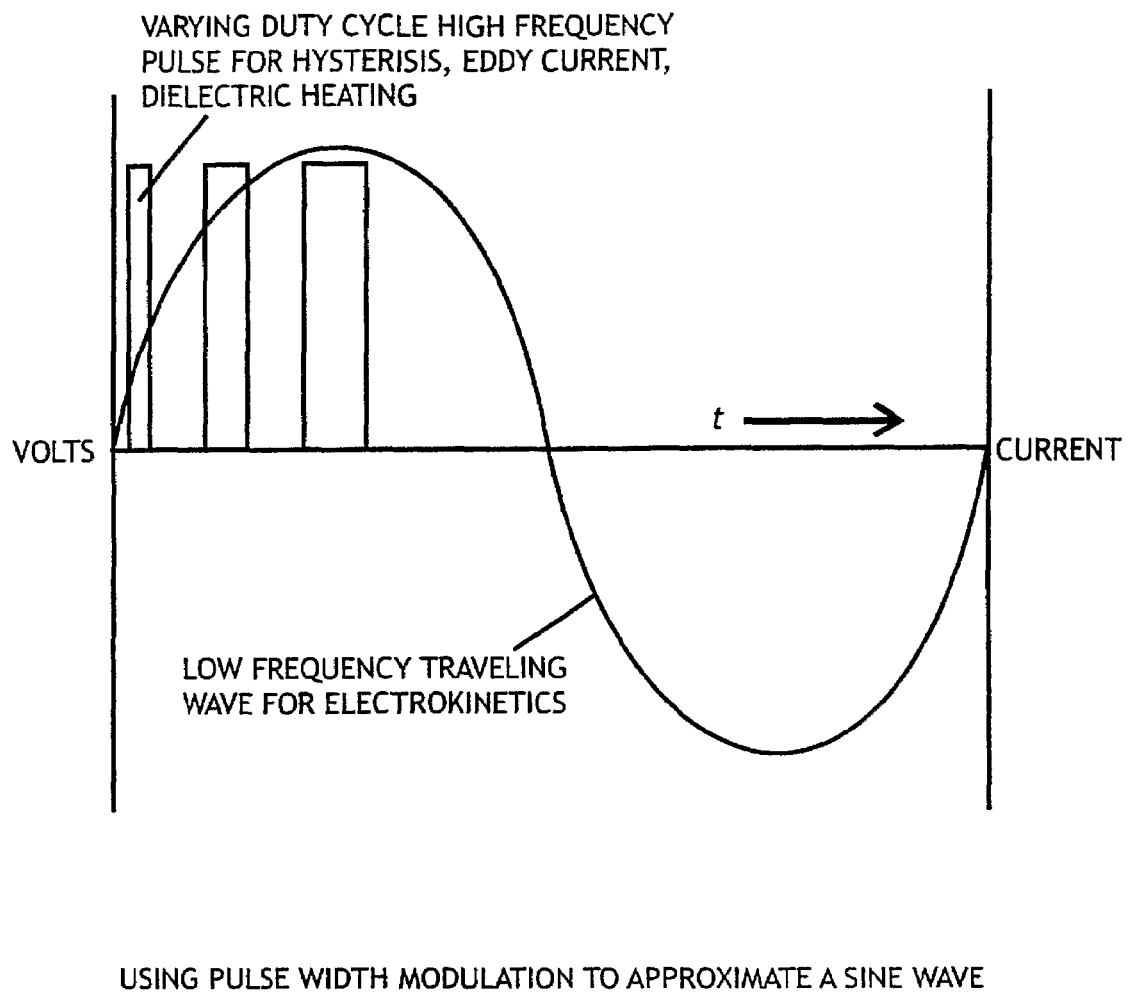
FIG. 19 shows a schematic diagram of the use of pulse width modulation to approximate a sine wave to vary the duty cycle high frequency pulse to accommodate for hysterisis, eddy current, dielectric heating, or a combination thereof.

The heat rejection surface adjacent the sorbent-sorbate reaction chamber may experience unwanted heating caused by eddy currents or hysterisis as a result of its proximity to the dynamic electric field. This unwanted heating might be ameliorated or avoided in several ways. By one means the heat exchange material may be constructed of a material less susceptible to inductive heating. If required, this non-metallic material may have its heat rejection capacity improved by interposing a liquid heat transfer medium between it and a second metallic heat exchange surface. By a second means the inductor spacing and reaction chamber thickness would be arranged such that the inductive effects are weakened at the inductor to heat exchange surface distance. By a third means the frequency is held between a range above a point where induction heating of a metallic heat exchange surface does not occur, and below which excessive dielectric heating of the non-metallic components of the reaction chamber does not occur, as shown in FIG. 19.

These are several ways by which the sorbed materials may be desorbed. These desorption drivers may be incorporated into a solid state electro-kinetically facilitated sorption separation device. Suitable ways include:

ion or electron collisions from corona discharge electrodes;

induction heating caused by eddy current losses induced in an electrically conductive substrate or sorbent compound;

inductive heating caused by hysterisis in a magnetic substrate or sorbent compound electrostatic dielectric heating caused by the application of a high frequency high voltage potential across a substantially dielectric sorbent;

conduction of a current through a resistive sorbent media or compound; and piezoelectrically (strain induced) desorption can be effected by including piezo fibers that are poled into the sorbent matrix, where application of a high voltage high frequency field causes vibration in the sorbent.

There are several means by which the desorbed component (sorbate) is caused to be separated and transported in a direction substantially different than the direction of the mixture flow:

The sorbate may be more readily ionized or polarized molecule and therefore more affected by the transverse forces produced by the dynamic electric field.

The sorbate flow may occur because the sorbent is a microporous structure in which electrokinetic transport mechanisms are more pronounced than in macroporous structures.

The residence time of the sorbate within the sorbent structure is longer than that of the non-sorbent components and therefore the electrokinetic transport forces are acting on a region having an increased population of sorbate material.

The re-adsorptive forces are stronger than the convective re-entrainment forces. Then as the sorbate is caused to desorb by the dynamic electric field, it is accelerated perpendicular to the mixture flow direction. The sorbate molecule is moved out of the flow region in one step or is incrementally adsorbed and desorbed until it is out of the flow region.

The separation mechanisms may include one or a combination of the above mechanisms that rely on an electrokinetic transport force and an electrically induced desorption energy.

The sorbate population is enriched due to the sorption time period.

High reaction rates or numbers of sorptions are achieved by the nearly continuous sorption-desorption system. Sorption-desorption is effected not by cycling between reaction chambers, but by imposing a dynamic electric field, such as a traveling wave electrical potential gradient, on an individual micro reaction chamber or a plurality of micro reaction chambers. The traveling wave biases the sorbate to desorb in a predetermined direction. Desorption may occur synchronously or asynchronously with the traveling wave, but preferably at or near the apex of the traveling wave. The sorbent is in close proximity to a heat exchange surface so that the heat of sorption is constantly rejected. The sorbate can travel from the sorbent into a region of porous dielectric material also in contact with a heat exchange surface. The porous material forms a region whose volume decreases in the direction of sorbate travel (refrigeration or condensation embodiment). The sorbate condenses as a result of electro-kinetically induced compression and heat rejection at the heat exchange interface, and/or with the assistance of a thermoelectric cooler (Peltier device). The condensate is transported to an evaporator by virtue of the electro-kinetically induced compression and/or by the now electro-osmotic or EHD effect of the traveling wave on the condensate.

The entire cycle for a heat pump operation is as follows:

Thermally activated gas from an evaporator is sorbed into a sorbent, causing a relatively low pressure to exist in the evaporator. The sorbent is central to a plane of micro inductors on one side, and a heat conductive surface on the other side. A traveling wave electric potential is applied to the inductors and desorption is induced in the direction of the traveling wave. The heat of sorption is dissipated by the heat exchange surface. The sorbate then travels into a region containing a porous dielectric material, which is also held central to the plane of inductors and heat exchange surface. The traveling wave electrokinetically forces the sorbate into a region of decreasing volume causing a compression of the sorbate. The heat of compression is rejected by the heat exchange surface. The sorbate condenses as a result of the high pressure and relatively constant temperature conditions. Condensation may be facilitated by contact with a thermoelectric (Peltier) device. The now liquid sorbate is induced to flow by the electo-kinetic effect of the traveling wave. The liquid sorbate continues to reject heat at the heat exchange interface. The now relatively cool high pressure liquid sorbate is channeled through an orifice or throttling valve to the evaporator where, under the relatively low pressure conditions, it "boils" and adsorbs heat from a second heat exchange surface that is held co-planar to the evaporation chamber.

Suitable fluids for use in the methods of controlling temperature include any condensable gas, including, but not limited to, Freon, chlorodifluoromethane, fully halogenated chlorofluorocarbon, partially halogenated chlorofluorocarbon, water, hydrocarbon (such as methane and ethylene), nitrogen, ammonia, or combination thereof.

Preferably, the heat rejection surfaces are designed with short linearly formed surface grooves that in combination with the applied traveling wave electric potential provide an EHD enhanced heat exchange effect.

When used as a heat pump the invention can be layered to produce incrementally increasing temperature differentials, i.e., if it is desired to attain cryogenic temperatures the device might consist of three stages which share common internal heat transfer surfaces. Cascade refrigeration systems employ refrigerants having progressively lower boiling points. An example would be a natural gas liquefaction system. Such a system may comprise three stages (or layers) employing ammonia, ethylene, and methane as the individual refrigerants. Conversely, multi-stage systems can be used in heat recovery schemes to upgrade process waste heat to usable temperatures.

The sorption devices (including adsorption devices and absorption devices) of the invention include:

an electrokinetic biaser; and a sorbent structure comprising at least one sorbent (sorbent or absorbent).

Preferably, the sorption device is solid state. In some embodiments, the sorption device is portable and has a total mass of less than about 25 kg, preferably less than about 10 kg, more preferably less than about 5 kg, even more preferably less than about 2 kg, and yet even more preferably less than about 1 kg.

In embodiments where the sorption device also carries out a reaction, the sorbent structure may further at least one catalyst suitable for carrying out the reaction.

The catalyst may be incorporated into a pre-separation stage, or may be incorporated into the zeolite structure itself, i.e., palladium on zeolite, and the catalytic reaction and size exclusion separation can occur simultaneously. Zeolites may be modified to perform as catalysts for various chemical reactions. For example, Mobil's ZSM-5 catalyst ($Al_2O_3$—$SiO_2$) is formed by substituting $Al^{+3}$ for $Si^{+4}$.

As described above, the sorbent structure comprises at least one sorbent or absorbent. Sorbents may be mixed or layered to enhance selectivity or afford a multiplicity of sorption mechanisms. Preferably, the sorbent has a thermal conductivity of greater than about 0.276 W/cm-K, or is in contact with a thermally conductive material. As described above, suitable sorbents for use in the methods, devices, and systems of the invention include, but are not limited to, activated carbon, graphite, activated alumina, a molecular sieve, aluminophosphate material, silicoaluminophosphate material, zeolite, faujasite, clinoptilolite, mordenite, metal-exchanged silico-aluminophosphate, uni-polar resin, bi-polar resin, aromatic cross-linked polystyrenic matrix, brominated aromatic matrix, acrylic polymer, acrylic copolymer, methacrylic polymer, methacrylic copolymer, sorbent carbonaceous material, sorbent graphitic material, carbon fiber material, nanotube, nano-material, sorbent metal salts, such as perchlorate, oxalate, and alkaline earth metals, ion exchange resin, or a combination thereof. The zeolite may be an ion exchanged metal zeolite, hydrophilic zeolite, hydrophobic zeolite, modified zeolites metal-ion exchanged zeolite, natural X-type zeolite, modified X-type zeolite, A-type zeolite, mordenite-type zeolite, chabazite-type zeolite, ion exchange resin, bioselective sorbent, or a combination thereof.

As described above, the sorbent structure may further comprise at least one support. Preferably, at least a portion of the sorbent is adhered to or embedded in the support. Preferably, the support is a series of micro-channels, laminar, a porous electrode; a series of concentric layers, or a combination thereof. Preferably, the sorbent structure is a microporous structure in one direction and, more preferably, the sorbent structure is macroporous structure in a direction different than the direction of the microporous structure.

In certain embodiments, the individual particles of the sorbent structure comprising the sorbent and support or sorbent alone (collectively referred to herein with respect to particles size as "sorbent") have a particle size such that the pressure differential between the microporous direction and macroporous direction is less than about 10 Pascals at a sorption cycle time of greater than about one millisecond at standard temperature and pressure.

Suitable supports for use in the methods, devices, and systems of the invention include, but are not limited to, natural clay, calcined clay, modified clay, chemically treated clay, chemically modified clay, smectite clay, kaolin clay, sub-bentonite clay, kaolin-halloysite clay, kaolin-kaolonite clay, kaolin-nacrite clay, kaolin-anauxite clay, binary matrix material, tertiary matrix material, silica-thoria, silica-alumina, silica-alumina-thoria, silica-alumina-zirconia, fibrous material, colloidal silica material, colloidal alumina material, colloidal zirconia material, colloidal mixture, surface modified amorphous silicon dioxide nanoparticles, hydrated magnesium aluminum silicate, thermoplastic polymer, thermosetting polymer, ferrous support, non-ferrous support, electrically-conductive support, dielectric support, electromagnetic receptor, or a combination thereof. Support resins for biological separations may be prepared from, for example, linear polymers of glucose, such as dextran and cellulose, and from synthetic gels such as polyacrylamide and hydroxyalkyl methacrylate. Bio-separations are usually based on ion exchange sorption, hydrophobic interactions, affinity interactions, immobilised metal ion sorption, and size exclusion filtration. Affinity interactions can be made bio-specific by attaching appropriate ligands to the support media. (Reference: Biochemical Separations CE4 *Adsorption and Chromatographic Separations* by John Hubble. www.bath.ac.uk/~cesjh/adsorb.htm)

The support may be applied by sintering, pyrolysis, slurrying, vapor deposition, casting, electro-spraying, electrophoretic deposition, extrusion, laser deposition, electron beam deposition, silk screening, photo-lithography deposition, electrostatic self-assembly, high aspect ratio micromachining, LIGA-formation, atomic layer deposition, casting, stamping, or a combination thereof.

In certain embodiments, the sorbent structure may further comprise at least one electromagnetic receptor particle is in contact with or adjacent to the sorbent, including embodiments wherein nanoparticles of the electromagnetic receptor or sorbent particles are coated or cover at least a portion of the surface of the sorbent particles or electromagnetic receptor particles, respectively. The electromagnetic receptor particle may transmit at least a portion of its energy to the sorbent at the receptor-sorbent interface. In preferred embodiments, the electromagnetic receptor particle is chosen to have a volume to surface area ratio (defined by number of atoms) of less than about 100:1, and more preferably less than about 10:1. In certain preferred embodiments, atomic layer controlled deposition or other techniques are used as a means of coating sorbent particles with receptor nanoparticles. In certain other preferred embodiments, atomic layer controlled deposition or other techniques are used as a means of coating receptor particles with sorbent nanoparticles.

As described above, the sorbent structure may further comprise at least one high aspect ratio conductor. The high aspect ratio conductor may be a conductive polymeric fiber, conductive ceramic fiber, carbon nanotube, non-carbon nanotube, nanowhisker, or a combination thereof. Preferably, conductive polymeric fiber is crystalline or conductive acrylic fiber. Preferably, the high aspect ratio conductor is a single wall carbon nanotube, multi-wall nanotube, or a exohydrogenated zig-zag nanotube. Preferred nanowhiskers include $SnO_2$ nanowhiskers.

As described above, sorbent structure may further comprise at least one piezoelectric material or ferroelectric material. The piezoelectric material or ferroelectric material is or a nano-particle. Suitable piezoelectric material or ferroelectric material include, but are not limited to, lead-zirconate-titanate, barium titanate, lead zirconate, lead titanate, Rochelle salt, quartz, polyvinylidene fluoride homopolymer, polyvinylidene fluoride copolymer, polyparaxylene, poly-bischloromethyloxetane, aromatic polyamide, polysulfone, polyvinyl fluoride, synthetic polypeptide, cyanoethyl cellulose, or a combination thereof.

In certain preferred embodiments, sorbent structure comprises at least two different sorbents, wherein each of the sorbents is selective for a different component of the mixture.

The sorption device may also comprise:
  a source of a fluid mixture comprising at least a first component;
  a source of a fluid mixture comprising at least a first component and a second component;
  a collector of said first component;
  a collector of an exhaust fluid stream enriched in said second component and depleted in said first component;
  a collector of said reaction product component; and/or
  a collector of an exhaust fluid stream depleted in said first component The sorption device may also comprise a heat exchange medium, either one that is heat rejecting or heat dissipating, as described above. The heat exchange medium may be planar and may comprise at least one linearly-formed surface fins, grooves, or a combination thereof. In preferred embodiments, the sorption device may also comprise a source of applying an electrohydrodynamic force to the heat exchange medium to increase liquid-to-liquid contact.

In preferred embodiments, the sorption structure has a cross-sectional area that gradually decreases along its length in order to accommodate a progressively decreasing mass of the fluid feed stream, and to favor desorptive flow in a direction different than the direction of the fluid feed stream.

As described above, the sorption device may also comprise at least one electrohydrodynamic (EHD) pump. Preferably, the EHD pump is located adjacent to or close proximity to the sorbent. The electrohydrodynamic pump may comprise porous dielectric material. Suitable porous dielectric material is silicon dioxide, silicon nitride barium titanate, or similar material, or a mixture thereof.

The sorption device may be open or closed to the outside atmosphere.

The sorption device may further comprise valves, including mechanical check valves, Tesla valves, and pneumatic diode valves. In addition, the sorption device may have geometries that impart pneumatic diodicity, such as a Tesla valve.

The sorption device may comprise one or more channels through which said fluid mixture flows. Preferably, the sorption device comprises a plurality of micro-channels through which said fluid mixture flows. The channel(s) may comprise the sorbent structure, or the sorbent may be adhered to the micro-channels. The surface of the micro-channels or adhered particles may consist of layers or a mixture of electro-magnetically receptive or conductive material and an adsorptive material. In preferred embodiments, the source of said fluid mixture is substantially perpendicular to the plane of said channels.

In preferred embodiments, the electrokinetic biaser produces a dynamic electric field. The dynamic electric field may be effected by a traveling electric field, a traveling electric wave, an electric field flux, a voltage spike, a multiphase electromotive potential, traveling electrostatic wave, or a combination thereof. The dynamic electric field may be continuous or intermittent. In some embodiments, the electrokinetic biaser produces a static but non-uniform (or non-homogeneous) electric field.

The electrokinetic biaser may comprise at least two inductors, including electrodes, especially wherein the inductors are electrodes. The dynamic electric field may produced by at least two inductors, preferably electrodes, preferably arranged in a parallel or concentric geometry. Preferably, a series of electrically conductive inductors held coplanar to the individual reaction chamber and preferably concentric to a central point in the reaction chamber. The electrodes comprise at least one conductive material, such as at least one metal, metal oxide, conductive ceramic material, conductive polymeric material, or an alloy or combination thereof. The metal or metal oxide may be rhodium, palladium, chromium, thoriated tungsten, barium oxide, strontium oxide, copper, silver, gold, or alloy or combination thereof. The conductive ceramic material may be a covalent bonded ceramic or a metallic bonded ceramic, and may include ceramic composite comprising $TiB_2$, TiC, BN, Nb, zirconia, or a combination thereof. The conductive polymeric material may be polymeric material characterized by an interchain electron transfer, valence, conduction band populations, P-type doping, N-type doping, or a combination thereof, and may include a carbon nanotube-containing polymer, polymer chemically doped to produce excess electrons or holes, or a combination thereof.

Preferably, the conductive material is a high aspect ratio conductor or the conductive material comprises at least one high aspect ratio conductor. In certain preferred embodiments, the sorbent structure comprises a plurality of high aspect ratio conductors. At least a portion of said high aspect ratio conductors may protrude from said sorbent structure. In certain embodiments, the high aspect ratio conductors form an array. The high aspect ratio conductor may be a conductive polymeric fiber, conductive ceramic fiber, carbon nanotube, non-carbon nanotube, nanowhisker, or a combination thereof. The conductive polymeric fiber may be a conductive acrylic fiber. The high aspect ratio conductor is a single-wall carbon nanotube, multi-wall carbon, or a exohydrogenated zig-zag nanotube. The high aspect ratio structures are capable of concentrating an electric field, as shown in FIG. 18. The inductors and/or the opposing sorbent structure may have the aforementioned characteristics. The conductive material may be at least partially covered by a dielectric layer.

Preferably, the dynamic electric field is produced by an alternating current to avoid breakdown of the adsorbate via electrolysis, or the production of electrolysis products.

The dynamic electric field cycles, preferably at a frequency of about 60 cycles/second to about 5,000,000 cycles/second, more preferably, at a frequency of about 1,000 cycles/second to about 1,000,000 cycles/second, even more preferably, at a frequency of about 2,000 cycles/second to about 50,000 cycles/second, yet even more preferably, at a frequency of about 5,000 cycles/second to about 10,000 cycles/second.

The sorption device may further comprise at least one piezoelectric valve or pump. The sorption device may also comprise at least one thermoelectric module.

The sorption device may have a two-dimensional or three-dimensional shape or arrangement selected from the group consisting of: circular, square, rectangular, triangular, hexagonal, chevron-shaped, octagonal, and in interleaved linear, spiral, polyhedral, and geodesic arrangements.

The methods, devices, and systems of the invention may be microprocessor controlled. The sorption devices of the invention may comprise at least one power conditioning device. Suitable power conditioning devices include a voltage changing device (such as a piezoelectric transformer or a high frequency transformer). a poly-phase frequency generator, a poly-phase frequency amplifier (a power transistor, a complimentary metal oxide semiconductor (CMOS), an insulated gate bipolar transistor (IGBT)), or a combination thereof.

Figure 22:
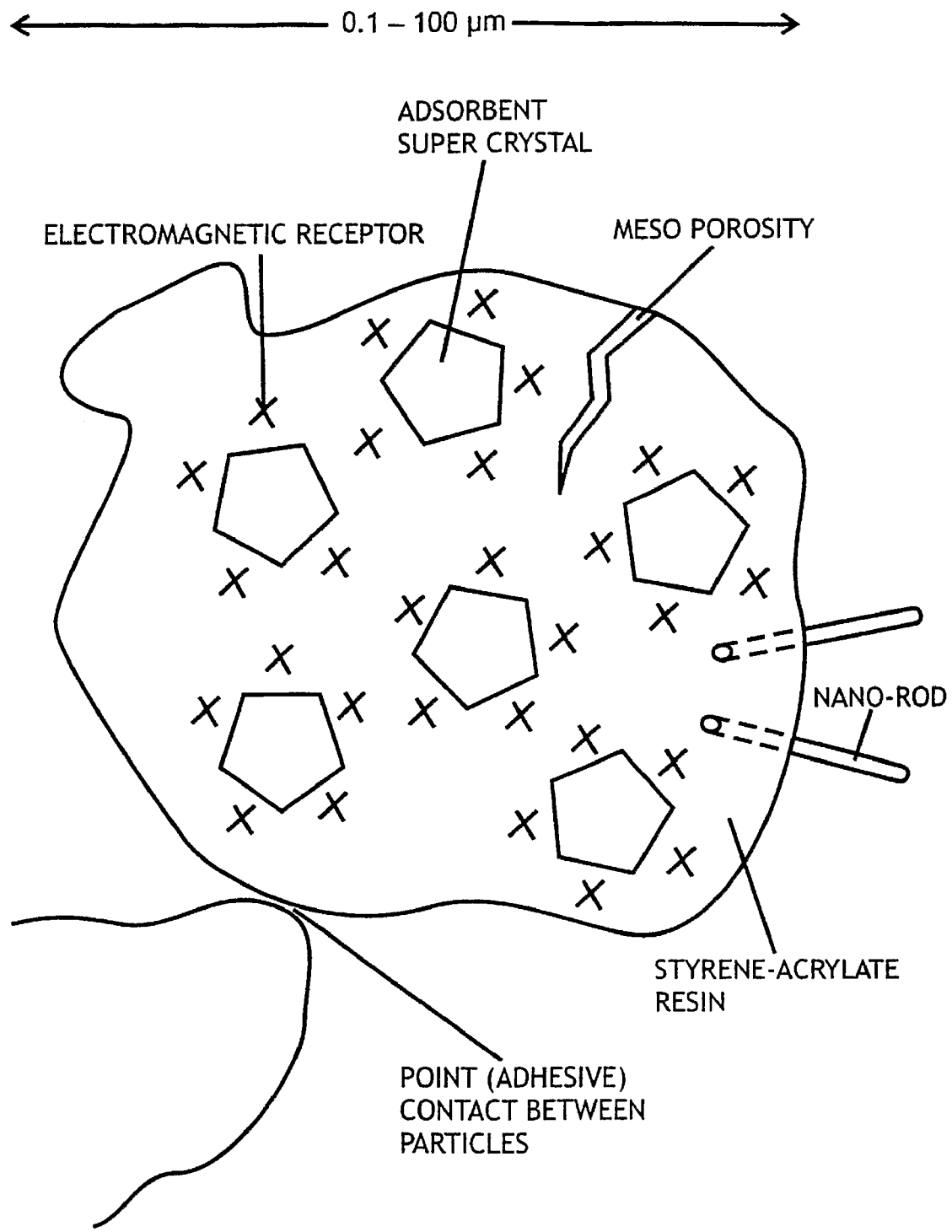
FIG. 22 shows a schematic diagram of an adsorbent particle suitable for inclusion in the micro-channels or microlayers of the invention. The particles include all of the functionality preferred for efficient electro-kinetic sorption systems, i.e., meso-porosity, the adsorbent material, a binder resin, an electromagnetic energy receptor, heat conductive material(s), a catalyst, and high aspect ratio elements.

In certain embodiments, it may be desirable to produce an adsorbent particle suitable for inclusion in the micro-channels or micro-layers of the invention, as shown in FIG. 22. The particles include all of the functionality preferred for efficient electro-kinetic sorption systems, i.e., meso-porosity, the adsorbent material, a binder resin, an electromagnetic energy receptor, heat conductive material(s), a catalyst, and high aspect ratio elements. Creating fully functioning particles would simplify the manufacturing process, while maintaining high mass transfer and diffusion rates. Particles may be formed by emulsion aggregation, microsuspension polymerization, chemical milling, and by other techniques known to those skilled in the art.

The devices of the invention may act as vacuum pumps. Sorption performs at least the following two functions:
1. lowering the population of gas phase molecules within a certain volume, and
2. acting as a ratchet mechanism to hold molecules in a given position prior to the addition of translational energy.

The applied electro-kinetic energy performs at least the following three functions:
1. providing the energy to unlock the bound molecules from their respective sorption sites;
2. providing the translational energy needed to bias the desorbed molecules toward their next sorption site; and
3. providing the force needed to accelerate unbound molecules against the static pressure differential defined by the incremental distance between sequential sorption sites.

The sorbent structure performs at least the following three functions:

1. providing sorption sites;
2. providing a sufficiently tortuous path to discourage mass diffusion in a pressure driven direction; and
3. providing the necessary functionalities to receive and convert electromagnetic energy into desorption energy.

Figure 10A:
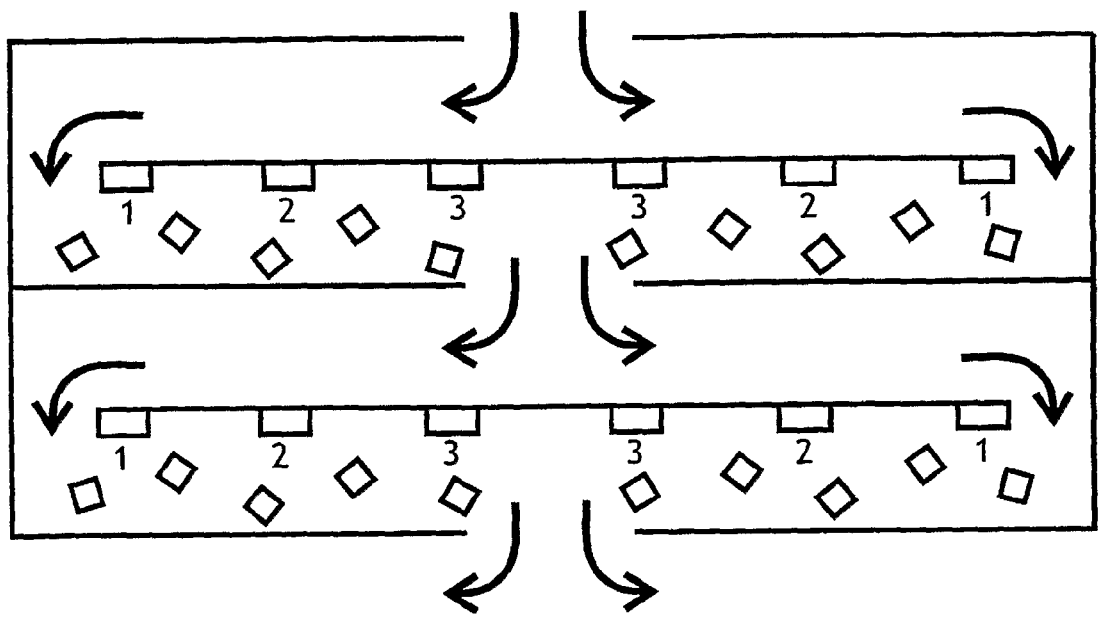
FIG. 10A is a schematic diagram of cascaded vacuum pump.
Figure 10B:
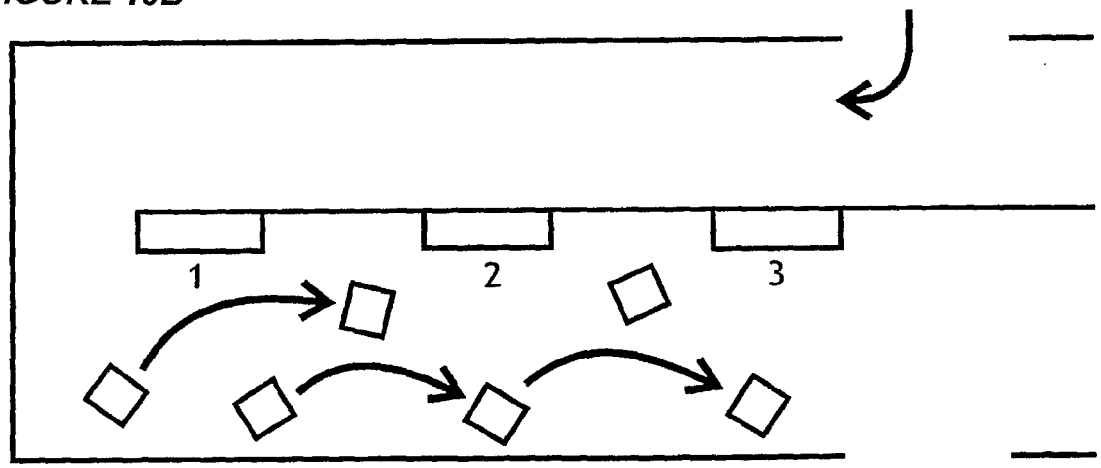
FIG. 10B is a schematic diagram of a desorption-sorption site hopping phenomenon.

For example, in certain embodiments, a sorption device or plurality of sorption devices may act as vacuum pumps for the purpose of reducing or increasing the pressure with the device(s) by adsorbing the gas phase molecules in the chamber or environment and then desorbing and biasing said molecules in a direction exterior to said chamber or environment, as shown in FIG. 10A. In certain embodiments, the pressure change may occur incrementally, by a site-hopping phenomenon, in an individual or in a series of sorption devices, as shown in FIG. 10B. In certain preferred embodiments, a plurality of different sorbents are used to sorb and evacuate a multiplicity of gases and condensable vapors. In certain embodiments, the sorption device or plurality of such devices may be used in combination with electron microscopes, mass spectrometers, sputtering devices, chemical vapor deposition devices, chemical oxygen iodine lasers, drying devices, distillation devices, vapor recovery devices, chemical reactors, vacuum ovens, focused charged particle beam analytical systems, vacuum filtration, gel drying, freeze drying, centrifugal concentration, materials processing, laboratory applications, and particle accelerators. In further embodiments, the sorption device or plurality of such devices may be used to increase the pressure of a defined environment relative to an external environment, such as, for example, for breathing air in an aerospace vehicle, or to increase the efficiency of a combustion or fuel cell process in an aerospace or terrestrial vehicle. In certain embodiments, devices use both the pumping mechanism of the device in combination with the selectivity mechanism of the device.

In preferred embodiments, the sorption device comprises:
  a first substrate layer;
  an sorbent layer disposed below the first substrate layer;
  at least two electrodes in contact with or in close proximity to at least one of said first substrate layer and said sorbent layer;
  a second substrate layer disposed below said sorbent layer,
  at least one via disposed through at least one of said first substrate layer, said sorbent layer and said second substrate layer;
  said at least one via being disposed between said at least two electrodes;
  at least one collection port disposed through at least one of said first substrate layer, said sorbent layer and said second substrate layer,
  wherein said first substrate layer, said sorbent layer and said second substrate layer are co-planar.

In a preferred embodiment, the invention is directed three coplanar sheets of material forming a multi-layered architecture. Individual sorbent units are shaped to be geometrically repeatable (e.g. triangles, squares, rectangles, hexagons, etc.) such that their outer edges are shared and that they are contiguous when duplicated. The units can be produced individually or, in the alternative, defined in larger numbers within areas on a larger substrate. In one embodiment, a number of sorption units (pressed onto a top layer) can be disposed above a single, shared sorbent layer accompanied. Thereafter, a heat-dissipating layer (as a solitary unit or as a pressed sheet) can be added below the sorbent layer. In such a configuration, the top layer defines many individual sorption units (or cells) even though only one large piece of sorbent is utilized. Methods of preparing the invention can include laser ablation, LIGA processes, photo-lithographic patterning, mechanical or chemical etching, EDM, vapor spray, laser deposition, casting, injection molding, hydroforming, stamping, extruding, silk screening, electrodeposition, electroplating, electrodeless plating, electrostatic self-assembly, atomic layer deposition, and other related production techniques.

Depending on configuration and intended use, one or both of the outer most layers of the multi-layer structure function of the heat rejection or collection surfaces (i.e. heat exchanges). For example, in a refrigeration/heat pump arrangement, both surfaces function as heat transfer surfaces. Arranged as a material separator, the lower surface can function to dissipate the heats of sorption, as an outlet manifold, and/or as a component of an electric circuit, while the upper layer functions as an inlet/outlet manifold. These surfaces can be made of numerous materials including, but not limited to, metals, alloys, composites and matrix structures of heat conductive materials. The heat exchanging surfaces preferably have topography arranged to enhance the heat transfer characteristics of the surface materials (e.g. fins, micro-grooves, etc.).

The central lamina of the structure contains, among other things, electrodes (i.e. inductors), electrode connections, inlet and outlet vias and sorbent-containing chambers. The operative central layer can be made from cast or injection molded plastics, epoxies and other composites that are both thermally and electrically non-conductive. The active area of the central lamina (and of the sorption cell) contains sorbents, catalysts and/or other physical media amenable to sorption, reaction, catalysis, condensation and transport of the sorbed materials.

The electrodes may be metallic or metal oxides (e.g. rhodium, palladium, chromium, thoriated tungsten, barium oxide, strontium oxide, copper, silver, gold, or alloy or combination thereof), or conductive plastics/epoxies containing conduction enhancing filler materials. The electrodes generate a traveling electric wave and/or an electric field flux/voltage spike that removes (or "sweeps") the sorbate from the sorbent whereby it is removed from the system. The electrodes are designed and configured to induce a traveling wave with a frequency generated between about 60 to 5,000,000 cycles per second and more preferably between about 5,000 to 1,000,000 cycles per second. The surface topography of the heat exchange material may interact with this wave or with another electric potential to bring about what is referred to as an electrohydrodynamic (EHD) heat exchange enhancement effect.

FIG. 1A illustrates a side view of a generalized mesofrequency traveling wave electro kinetic sorption cell 100 in accordance with an embodiment of the invention that is capable of being used alone or in series (i.e. many such cells located on a single surface or stacked). FIG. 1A shows a non-electrically conductive (i.e. dielectric) substrate surface 102 and a second substrate surface 104 that sandwich a macroporous layer of sorbent material 120. The sandwiched macroporous sorbent layer 120 contains any number of individual or combinations of sorbent materials. Almost all of the sorbents currently in use, and being developed, are suitable for inclusion into the architecture of the invention. Sorbents may be mixed or layered to enhance selectivity or to bring to bear a multiplicity of sorption mechanisms and characteristics and may contain catalysts and/or metallic particles. Suitable sorbent materials for inclusion in the sorbent layer 120 include, but are not limited to: zeolites (with various crystalline geometries), hydrophilic zeolites, hydrophobic zeolites, modified and/or metal-ion exchanged zeolites, natural or modified X type zeolites (including doping with binary divalent cation exchanged metals), faujasites, clinoptilolites, mordenites (and similar naturally occurring adsorbents suitable for metal-ion exchange modification), aluminophosphates, silico-aluminophosphates, metal-exchanged silico-aluminophosphates, ion exchange resins, uni-polar resins, bi-polar resins, aromatic cross-linked polystyrenic matrices, brominated aromatic matrices, methacrylic ester copolymers, adsorbent carbonaceous materials, adsorbent graphitic materials, carbon fiber materials, nanotubes and/or related nanomaterials, adsorbent metal salts (including, but not limited to perchlorates, oxalates, and alkaline earth metals).

The sorbent materials in the sorbent layer 120 can further include a variety of binder materials to control both macroporosity and microporosity characteristics of the sorbent structure (through either homogenous or non-homogenous proportioning). Also, materials may be included that alter the electrical conductivity, are receptors of electromagnetic energy, are piezoelectric materials, or a combination thereof.

A plurality of electrodes (i.e. inductors), 105, 106 and 107 are disposed on the substrate layer 102 (though they can alternatively be disposed on, in, or near the surface of the sorbent layer 120) and may be connected in parallel to similar electrodes. The electrodes 105, 106 and 107 are spaced away from the center of the sorption cell 100. While FIG. 1A demonstrates three electrodes 105, 106 and 107, the system in accordance with the invention can be configured to include any number of electrodes or, in the alternative, operate using only two such electrodes as needed or as permitted by space and/or cost considerations.

FIG. 1A also shows a plurality of inlet ports, or vias 108 disposed between the outer most electrode 105 and the adjacent electrode 106 of dielectric layer 102. Disposed on the substrate layer 104 are corresponding outlet vias 110. In the center of the sorbent layer 120 is a collection via 112. The collection via 112 serves as the condensation and/or collection point for removal of the sorbed material(s) and may connect through to the substrate layer 104. As such, the collection via 112 may or may not pass through the second substrate layer 104 depending on the particular design limitations of the desired system.

The sorbent layer 120 can consist entirely of the sorbent material 122 or, as depicted in FIG. 1A, it can consist of microspheres or similar microstructures 124 in the immediate vicinity of the collection via 112. Sorbent layer 120 can be a single continuous sheet of sorbent material or can be defined as individual units of sorbent material located proximate to other similar sorbent units. Sorbent layer 120 may be created to contain repeating patterns with porosity and/or material gradients designed to enhance electromigration, thermal diffusion and/or desorption characteristics. As depicted in FIG. 1A, the inlet vias 108 can pass through the sorbent layer 120. In another embodiment, the sorbent material of layer 120 may be arranged having no inlet vias 108 passing through it. In such an embodiment, the sorbent layer 120 is arranged to be macroporous in the direction of the feed stream materials and microporous in the direction of the traveling electric field (i.e. in the direction of the collection via 112), thus allowing free passage of the feed stream through to the outlet vias 110 on substrate layer 104. In this particular design, it is not necessary for the sorbent layer 120 to have defined vias as the macroporosity in the direction of the feed stream provides the same function.

The second substrate layer 104 can be made of the same non-conductive material as the first layer. Alternatively, the substrate layer 104 can be made of a conductive (or non-conductive) thermal interface/heat exchange material.

In operation, the sorption cell 100 can operate alone, in parallel and/or in series for complex chemical or molecular purification. A liquid or gaseous feed stream enters the sorption cell 100 through the inlet vias 108 in the substrate layer 102. The liquid or gaseous feed steam can optionally be exposed to a filter and/or a catalyst(s) material prior to entering said sorption cell 100. The vias 108 allow complex or multi-component gaseous or liquid feed streams to pass through the substrate layer 102 and come in contact with the sorbent layer 120 whereby a component(s) is removed (or sorbed) from the feed steam. The non-sorbed components of the feed stream passes through the sorbent layer 120 and exit the sorption cell 100 through the outlet vias 110 located on the substrate layer 104.

Intermittently with the sorption occurring at the sorbent layer 120, the electrodes 105, 106 and 107 are charged with a polyphase electric potential and/or field flux (or voltage spike) resulting in a traveling electric field directed to the center of the sorption cell 100 (i.e. in the direction of the collection via 112). Electrodes 105, 106 and 107 are connected in parallel to other similar electrodes and each corresponds to one phase of the applied polyphase electric potential. This traveling electric field can be superimposed (or impinged with) a relatively short duration electric field flux as it moves from the outermost electrode 105 toward the center of the structure. Operated in this manner, two simultaneous mechanisms act to remove adsorbate from the sorbent layer 120. First, the continuous traveling wave constantly sweeps the sorbent layer 120 to remove non-bonded adsorbate. Simultaneously, the electric field flux provides energy to break the sorbate-sorbent bonds of bound materials. Once freed from the sorbent, the adsorbate is removed from the system by the traveling wave. The traveling electric field and field flux are provided to the sorption cell through a coupled power source and/or a coupled signal generator either or both of which are capable of producing poly-phased or multi-phased electric signals.

The traveling electric wave traverses the sorbent layer 120 and sweeps any adsorbed materials in the direction of the collection via 112. Movement of the sorbed materials is due to the sorbed compound being energized by the traveling electric field and the sorbate-sorbent bond being temporarily broken. The unbound sorbate (i.e. desorbed material) is biased toward the center of the sorbent layer 120 as a result of the traveling wave's field gradient (which may also include effects due to an applied voltage spike). The desorbed material can be re-adsorbed into the sorbent layer 120 (albeit closer to the collection via 112) or exit the sorbent layer either through the collection via 112 or by being re-entrained in continuous feed steam. Re-entrainment in the feed steam, however, is disfavored due to the considerably stronger re-adsorptive forces and electrokinetic forces.

As an example, air containing water ($H_2O$) may be introduced into the sorption cell 100 through the inlet vias 108 and into the substrate layer 104. The air containing water enters the sorbent layer 120 where the water is adsorbed and then directed to the collection via 112. The remaining non-sorbed material (in the this case, dehydrated air) leaves the cell 100 through the outlet vias 110. In this example, the sorbent may be any material capable of adsorbing water, such as a cubic alumino-silicate.

Inclusion of the microstructures 124 helps draw sorbate material from the sorbent layer 120 by reducing the need to provide energy for breaking sorbate-sorbent bonds near the collection via 112, while still retaining a packed capillary enhanced electrokinetic mass transport effect. The sorbent material of layer 120 may be arranged such that it is macroporous in the direction of the flow of gaseous and liquid materials and microporous in the direction of the traveling electric field (i.e. in the direction of the collection via 112).

Arranged in this fashion, pressure forces dominate the throughput (mass convection) rate while electro-hydrodynamic, electro-osmotic, electro-migratory, and/or dielectrophoretic forces dominate the sorbate diffusion rate. This arrangement can also enhance the effects of the traveling electric field due to polarization or ionization of the sorbate molecules. Use of heat exchange materials to make up the substrate layers 102 and/or 104 further enhances the process by providing a means for drawing off and dissipating the heat of sorption and/or heat of compression or condensation.

Figure 1B:
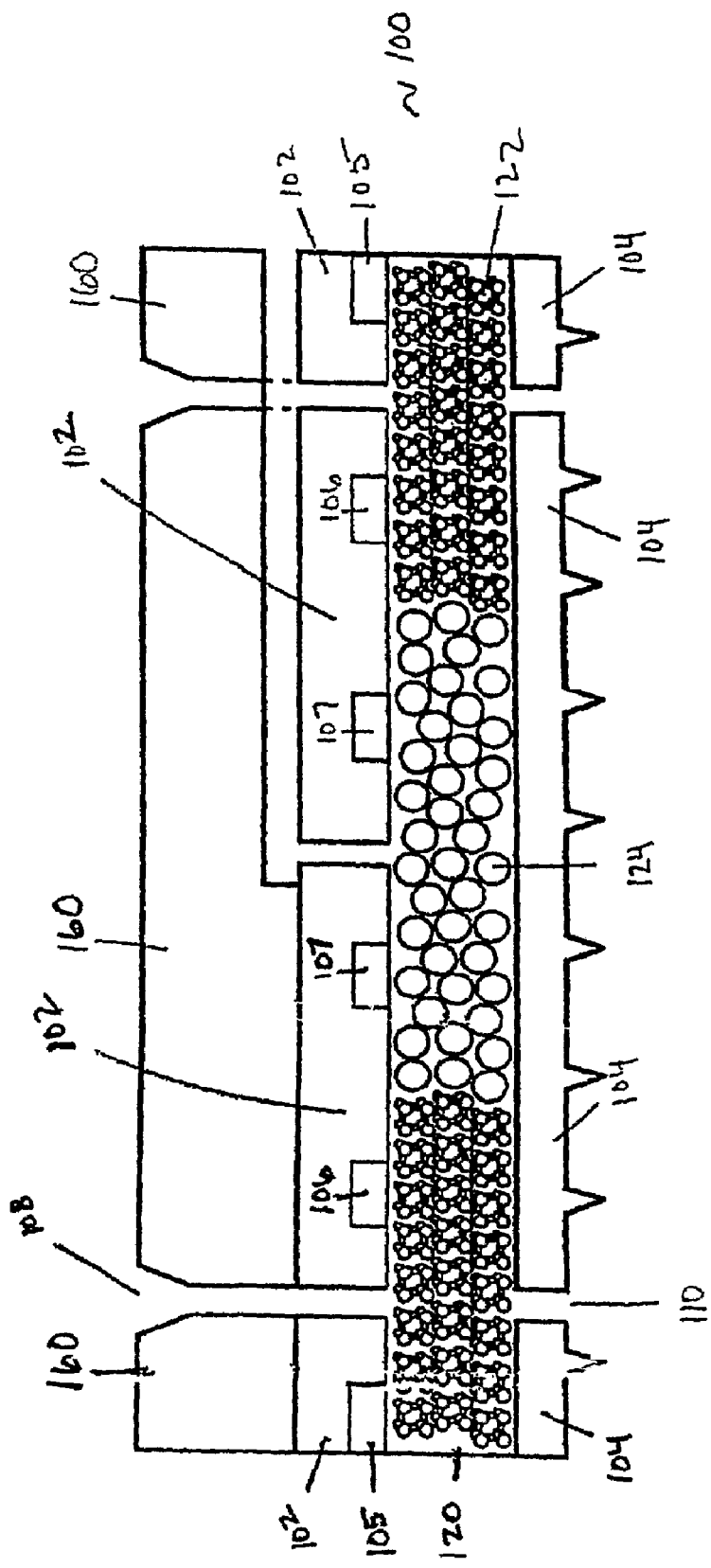
FIG. 1B illustrates the adsorption unit of FIG. 1A with a manifold assembly included.

FIG. 1B shows a generalized meso-frequency traveling wave electrokinetic sorption cell according to another embodiment of the invention. The cell 100 of FIG. 1B is the same as the cell 100 of FIG. 1A, except that FIG. 1B also depicts a manifold mechanism 160 that provides a number of functions, including removing an adsorbed material, providing a feed stream, directing materials toward the sorption unit (in some cases) or alternatively, directing material away from the sorption unit.

Figure 1C:
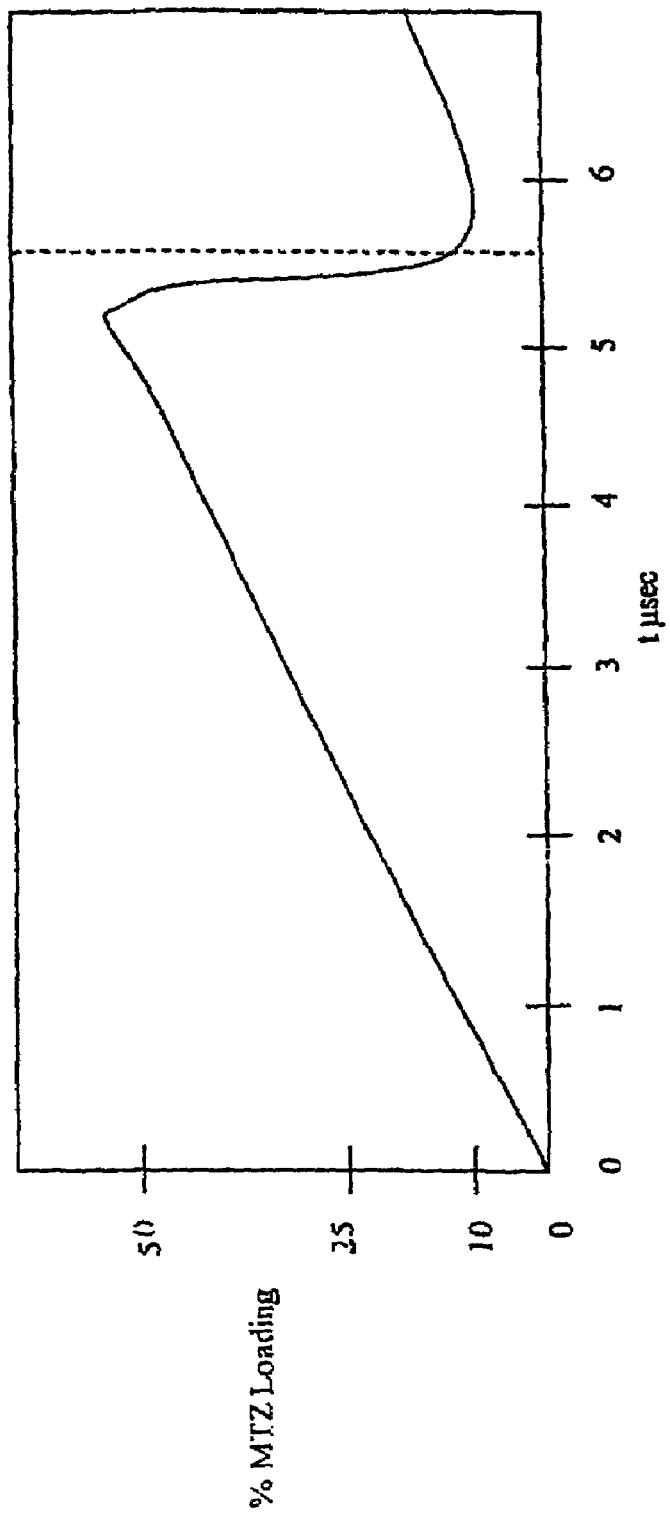
FIG. 1C is a graph of the change in % MTZ loading over time for a continuous non-swing system in accordance with the invention.

FIG. 1C is a graph illustrating the change in the percentage of mass transfer zone (MTZ) loading over time. This graph illustrates how the processes carried out by the cell 100 are continuous and non-binary. According to the invention, the cell 100 does not need to cycle between different vessels or adsorptive materials.

Figure 2:
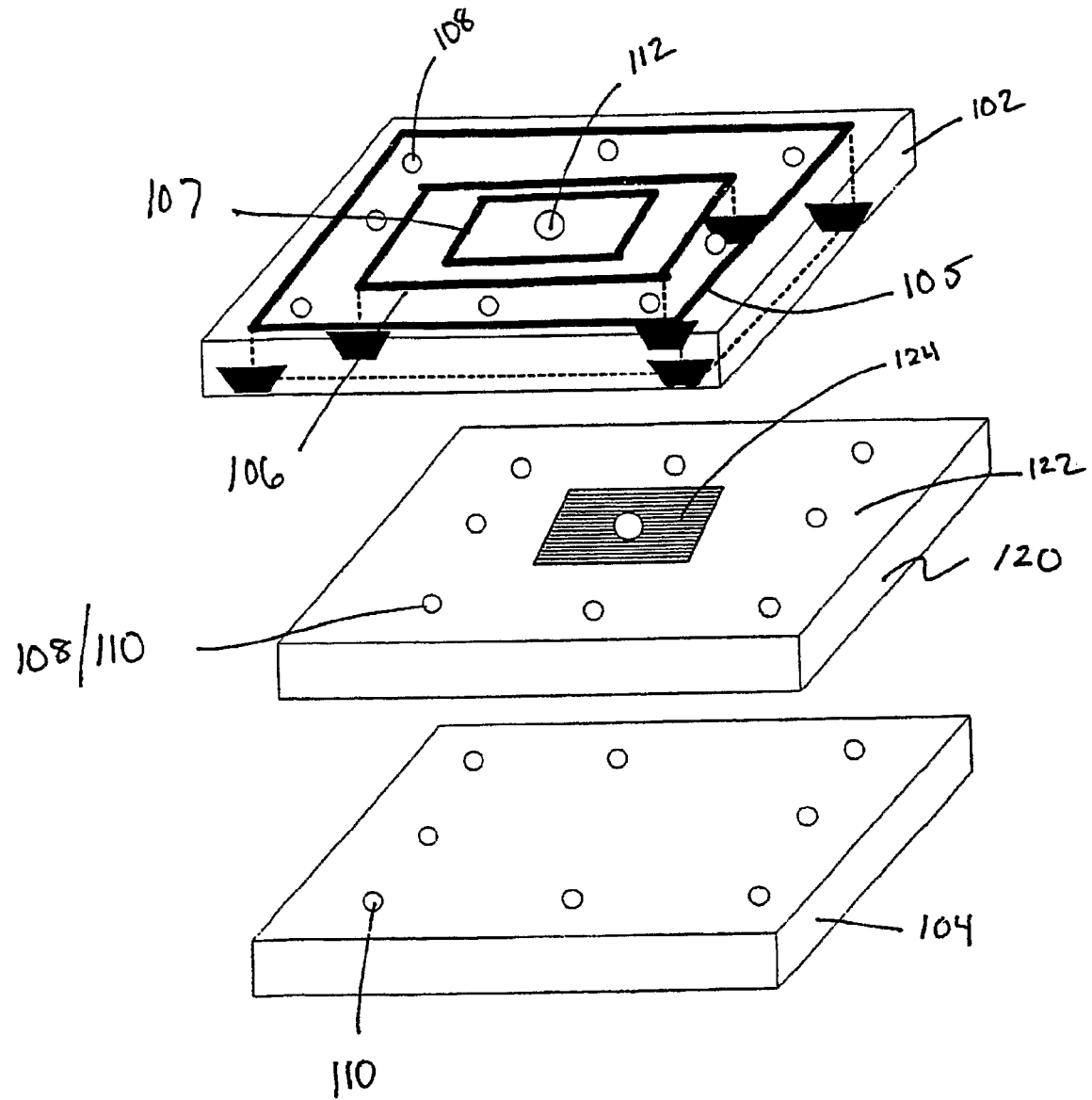
FIG. 2 illustrates a top-down view of FIG. 1A.

FIG. 2 illustrates a top-down view of sorption unit 100 as depicted in FIG. 1A and described above. Thus, FIG. 2 includes the non-electrically conductive substrate surface 102, the sorbent material 104, the electrodes 105, 106 and 107, the vias 108 and 110, the collection via 112, the sorbent material 120, the sorbent material 122 and the microstructures 124.

Figure 3:
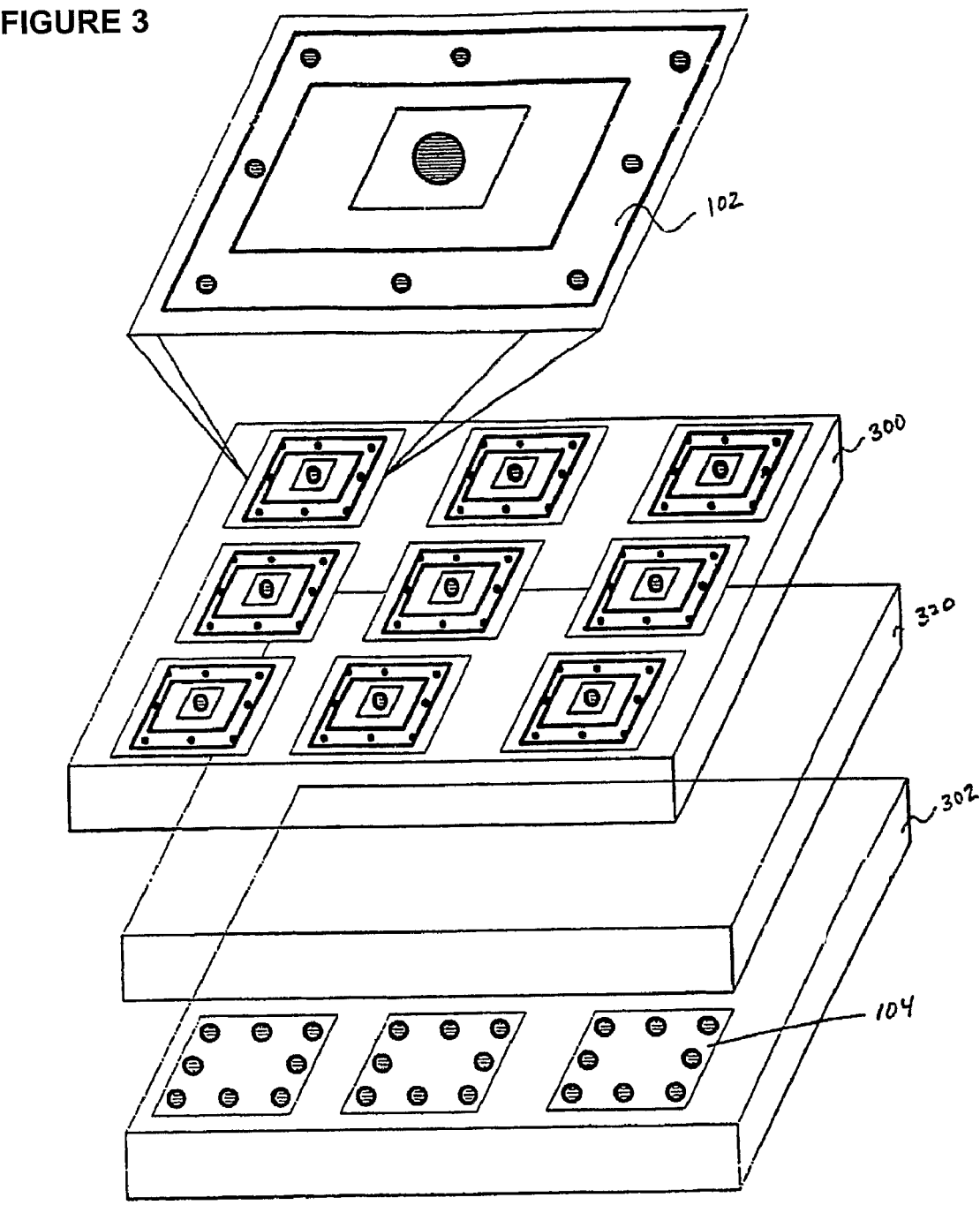
FIG. 3 illustrates another embodiment of FIG. 1A in which multiple adsorption units comprise a sheet disposed above a single sorbent layer.

FIG. 3 illustrates a scaled version of FIG. 2 in which multiple sorption units comprise a sheet disposed above a single sorbent layer. In FIG. 3, a series of dielectric layers 102 are disposed together in parallel, forming a single dielectric layer 300. The surface layer 300 is disposed above a much larger, single layer of sorbent material 120 (rather than an individually defined cell of sorbent material as discussed above). Disposed below sorbent layer 120, is a parallel series of substrate layers 104 (from FIG. 1A) forming a single substrate layer 302. Arranged in this manner, the each individual sorption unit works as described above as part of a sorption system.

Figure 4:
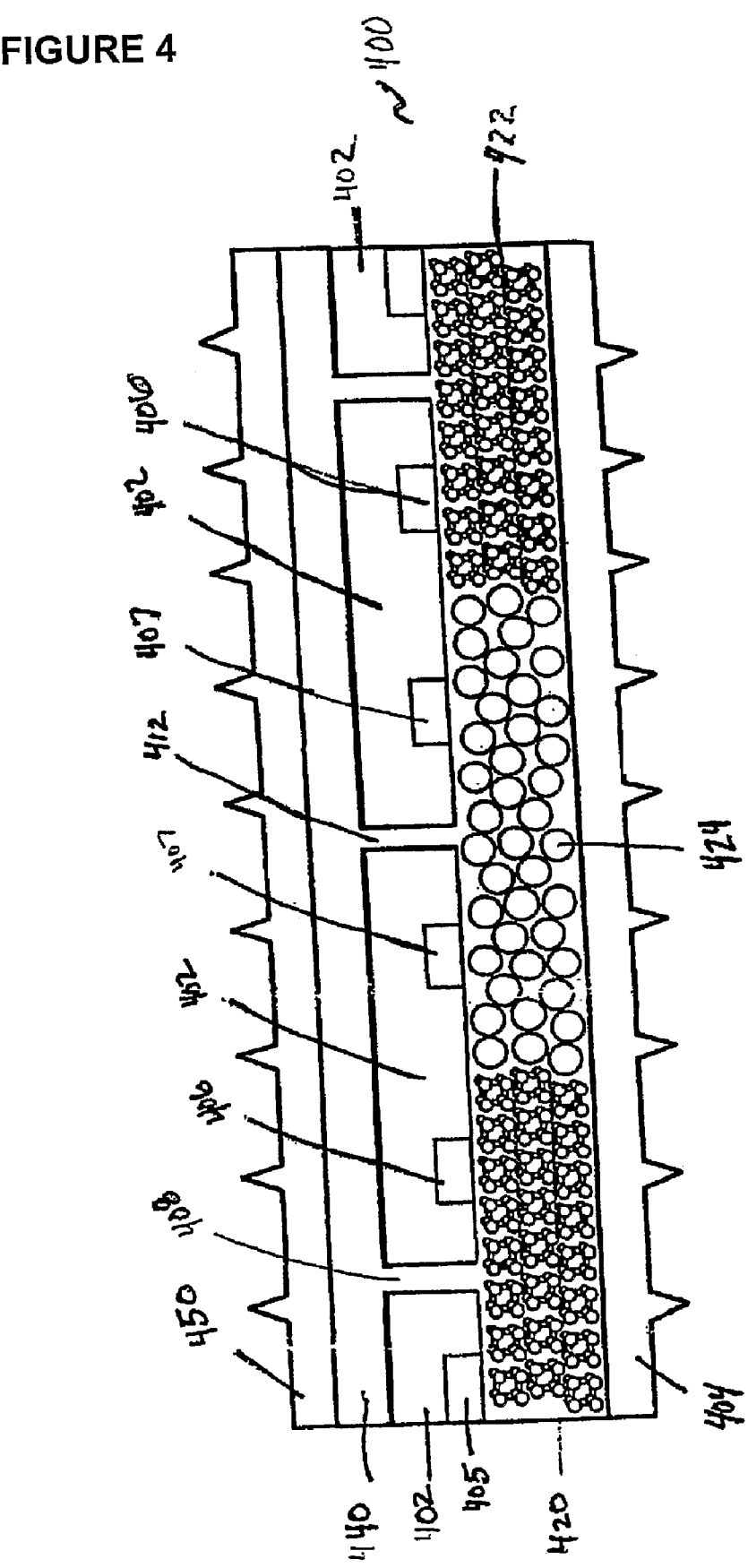
FIG. 4 illustrates a generalized closed cycle (refrigeration/heat pump) meso-frequency traveling wave electro kinetic adsorption unit in accordance with an embodiment of the invention.

FIG. 4 illustrates a side view of a generalized closed cycle (refrigeration/heat pump) meso-frequency traveling wave electro kinetic sorption cell in accordance with an embodiment of the invention. The sorption cell of FIG. 1A can be configured to function as part of a closed-cycle or refrigeration/heat pump system 400 by disposing a second heat exchange layer 450 atop a substrate layer 402 and creating an evaporation chamber 440. In this configuration, the closed loop system may or may not have outlet vias 410 located on a second substrate layer 404.

In this design, the sorption cell functions as a closed loop system (i.e. a working fluid 430 (not shown) is continuously recycled throughout the system). The working fluid 430 is selected to be specifically compatible with the sorbent material so as to operate within pre-selected temperature parameters and where the sorbent has low energy bond-breakage requirements. The desorption phase of the closed loop system is preferably designed to be essentially non-thermal and/or non-ohmic.

In operation, the working fluid 430 of the closed loop system is caused to be in a low pressure gaseous state as it is drawn through an inlet via 408 into an sorbent layer 420 due attractive forces between the working fluid and solid sorbent material. During this process, the heat of sorption is conducted by a heat exchange surface 404 to the external environment. Transfer of the heat to the external environment is facilitated by providing a laminar structure with a short heat diffusion path length.

Once adsorbed, the sorbed material is moved toward the center of the sorbent layer 420 in the direction of a collection via 412, as discussed above. Movement of the sorbed material occurs due to the bond-breaking energy and electrokinetic energy supplied by the traveling electric wave generated by electrodes 405, 406 and 407. The electrodes 405, 406 and 407 are connected in parallel with other similar electrodes and each corresponds to one phase of the applied polyphase electric potential discussed above. Depending on design, the central region of the sorbent layer 420 in proximity of the collection via 412 may consist of microstructures 424 rather than the sorbent material 422. As discussed above, the traveling electric field and field flux are provided to the sorption cell through a coupled power source and/or a coupled signal generator either or both of which are capable of producing polyphased or multi-phased electric signals.

As the sorbed material moves to the center of the sorbent layer 420, it consists of a heated gas-liquid mixture. Due to the system design, the liquid-gas mixture is forced into a region of decreasing volume. As a result, the mixture is further condensed to the liquid state resulting in additional heat rejection and cooling (whereby the additional heat is drained away via the heat exchange surface 404).

After the sorbed liquid is cooled, it enters the evaporator chamber 402 through the collection via 412. The evaporator chamber 402 is maintained at a low pressure causing the liquid sorbate entering the chamber to boil. As such, the phase changed sorbate removes heat from the external environment through the heat exchange surface 400.

Figure 11:
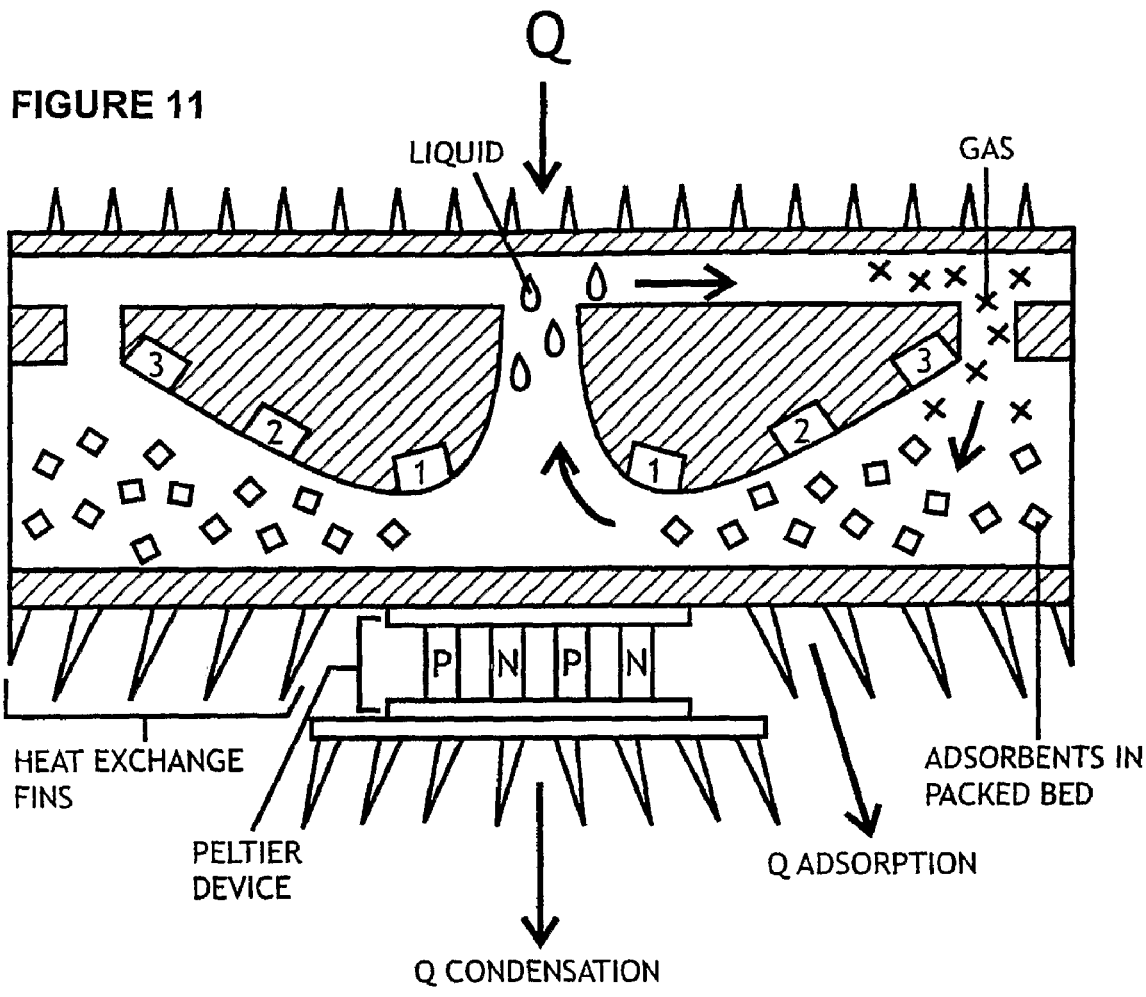
FIG. 11 is a schematic diagram of a thermoelectric (Peltier) device held adjacent to a heat exchange surface to assist condensation of a working fluid.

In an embodiment of the invention, a thermoelectric (Peltier) device is held adjacent to the heat exchange surface to assist condensation of the working fluid, as shown in FIG. 11.

In one embodiment of the invention, a heat sensor or thermocouple (not shown) may be embedded on one or more of the heat exchange surfaces. This allows the sorption cell to provide for temperature feedback, and thus, temperature regulation.

In an embodiment of the invention, the sorption unit surrounds a high temperature superconductor. The alternating electromagnetic field of the superconductor provides the motive force to induce desorption and to cause the sorbate to circulate with the adsorptive refrigeration device. Thus, a high temperature superconductor could maintain its required operating temperature along its entire length without external cooling sources. This would be especially useful in long distance and sub-sea applications.

In an embodiment of the invention, the sorption unit can be layered with other similar refrigeration/heat pumps to produce a cascade-type cryogenic cooler system. In such an arrangement, a series of sorption cells are layered together to produce incrementally increasing temperature differentials. Each descending unit of such an arrangement employs refrigerants having progressively lower boiling points. For example, in a three-tiered cryogenic natural gas liquefaction system, the refrigerants could include ammonia, ethylene and methane as the refrigerants. Conversely, a similar multistage arrangement could be used for differential heat recovery for use with, among other things, waste heat recovery systems.

Figure 5:
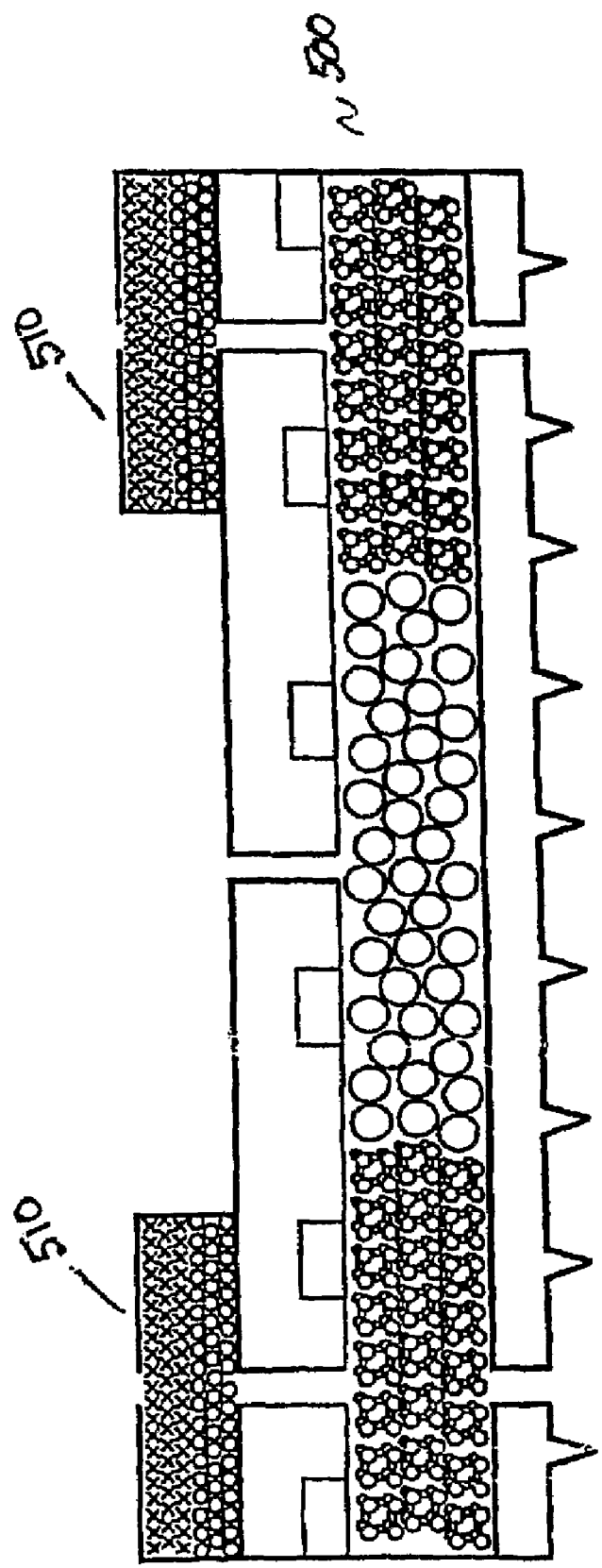
FIG. 5 illustrates an embodiment of the adsorption unit including a catalyst.
Figure 6:
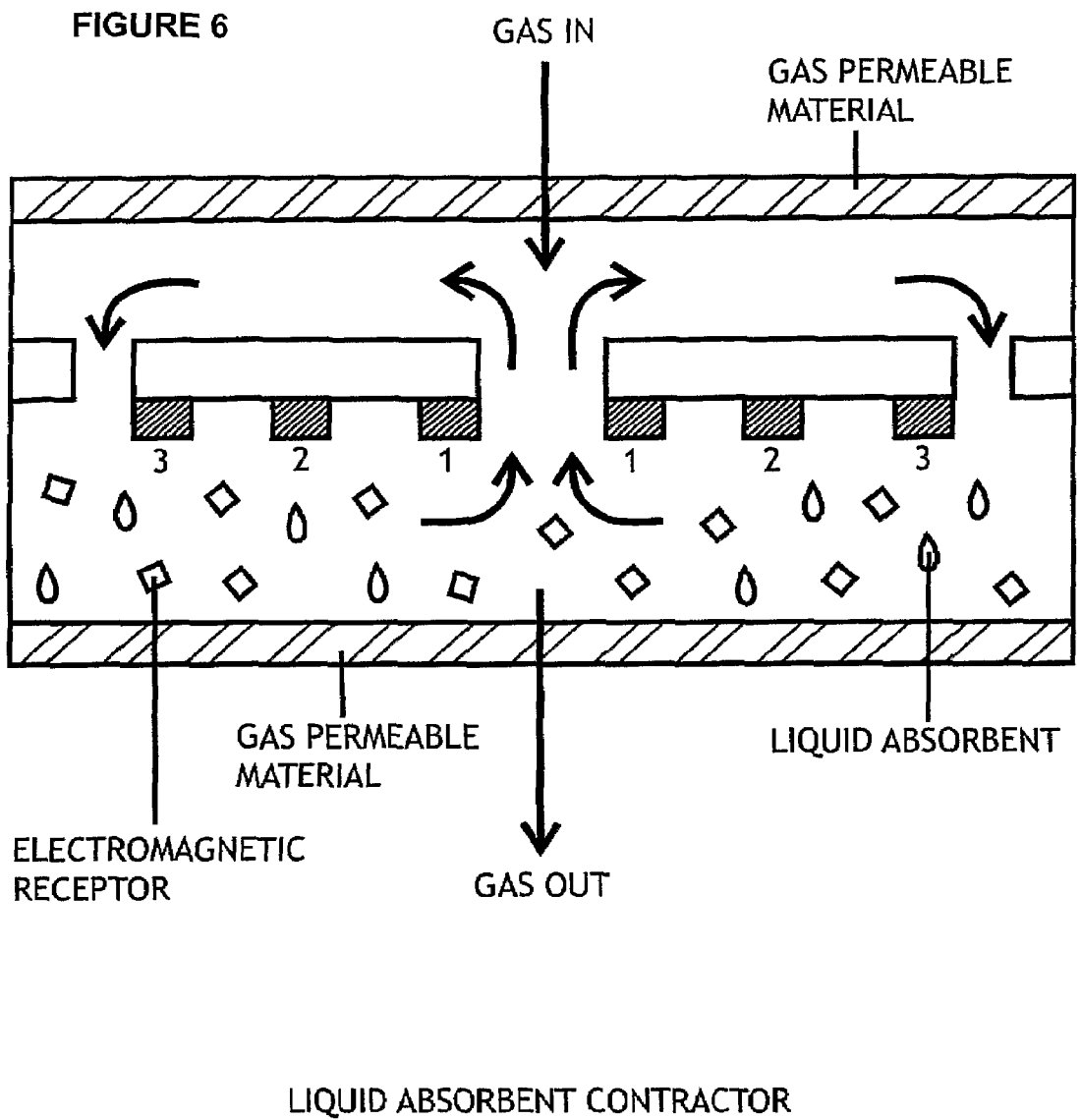
FIG. 6 depicts a liquid absorbing device, where electrodes drive the fluid and provide desorption energy.

FIG. 5 illustrates another embodiment of a generalized meso-frequency traveling wave electrokinetic sorption cell 500. The cell 500 of FIG. 5 is identical as to the cell 100 of FIG. 1A except that it also includes a surface catalyst layer over a non-electrically conductive substrate 510. This allows for catalytic reaction to take place before liquid or gaseous feed stream enters the rest of the cell 500.

With respect to the above disclosures, it should be understood that the term "layer" is meant to refer to an area or volume, and does not necessarily define a discrete or separate lamina, and, indeed, the transition between "layers" may be gradual and amorphous. In addition, structures such as electrodes, vias, buses, heat exchange surfaces and mass transport zones may be manufactured by such techniques as electrostatic self assembly that will render them non-discrete, yet functional areas of the device.

The device of the invention may be used alone or as a part of another system for the purpose of temperature control for a number of applications and products areas, including for use by military, medical, industrial, consumer, scientific/laboratory, and telecommunication industries. The methods, devices, and systems of the invention may be used for heat removal ranging from milliwatts up to several thousand watts. Examples of the devices and systems of where methods of the invention may be used for temperature control include, but are not limited to, avionics, black box cooling, calorimeters, CCD (charged couple devices), COIL (chemical Oxygen Iodine Lasers), CID (Charge Induced Devices), cold chambers, cold plates, compact heat exchangers, constant temperature baths, dehumidifiers, dew point hygrometers, electronics package cooling, electrophoresis cell coolers, environmental analyzers, heat density measurement, ice point references, immersion coolers, integrated circuit cooling, inertial guidance systems, infrared calibration sources and black box references, infrared detectors, infrared seeking missiles, laser collimators, laser diode coolers, long lasting cooling devices, low noise amplifiers, microprocessor cooling, microtome stage coolers, NEMA enclosures, night vision equipment, osmometers, parametic amplifiers, photomultiplier tube housing, power generators (including small devices), precision device cooling (lasers and microprocessors), refrigerators (aircraft, automobile, boat, recreational vehicle, hotel, insulin, portable/picnic, pharmaceutical), restaurant portion dispenser, self-scanned array systems, semiconductor wafer probes, stir coolers, thermal viewers and weapons sights, thermal cycling devices (nucleic acid, protein, and blood analyzers), thermostat calibrating baths, tissue preparation and storage, vidicon tube coolers, wafer thermal characterization, water and beverage coolers, wet process temperature controller, wine cabinets, high temperature superconducting transformers and conductors, and the like.

Systems of the invention comprise at least one sorption device of the invention.

The system may comprise a plurality of sorption devices, including systems where at least some of said plurality of sorption devices are connected in series or in parallel. In certain embodiments, at least some of said plurality of sorption devices are located coplanar. In some embodiments, the edges of at least some of said plurality of sorption devices are contiguous. The sorption devices may also be stacked. In certain embodiments, at least some of said plurality of sorption devices comprise different sorbent structures.

Figure 12:
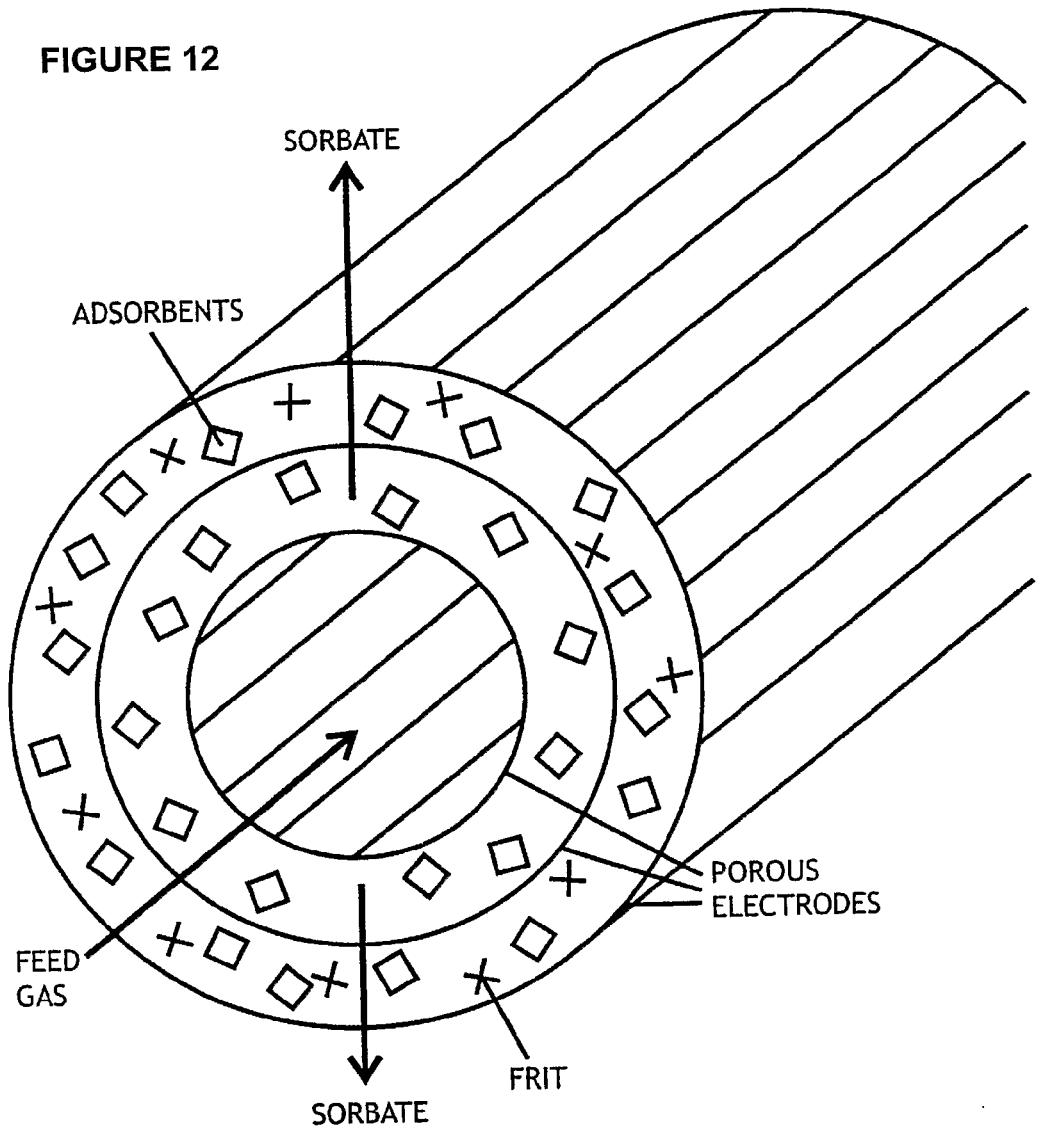
FIG. 12 is a schematic diagram of a series of porous co-planar sorbents (adsorbents or absorbents) and electrodes that form an electrokinetically-assisted sorption membrane.
Figure 13:
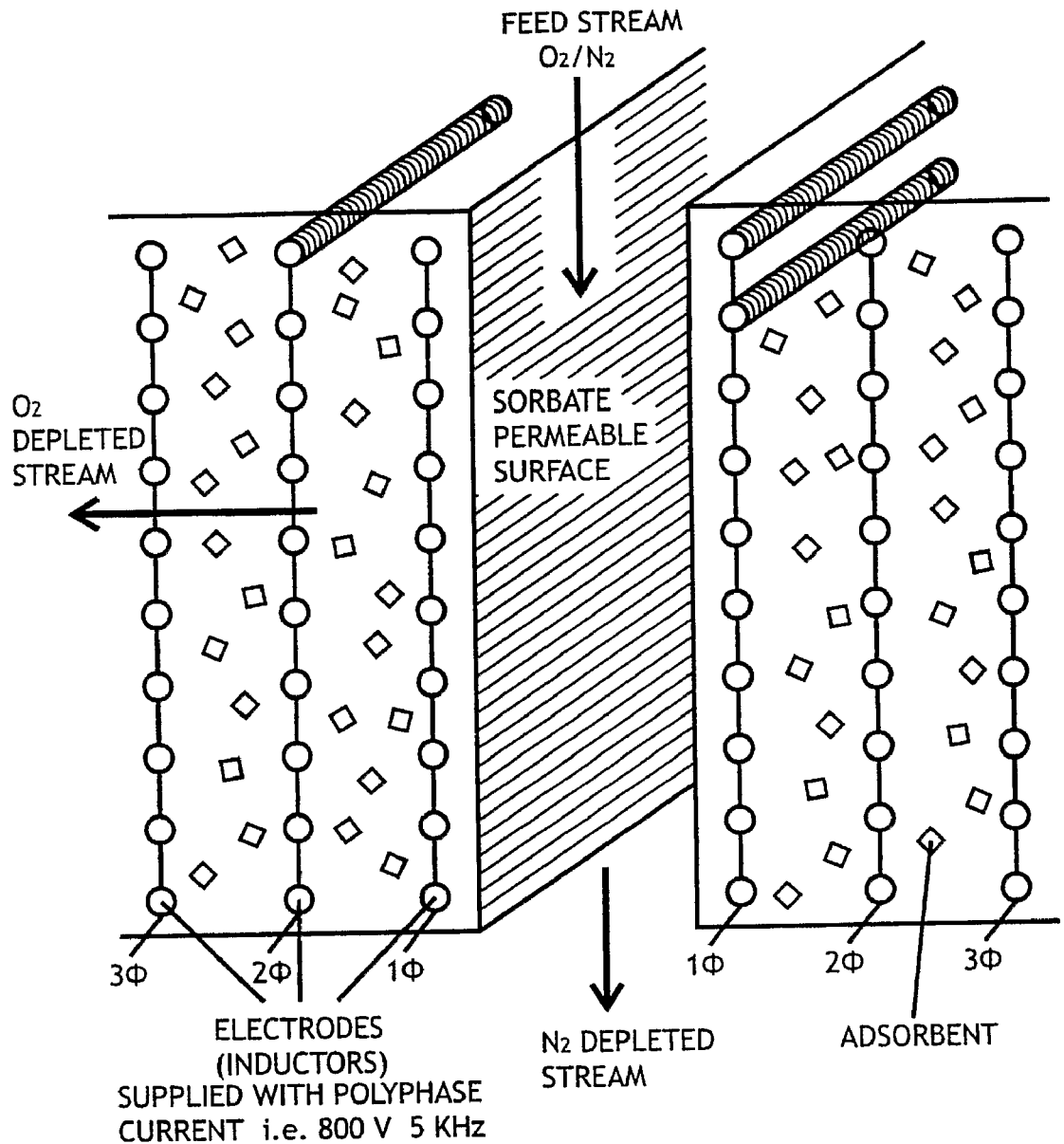
FIG. 13 is a schematic diagram of electrokinetically assisted sorbate diffusion of the separation of a mixture of oxygen and nitrogen.

In certain embodiments of the invention, the system may comprise a series of porous co-planar sorbents (adsorbents or absorbents) and electrodes that form an electrokinetically-assisted sorption membrane, as shown in FIG. 12 and FIG. 13.

In certain embodiments, the system further comprises at least one analytical device. In other embodiments, the system comprises a plurality of analytical devices. Suitable analytical devices include, but are not limited to, a flame detector, mass spectrometer, infrared spectrometer, Raman spectrometer, ultraviolet spectrometer, visible light spectrometer, nuclear magnetic resonance spectrometer, gas chromatograph, liquid chromatograph, atomic adsorption spectrometer, potentiometer, spectrophotometer, or a combination thereof. The analytical device may analyze the identity, concentration, or identity and concentration of a pathogen, radioisotope, explosive, explosive precursor, biological toxin, chemical toxin, or a mixture thereof.

In certain embodiments, the system may comprise at least one superconducting material. Suitable superconducting material includes, but is not limited to, niobiumtitanium, an oxide of yttrium, bismuth, thallium, barium, copper or lanthanide, or a combination thereof.

In certain embodiments, the system may cool a high temperature superconductor, and may be activated by the electromagnetic field flux generated by the superconductor.

In certain embodiments, the system may further comprise at least one electronic device. Suitable electronic devices include, but are not limited to, a television, monitor, radar, microprocessor, computer, infra-red array, infrared sensor, amplifier, radio receiver, laser diode, insulated gate bipolar transistor, thyratron, motor control, and the like.

In certain embodiments, the system may further comprise at least one sensor for detecting the presence, level, or both presence and level of a substance in a bodily fluid. The bodily fluid may be blood, blood serum, urine, respired air, saliva, spinal fluid, semen, or vaginal secretions. The substance may be glucose, ethanol, drug, histamine, protein, polypeptide, polynucleic acid, nucleic acid, lead, biological toxin, chemical toxin or a combination thereof.

In certain embodiments, the invention is directed to inanimate organs for carrying out a bodily function in a patient in need thereof, comprising:
the sorption device of the invention;
wherein the bodily function is selected from the group consisting of:
removing toxins from blood;
removing toxins from respired air;
and combinations thereof.

With respect to the inanimate organ, the sorption device may be implanted in the patient or external to the patient.

In certain embodiments, the system may further comprise at least one radiolysis reactor.

In certain embodiments, the system may comprise at least one electron generator array comprising micro holes drilled through a dielectric and having charged ends, as produced by Burle Electro-Optics, and operating on the principle of secondary electron emission.

In certain embodiments, the system may comprise a laser system, such as an excimer laser, a diode pumped laser, or a COIL (Chemical Oxygen Iodine Laser).

In certain embodiments, the system may further comprise at least one battery. Preferably, the sorption device cools the battery during recharging, such as in hybrid vehicles.

In certain embodiments, the invention is directed to a foundry cold box comprising the sorption device of the invention.

In certain embodiments, the invention is directed to a dehydration device comprising the sorption device of the invention.

In certain embodiments, the invention is directed to a deodorizing device comprising the sorption device of the invention.

In certain embodiments, the invention is directed to an oxygen purifying device comprising the sorption device of the invention, particularly one that is portable, such as those utilized in medical applications.

In certain embodiments, the invention is directed to a refrigeration device comprising the sorption device of the invention, especially one that is portable. The refrigeration device may be capable of cooling to cryogenic conditions. In certain applications, the refrigeration device may comprise a collector of solar energy.

In certain embodiments, the invention is directed to a heat pump device comprising the sorption device of the invention, especially one that is portable. In certain embodiments, the heat pump device cools an electric conductor, semiconductor, superconductor, or high-temperature superconductor. In certain embodiments, the heat pump device operates from radiated energy of an electrical conductor, semiconductor, superconductor, or high-temperature superconductor.

In certain embodiments, the invention is directed to a computer processing unit comprising the sorption device of the invention.

In certain embodiments, the invention is directed to a laser system comprising the sorption device of the invention, such as an excimer laser, a diode pumped laser, or a Chemical Oxygen Iodine Laser.

In certain embodiments, the invention is directed to a vehicle comprising the sorption device of the invention. vehicle is an aerospace vehicle, an underwater vehicle, a land vehicle (including those powered by hybrid power, electric power, or fuel cell power). In certain embodiments, the invention is directed to a device for purifying air in the internal environment of a vehicle comprising the sorption device of the invention. In certain embodiments, the invention is directed to a device for purifying water in the internal environment of a vehicle comprising the sorption device of the invention. In certain embodiments, the invention is directed to a device for cooling the internal environment of a vehicle comprising the sorption device of the invention.

In certain embodiments, the invention is directed to a fuel reformer comprising the sorption device of the invention, such as a methanol reformer or a methane reformer.

In certain embodiments, the invention is directed to a fuel purification device comprising the sorption device of the invention.

In certain embodiments, the invention is directed to a combustion device comprising the sorption device of the invention. The combustion device may be a furnace, including those that are coal-burning or natural gas-burning electrical power generators, or a residential or institutional furnace.

In certain embodiments, the invention is directed to a fuel cell comprising the sorption device of the invention.

In certain embodiments, the invention is directed to a device for purifying exhaust of a vehicle comprising the sorption device of the invention.

In certain embodiments, the invention is directed to a device for pollution abatement comprising the sorption device of the invention.

In certain embodiments, the invention is directed to a device for temperature conditioning spaces for human or animal habitation or food storage comprising the sorption device of the invention.

In certain embodiments, the invention is directed to a concentrator for an analytical device comprising the sorption device of the invention. In certain embodiments, the invention is directed to an analytical device comprising the sorption device of the invention, such as a flame detector, mass spectrometer, infrared spectrometer, Raman spectrometer, ultraviolet spectrometer, visible light spectrometer, nuclear magnetic resonance spectrometer, gas chromatograph, liquid chromatograph, atomic adsorption spectrometer, potentiometer, spectrophotometer, or a combination thereof.

In certain embodiments, the invention is directed to an oxygen source for coal conversion comprising the sorption device of the invention.

In certain embodiments, the invention is directed to an oxygen source for a power generation system comprising the sorption device of the invention.

In certain embodiments, the invention is directed to an oxygen source for a fuel cell comprising the sorption device of the invention.

In certain embodiments, the invention is directed to a cryo-cooling device comprising the sorption device of the invention; and a thermoelectric module coupled to said sorption device.

In certain embodiments, the invention is directed to a temperature conditioning device for cooling or heating comprising the sorption device of the invention; wherein said sorption device is a closed sorption device; wherein said sorption device further comprises a fluid; and wherein said temperature conditioning device is portable.

In certain embodiments, the invention is directed to temperature conditioning devices, wherein the temperature conditioning device forms a thermal barrier having a controllable conductivity. In certain embodiments, the invention is directed to temperature conditioning devices, wherein the temperature conditioning device may convert interchangeably between a thermal barrier and a bidirectional heat pump. In certain embodiments, the invention is directed to temperature conditioning devices, wherein the temperature conditioning device is a thermal barrier in a missile system, aerospace vehicle, electronics enclosure, or a combination thereof.

In certain embodiments, the invention is directed to an article of clothing comprising the sorption device of the invention the temperature conditioning device described above. The article of clothing may be military protective clothing or civilian protective clothing. The article of clothing may be a helmet, gloves, face mask, personal body armor, fire-resistant clothing, or a suit to protect against exposure to temperature extremes, a hazardous chemical agent, hazardous biological agent, radioactive material, or a combination thereof.

In certain embodiments, the invention is directed to thermal management device for a laser comprising the sorption device of the invention.

In certain embodiments, the invention is directed to methods of analyzing the components of a fluid mixture, comprising the steps of:

providing a fluid mixture comprising a first component and a second component;

providing an sorbent structure comprising at least one sorbent;

adsorbing said first component onto said absorbent;

desorbing said first component;

electrokinetically biasing said first component in a direction other than the vector of said fluid mixture; and analyzing said desorbed first component.

In certain embodiments, the invention is directed to methods of analyzing the components of a fluid mixture, comprising the steps of:

providing a fluid mixture comprising a first component and a second component;

providing an sorbent structure comprising at least one sorbent;

adsorbing said first component onto said absorbent;

desorbing said first component;

electrokinetically biasing said first component in a direction other than the vector of said fluid mixture;

collecting an exhaust fluid stream enriched in said second component and depleted in said first component; and analyzing said exhaust fluid stream.

The above methods of analyzing may further comprise the step of providing a carrier gas stream having a lower flow rate than the flow rate of said fluid mixture.

Figure 20:
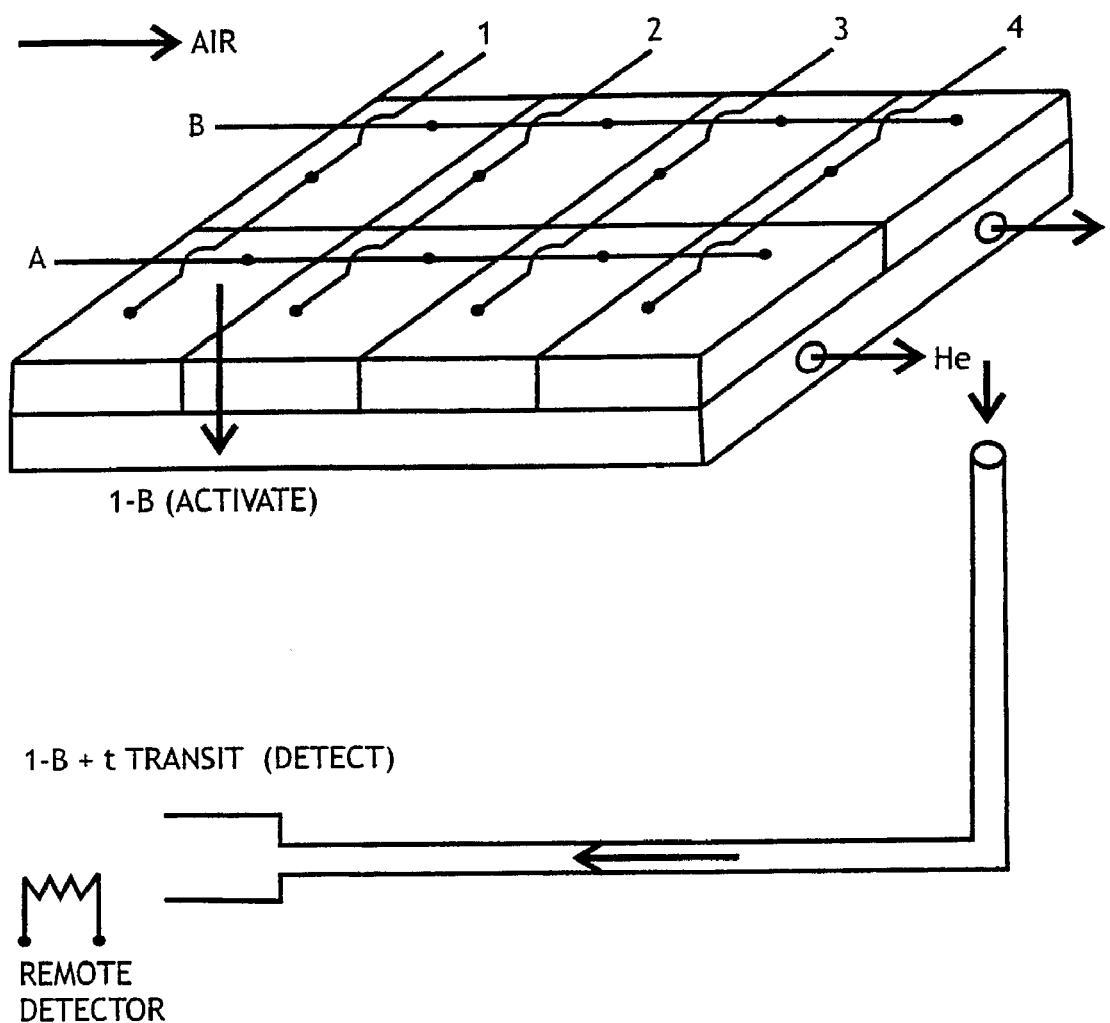
FIG. 20 shows a schematic diagram of a plurality of sorption structures, positioned at defined and addressable locations.

The above methods of analyzing may further comprise the step of providing a plurality of sorption structures, especially wherein the plurality of sorption structures are positioned at defined and addressable locations, as shown in FIG. 20.

In the above methods of analyzing, the desorption step may be microprocessor controlled.

In the above methods of analyzing, the fluid mixture may comprise at least material selected from the group consisting of: pathogen, radioisotope, explosive, biological toxin, chemical toxin, and combinations thereof.

It will be apparent to those skilled in the art that various modifications and variations can be made in the present invention and specific examples provided herein without departing from the spirit or scope of the invention. Thus, it is intended that the present invention covers the modifications and variations of this invention that come within the scope of any claims and their equivalents.

EXAMPLES

The present invention is further defined in the following Examples, in which all parts and percentages are by weight and degrees are Celsius, unless otherwise stated. It should be understood that these examples, while indicating preferred embodiments of the invention, are given by way of illustration only. From the above discussion and these examples, one skilled in the art can ascertain the essential characteristics of this invention, and without departing from the spirit and scope thereof, can make various changes and modifications of the invention to adapt it to various usages and conditions.

Example 1

Improved Detector

Analytic devices such as mass spectrometers and gas chromatographs can suffer reduced resolution at low analyte concentrations. One possible remedy to this problem is to concentrate the specie(s) under scrutiny to a level where good resolution is possible. Mechanical filtering, condensation (fractionation), and membrane or adsorptive separation techniques can perform the concentration step. Feng and Mitra [*J. of Microcolumn Separation,* 12(4): 267-275 (2000)] have shown that an sorbent containing microtrap can be periodically desorbed by resistive heating. Their microtrap consists of a narrow bore stainless steel tube containing an appropriate sorbent. An electric current is conducted through the length of the tube, causing ohmic heating. The heat is transferred to the sorbent and desorption occurs. As desorption occurs over a shorter period of time than sorption, there is a concentration increase in the adsorbed-desorbed specie. The thermal mass of the system requires considerable time for cooling between samples. The mechanical size of the system makes it not particularly amenable to inclusion in a microstructured analytic device.

Figure 14:
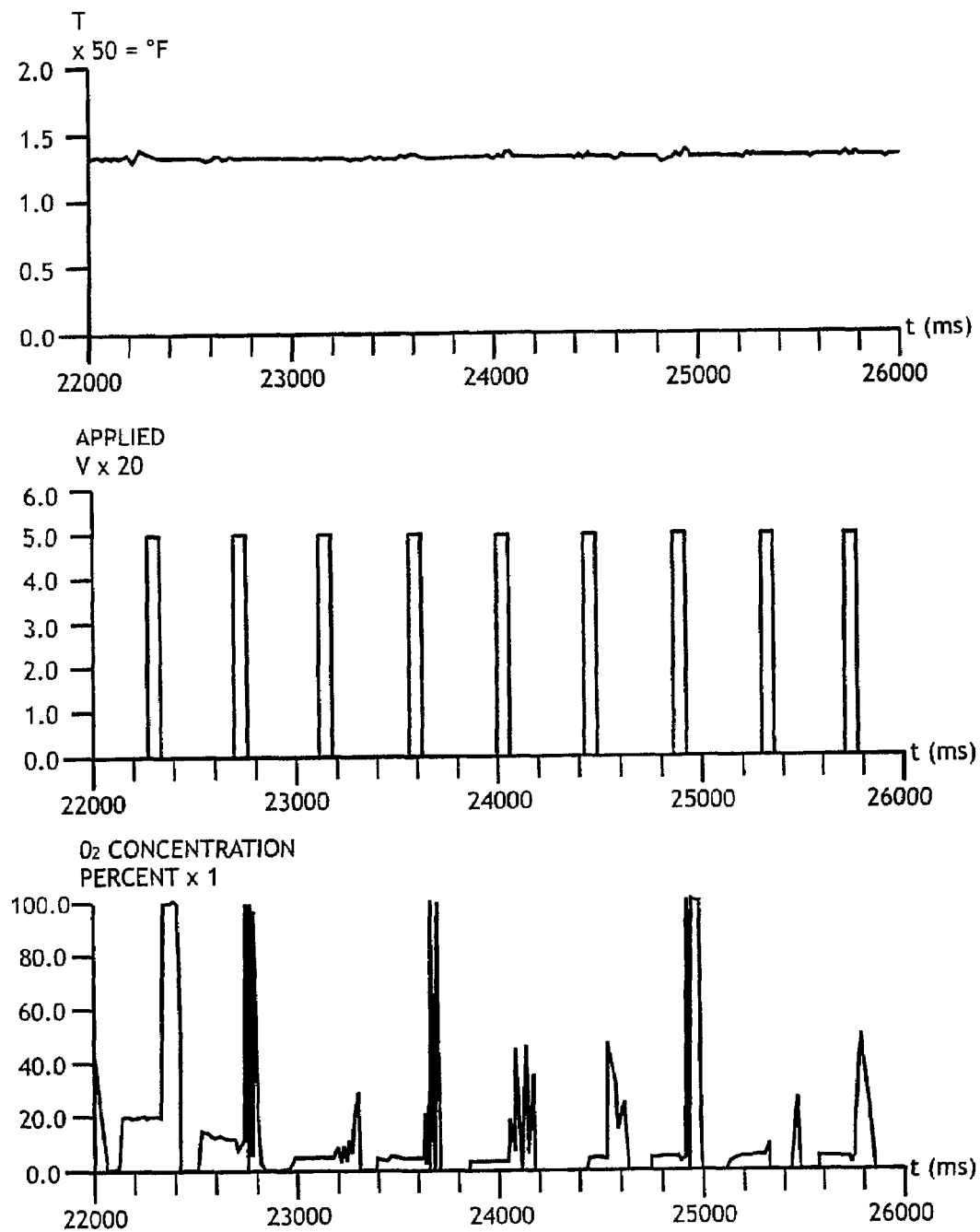
FIG. 14 shows temperature (50× in ° F.), applied voltage (20× in volts), and oxygen concentration as a function of time.

The devices and systems of the invention may be used to pre-concentrating a variety of micromolecules and macromolecules. The method uses micro structured sorbents whose electrical conductivity is altered by various means. Preferably, the sorbents are mixed with conductive materials so that the sorbent particles are intimately engrained. This allows delivery of electrical energy to the individual sorption sites without the unnecessary ohmic heating of non-sorbent material. Our tests using infrared thermocouple sensors indicate that electric desorption can occur without significant heat generation and, therefore, multiple sample processing can be performed without the interjection of a cooling period See FIG. 14. (See print out chart) The micro architecture and laminar nature of the method allows for the inclusion of multiple sample concentrators within a small area. These concentrators can contain sorbents which are engineered to preferentially trap a particular specie of analyte. The individual concentrators can be sequentially addressed by applying electrical energy to a series of conductive busses (or conductors). These busses can be arranged much like a decimal to binary converter, where the individual concentrator location is defined and addressed by X and Y coordinates. A microprocessor provides the timing of the sequential desorption energy. The elution of the analyte into the carrier gas from an individual concentrator is coordinated (allowing for pneumatic conveyance delay) with the detector output. When properly configured, a device can be made responsive to a variety of pathogens, radioisotopes, explosives, and toxic substances using a single detector or several detectors.

Performance can be further improved by electro-kinetically directing the desorbed component into a carrier gas stream of lesser flow than the original gas stream being analyzed.

For example, an air stream of five cubic feet per minute may be passed through a series of sorbent-containing micro concentrators at an airport security station. The concentrators contain sorbents which preferentially adsorb and hold various moieties of interest to security personnel, i.e., radioisotopes, explosives precursors, etc. At predetermined intervals, each concentrator is addressed and a current is applied which then causes desorption of any adsorbed component. Simultaneously an electro-kinetic force is applied (i.e., paraelectric or traveling wave energy), causing the desorbed component to be biased into a secondary 0.01 cubic foot per minute helium carrier gas stream which is directed to a detector. The detector is timed to analyze the portion of the carrier gas that originates from an individual concentrator. A reporting protocol allows each concentrator to be monitored. A more complex protocol allows different sampling stations to be monitored by an individual detector. In the case just described, the detector is required to analyze only one five-hundredth the original volume of air sampled, and the carrier gas can be of a type most suited to the detector performance. Also, as the analyte is concentrated by the sorbent, and the carrier gas flow rate is reduced, the concentration of the adsorbed specie will be many orders of magnitude greater than the original concentration in air.

Example 2

Improved Furnace

An oxygen enrichment device of the invention can increase combustion efficiency of a furnace by removing nitrogen molecules/increasing oxygen content from air going into furnace. In fact, 13.8% less natural gas is consumed and there is a substantial reduction in particulates, carbon dioxide, nitrous oxide, and other greenhouse gas emissions, as shown in FIG. 17.

Example 3

Piezoelectric Valves and Pumps

Oriented piezoelectric fibers or particles may be cast or otherwise placed in flexible medium, such as, for example, silicone rubber, EDPM, butadiene rubber). An aperture may be cut or otherwise formed, such as, for example, by laser ablation, in the flexible medium. The piezoelectric material may be polarized (or poled) in a strong electric field in such a manner that the orientation of the poled piezoelectric fibers or piezoelectric microstructures causes the flexible media to constrict or de-constrict the aperture when as electric field is applied, as is shown in FIG. 15A and FIG. 15B. The electric field is of a lower magnitude than the polarizing field, is of similar geometry, and may have a polarity the same or different that the initial polarizing.

The valve described above has the following attributes:

(1) It has no separate mechanical parts.
(2) It can be activated and deactivated in an extremely fast manner relative to mechanical valves.
(3) It can be patterned onto a substrate where microvalves are needed either to be integrated into or to/from a larger system (such as an analytical device, for example);
(4) It can be easily mass produced.
(5) It can mimic biological valves.
(6) It can be integrated into devices having microchannels that require thousands of parallel channels and valves (such as vapor-compression systems, catalytic systems, sorption systems, biological or chemical assay systems, pumping systems, and the like).
(7) If the piezoelectric material is oriented beside a linear channel, and electrodes are placed alongside or around (concentric to) the piezoelectric material, a peristaltic pump may be formed by the application of a polyphase electrical potential to the electrodes, as shown in FIG. 15B.
(8) The piezoelectric pump and valve may be actuated by the same signal that effects electro-desorption and/or electro-kinetic movement of the sorbate.

Example 4

Ionization of Desorbed Component

In order to manipulate the desorbed component of a gas/liquid in sorbent device of the invention, it may be preferably to partially ionize a portion of the component after it has been desorbed. This may be accomplished by interspersing oriented, high aspect ratio conductive "whiskers" among the sorbent material. These materials could be conductive acrylic fibers, conductive ceramic fibers, carbon nanotubes, or other similar materials. Paschen's curve indicates that 340 volts is the lowest voltage it takes to establish the breakdown field strength between planar electrodes at a pressure of one (1) atmosphere and 7 mm separation. The breakdown voltage can be decreased and electrode separation increased by using high aspect ratio electrodes (pointed electrodes). The absolute value for the breakdown field strength as a function of electrode dimensions is given by the formula $$E_b = \left(300 + \frac{18}{\sqrt{r}}\right) \cdot 10^4 \text{ V} \cdot m^{-1}$$

$E_b$=breakdown field strength
r=electrode radius

Source: *Handbuch der Physik* 14, p. 154. Springer Verlag, Berlin, 1927.

In the case of a pointed electrode, the breakdown field strength is exceeded only in a small volume near the electrode, and ions are formed in this region leading to a corona discharge. At the electrode sizes of carbon nanotubes this corona can be established at electrode potentials as low as <200 volts at electrode spacings of 100 μm at atmospheric pressure.[1]

[1]Modi, A., Kovatkar, N., Lass, E.; Wel, B., and Ajayan, P. M. *Nature* 424(171) 2003.

With this arrangement, desorption and electro-kinetic manipulation of the desorbed component can occur at low voltages by applying a polyphase potential to inductors held at the appropriate distance from a planar ionizing array of micro/nano electrodes. Alternatively, the electrodes themselves may be composed of high aspect ratio materials, as shown, for example, in FIG. 21. Crystalline "whiskers" and carbon nanotubes can act as both the physisorption media and the ionization enhancing structure. As an example, single-wall carbon nanotubes (SWNTs) can preferentially physisorb hydrogen, oxygen, and various other molecules. This makes SWNTs excellent candidates for the sorption media in air separation devices that also use ionization as a precursor to electrostatic-electro-kinetic manipulation of the product stream.

Another interesting and useful aspect of SWNTs and carbon nanotubes in general is that their electrical resistance is altered by exposure to certain gaseous molecules. For example, exohydrogenated zig-zag nanotubes become ideal conductors. Also, SWNTs, when exposed to oxygen transition from a semi-conduction state to a metallic conducting state. This property makes SWNTs self-regulating in terms of the applied electric desorption energy.[2,3] This effect is instantaneous and reversible.

[2]Dean, K. A., and Chalamala, B. R. *J. Appl. Physics* 85(3832) 1999.
[3]Dean, K. A., and Chalamala, B. R. *J. Appl. Physics Lett* 76(375) 2000.

Example 5

Use of Non-Thermal Plasma

In a plasma, 95% of the electron gas energy can be transferred to molecular vibration excitation. A plasma may generate ions in a resonance excited state or a metastable excited state. When the plasma excites a molecule to its lowest vibrational state, it is termed to be in a resonance excited state and will have a very short lifetime varying typically between $10^{-2}$ to $10^{-9}$ seconds. Example: the radioactive lifetime of a resonance excited oxygen molecule is $2 \times 10^{-5}$ sec. Conversely, electronically excited (energy transfer from a free plasma electron) metastable species can have very long lifetimes—on the order of seconds, minutes, and even hours. It is therefore important to regulate plasma production when using ionization as a means to allow the electro-kinetic manipulation of the sorbate flow, or when using ionization or free electron generation as a means of initiating desorption.

In some cases the metastable species may initiate chemical reactions, or the production of free radicals that would be an unwanted or injurious side effect. A case in point would be an oxygen concentrator for medical purposes. Ozone and hydroxyl radical production would need to be severely limited. In other cases, metastable molecules may participate in endothermic chemical reactions that are temporal dependent and are the unit processes which precedes separation of species.

A non-thermal plasma can assist the continuous sorption process in two ways:
1. The production of free electrons can cause ionization of a molecular species and thereby provide the polar moment needed to allow the sorbate to be electro-kinetically biased.
2. The transfer of discharge energy from free electrons to the excitation of molecular vibration can initiate desorption.

In addition, electronically, vibrationally, and rotationally excited species can stimulate chemical reactions that are synergistically supported by a separation process:
Langevin polarization capture forms ion-molecular complex, or
Ion neutral particle interaction can induce a dipole moment in the neutral particle;
The interaction of $N_2$ ions and water molecules can produce $H_2O$ ions which can then interact with neutral $H_2O$ molecules and produce OH radicals. The OH radicals provide the acidic behavior associated with the destruction of pollutants in an air stream.

As is known in the art, nonthermal plasmas can be used to dissociate the components of molecules. The energy needed to break the molecular bonds is delivered via the collisions of ions, electrons, free radicals, and quanta of electromagnetic radiation. One method of forming a non-thermal plasma is by having a plurality of electrodes separated by a dielectric frit or pellets. A high voltage alternating current is applied to the electrodes. This is known as a dielectric barrier discharge (DBD) reactor. As shown in FIG. 12, a DBD reactor can be integrated into the architecture of a meso-frequency continuous adsorption technology (MCAT) EHD assisted sorption membrane.

In one example, $CO_2$ is directed to the interior of a DBD reactor and disassociated into CO and $O_2$. The DBD reactor is surrounded by an sorbent (cuprous chloride-doped zeolite) that preferentially adsorbs CO. The $O_2$ continues through the reactor and is captured, and the adsorbed CO is periodically desorbed and electro-kinetically biased to travel in a permeate direction. The ions and free electrons generated in the DBD reactor assist the electro-kinetic transport of the permeate.

Example 6

Endothermic Plasma Reactors

Many useful endothermic reactions can be assisted by exposing the reactants to a thermal or non-thermal plasma. The energy efficiency of such reactions can be very high (typically 80-90%). The plasma may be generated thermally, electrically, or by the stopping process of nuclear fission fragments (plasma radiolysis). Water or carbon dioxide may be disassociated by plasma radiolysis.

$$e + H_2O \rightarrow H^- + OH$$

$$H^- + H_2O \rightarrow H_2 + OH$$

The reverse reaction $H + OH + M \rightarrow H_2O + M$ proceeds very rapidly, so the immediate separation of the initial reaction products ($H_2$ and OH) is necessary, if processes such as plasma radiolysis are to be effective.

The device and system of the invention may serve as a downstream separation device for a radiolysis reactor because the ionization would render the reactants steerable in the device and system of the invention. Therefore, it is envisioned that a plasma induced chemical reactor would be a precursor to the method of the invention. Catalysis, radiolysis, thermolysis, and plasmolysis can be used independently or in combination to effect separation dissociation. Then used with the method of the invention, carbon dioxide from combustion processes can be dissociated utilizing waste heat and other energy sources, and the products (oxygen and carbon monoxide) can be recycled to enhance combustion.

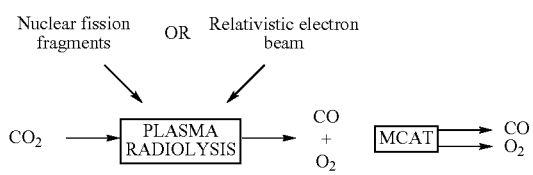

This yield is suppressed by inverse reactions $$O + CO + M \rightarrow CO_2 + M$$

Immediate CO, $O_2$ separation prevents inverse reaction.

Example 7

Packed Bed Corona Discharge

Figure 16:
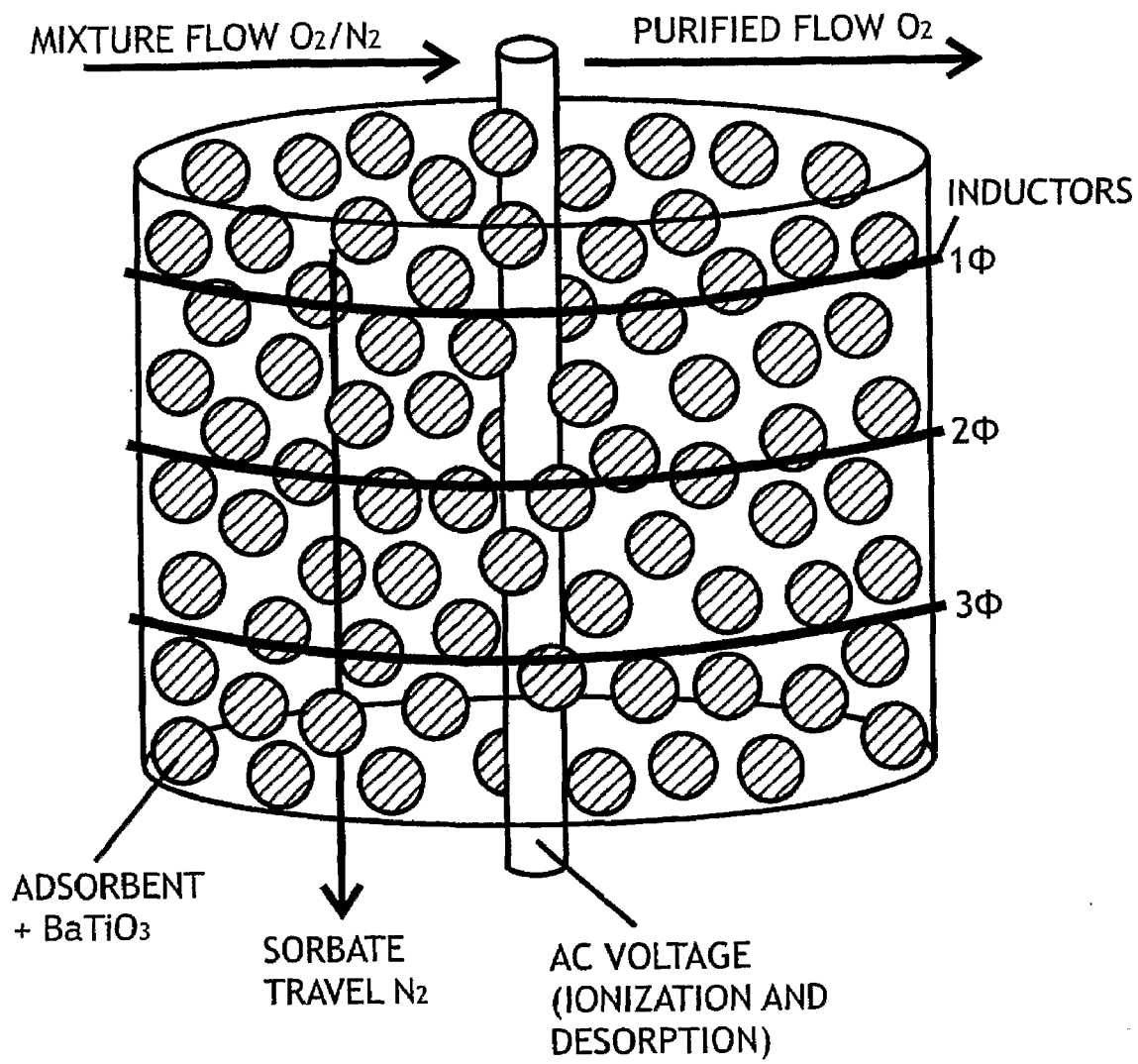
FIG. 16 shows a packed corona discharge device, described in Example 7.
Figure 17:
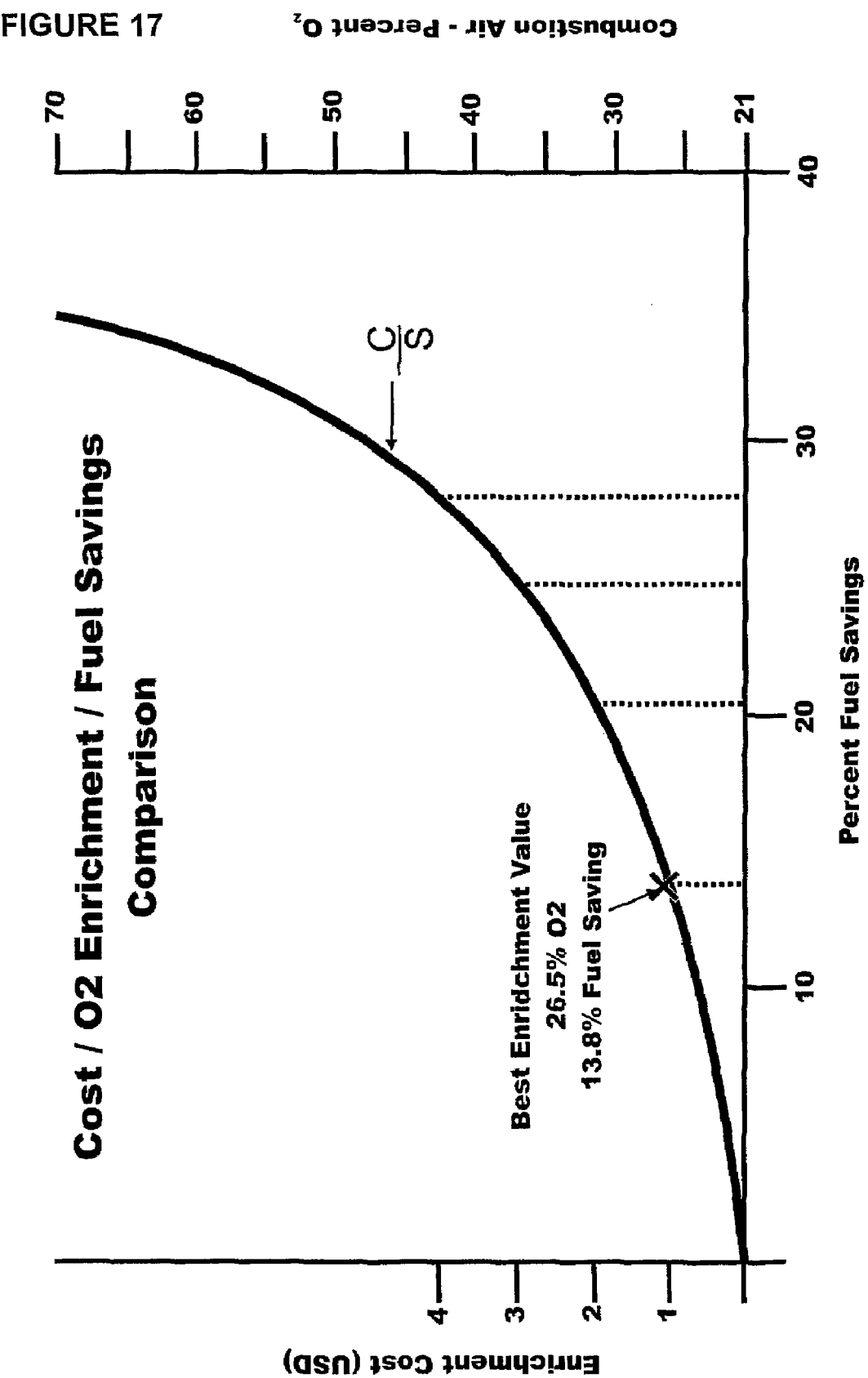
FIG. 17 shows a plot of enrichment cost (in U.S. Dollars) as a function of percent fuel savings for a furnace, as described in Example 2.

As shown in FIG. 16, an alternating current (AC) voltage may be applied to concentric electrodes. The annular space contains sorbents and dielectrics and/or ferroelectric materials. Also contained are, possibly, electrical conduction enhancing materials. The AC voltage causes desorption of any adsorbed moieties and also ionizes some of the molecules or creates free radicals or energetic electrons (non-associated). A poly-phase potential is applied to nearby inductors causing the ionized particles to travel in the desired direction. Desorption and movement of the sorbate occurs simultaneously. Other arrangements of the inductors are possible to create movement of the ionized particles, i.e., a non-uniform electric field may be created by varying the geometry of the electrodes or by adjusting the permittivity of the intervening dielectric. Only a portion of the desorbed molecules need to be ionized, as an ion drag effect is created whereby accelerated ionized molecules collide with non-ionized molecules and transfer some of their kinetic energy to them. Ions can be created by the secondary electron emission principle using an electron generator array (described above with respect to Burle Electro-Optics)

Lead barium titanate ($PbBaTiO_3$) can be used as the ferroelectric material and also as a piezo-electric material. An applied AC voltage causes both ionization and vibration. The vibration imparts kinetic energy to the sorbent-sorbate complex, causing liberation of the sorbate, and some of the now-unbound sorbate is ionized by the same applied AC potential. The sorbate is then removed by the interaction of the ions with a non-uniform electric field.

Use atmospheric pressure glow dielectric barrier discharge modification to ionize the gas. A ferroelectric material such as $BaTiO_3$ may be used below its ferroelectric Curie point. The ferroelectric material may be layered, pelletized, or otherwise configured. These materials can exhibit a spontaneous polarization with or without the application of an external electric field.

Example 8

Packed Bed Corona Discharge

The device of the invention can be configured to operate as a peristaltic electrohydrodynamically (EHD)-assisted sorption membrane. As is known in the art, the addition of carbon or zeolite to polymeric films can provide a molecular sieving mechanism for the separation of gases having similar kinetic diameters. Unfortunately, these membranes require high pressure differentials to overcome permeance restrictions. Furthermore, polymeric based membranes suffer a tradeoff between selectivity and flux. The device of the invention can be structured with fluid distribution passages which provide easy access to sorption sites. The desorbed moiety can be electro-kinetically biased to diffuse in a permeate direction without significant pressure drivers, as shown in FIG. 13.

When ranges are used herein for physical properties, such as molecular weight, or chemical properties, such as chemical formulae, all combinations and subcombinations of ranges specific embodiments therein are intended to be included.

The disclosures of each patent, patent application and publication cited or described in this document are hereby incorporated herein by reference, in its entirety.

Those skilled in the art will appreciate that numerous changes and modifications can be made to the preferred embodiments of the invention and that such changes and modifications can be made without departing from the spirit of the invention. It is, therefore, intended that the appended claims cover all such equivalent variations as fall within the true spirit and scope of the invention.

What is claimed is:

1. A method of separating components of a fluid mixture, comprising the steps of:
   providing a fluid mixture comprising a first component and a second component;
   providing a sorbent structure comprising at least one sorbent;
   sorbing said first component onto or into said sorbent;
   desorbing said first component; and
   electrokinetically biasing said first component in a direction other than the vector of said fluid mixture.

2. A method according to claim 1, further comprising the step of:
   collecting an exhaust fluid stream enriched in said second component and depleted in said first component.

3. A method according to claim 1, further comprising the step of:
   collecting heat of sorption generated by said sorbing step.

4. A method according to claim 1, further comprising the step of:
   generating a plasma.

5. A method of producing at least one reaction product, comprising the steps of:
   providing a fluid mixture comprising a first component;
   providing a sorbent structure comprising at least one sorbent and at least one catalyst;
   sorbing said first component onto or into said sorbent;
   catalyzing a reaction of said sorbed first component to form at least one sorbed reaction product;
   desorbing said sorbed reaction product; and
   electrokinetically biasing said desorbed reaction product in a direction other than the vector of said fluid mixture.

6. A method according to claim 5, further comprising the step of:
   collecting said reaction product.

7. A method of analyzing the components of a fluid mixture, comprising the steps of:
   providing a fluid mixture comprising a first component and a second component;
   providing at least one sorbent structure comprising at least one sorbent;
   sorbing said first component onto or into said sorbent;
   desorbing said first component;
   electrokinetically biasing said first component in a direction other than the vector of said fluid mixture; and
   analyzing said desorbed first component.

8. A method of analyzing the components of a fluid mixture, comprising the steps of:
   providing a fluid mixture comprising a first component and a second component;
   providing at least one sorbent structure comprising at least one sorbent;
   sorbing said first component onto or into said sorbent;
   desorbing said first component;
   electrokinetically biasing said first component in a direction other than the vector of said fluid mixture;
   collecting an exhaust fluid stream enriched in said second component and depleted in said first component; and
   analyzing said exhaust fluid stream.

9. A method of controlling temperature, comprising the steps of:
   providing a fluid comprising a first component;
   providing a sorbent structure comprising at least one sorbent in a container;
   sorbing said first component onto or into said sorbent;
   desorbing said first component;
   electrokinetically biasing said first component and moving said first component in a direction other than the vector of said fluid;
   condensing said first component;
   evaporating said condensed first component; and
   re-sorbing said evaporated first component onto or into said sorbent.

10. A method of controlling temperature according to claim 9, further comprising the step of:
    applying an electromotive force to said condensed first component.

11. A sorption device, comprising:
    a sorbent structure comprising at least one sorbent;
    an electrokinetic biaser; and
    a desorber.

12. A sorption device according to claim 11, further comprising:
    a source of a fluid mixture comprising at least a first component, and optionally a second component.

13. A sorption device according to claim 12, further comprising:
    a collector of said first component.

14. A sorption device according to claim 13, further comprising:
    a collector of an exhaust fluid stream enriched in said second component and depleted in said first component.

15. A sorption device according to claim 11, further comprising:
    a collector of an exhaust fluid stream depleted in said first component.

16. A sorption device according to claim 11, further comprising:
    a heat exchange medium.

17. A sorption device according to claim 16, further comprising:
a source to apply an electrohydrodynamic force to said heat exchange medium to increase liquid-to-liquid contact.

18. A sorption device according to claim 11, further comprising:
at least one electrohydrodynamic pump.

19. A sorption device according to claim 11, further comprising:
one or more channels through which said fluid mixture flows.

20. A sorption device according to claim 11,
wherein said sorbent structure further comprises at least one high aspect ratio conductor.

21. A sorption device according to claim 11, further comprising:
at least one piezoelectric valve or pump.

22. A sorption device according to claim 11, further comprising:
at least one power conditioning device.

23. A sorption device according to claim 11, further comprising:
at least one thermoelectric module.

24. A system, comprising:
at least one sorption device according to claim 11.

25. A system according to claim 24, further comprising:
at least one analytical device.

26. A system according to claim 24,
wherein said system is selected from the group consisting of a vacuum pump, a foundry cold box, a dehydration device, a deodorizing device, an oxygen purifying device, a cooling device, a heating device, a refrigeration device, a heat pump device, a computer processing unit, a vehicle, a device for purifying air in the internal environment of a vehicle, a device for purifying water in the internal environment of a vehicle, a fuel reformer, a fUel purification device, a combustion device, a fuel cell, a device for purifying exhaust of a vehicle, a device for pollution abatement, a device for temperature conditioning spaces for human habitation, a device for temperature conditioning spaces for animal habitation, a device for temperature conditioning spaces for food storage, a concentrator for an analytical device, an analytical device, an oxygen source for coal conversion, an oxygen source for a power generation system, an oxygen source for a residential or institutional furnace, an oxygen source for a fuel cell, a cryo-cooling device, a temperature conditioning device, and a thermal management device for a laser.

27. An inanimate organ for carrying out a bodily function in a patient in need thereof, comprising:
the sorption device according to claim 11;
wherein said bodily function is selected from the group consisting of:
removing toxins from blood;
removing toxins from respired air;
and combinations thereof.

28. A sorption device, comprising:
a first substrate layer;
an sorbent layer disposed adjacent to said first substrate layer;
at least two electrodes in contact with or in close proximity to at least one of said first substrate layer and said sorbent layer;
a second substrate layer disposed adjacent to said sorbent layer,
at least one via disposed through at least one of said first substrate layer, said sorbent layer, and said second substrate layer; said at least one via being disposed between said at least two electrodes; and
at least one collection port disposed through at least one of said first substrate layer, said sorbent layer, and said second substrate layer.

29. A sorption device according to claim 28, further comprising:
at least one non-sorbent microstructure material within said sorbent layer.

30. A sorption device according to claim 28, further comprising:
at least one manifold wherein said manifold performs at least one function of removing a sorbed component, providing a feed stream, directing materials toward said sorption unit and directing material away from said sorption unit.

31. A sorption device according to claim 28, further comprising:
at least one of a coupled power source and a coupled multiphase signal generator.

32. A sorption device, comprising:
a first substrate layer;
an sorbent layer disposed below the first substrate layer; at least two electrodes in contact with or in close proximity to at least one of said first substrate layer and said sorbent layer;
a second substrate layer disposed below said sorbent layer,
at least one via disposed through at least one of said first substrate layer, said sorbent layer and said second substrate layer, said at least one via being disposed between said at least two electrodes;
at least one collection port disposed through at least one of said first substrate layer, said sorbent layer and said second substrate layer;
a third substrate layer disposed over at least one of said first substrate layer and said sorbent layer; and
a working fluid;
wherein said first substrate layer, said sorbent layer and said second substrate layer are co-planar; and
wherein placement of said third substrate layer above said first substrate layer defines a chamber; and
wherein said working fluid is recycled within said sorption cell.

33. A sorption device according to claim 32, further comprising:
at least one non-sorbent microstructure material within said sorbent layer.

34. A sorption device according to claim 32, further comprising:
at least one manifold mechanism wherein said manifold mechanism performs at least one function of removing a sorbed material, providing a feed stream, directing materials toward said sorption unit and directing material away from said sorption unit.

35. A sorption device according to claim 32, further comprising:
at least one power conditioning device.

* * * * *